United States Patent [19]

Holt

[11] Patent Number: 5,097,517

[45] Date of Patent: Mar. 17, 1992

[54] METHOD AND APPARATUS FOR PROCESSING BANK CHECKS, DRAFTS AND LIKE FINANCIAL DOCUMENTS

[76] Inventor: Arthur W. Holt, 20 Wardour Dr., Annapolis, Md. 21401

[21] Appl. No.: 244,425

[22] Filed: Sep. 15, 1988

Related U.S. Application Data

[63] Continuation-in-part of Ser. No. 26,817, Mar. 17, 1987, abandoned.

[51] Int. Cl.⁵ .............................................. G06K 9/00
[52] U.S. Cl. .................................... 382/7; 382/2; 382/9
[58] Field of Search ............ 382/2, 3, 7, 9, 13, 382/34; 235/379, 432; 902/5, 6, 8, 11, 18

[56] References Cited

U.S. PATENT DOCUMENTS

| | | | |
|---|---|---|---|
| 3,108,254 | 10/1963 | Diamond | 382/13 |
| 3,142,818 | 7/1964 | Holt | 382/26 |
| 3,178,681 | 4/1965 | Perotto | 382/26 |
| 3,200,373 | 8/1965 | Rabinow | 382/33 |
| 3,222,650 | 12/1965 | Lazarus | 382/15 |
| 3,290,650 | 12/1966 | Bailey, Jr. et al. | 382/26 |
| 3,348,200 | 10/1967 | Ross | 382/26 |
| 3,517,387 | 6/1978 | Andrews et al. | 382/9 |
| 3,519,990 | 7/1970 | Holt | 382/9 |
| 3,521,236 | 7/1970 | Parks et al. | 382/42 |
| 3,597,731 | 8/1971 | Reitboack et al. | 382/27 |
| 3,609,685 | 9/1971 | Deutsch | 382/21 |
| 3,626,368 | 12/1971 | Lee | 382/15 |
| 3,651,461 | 3/1972 | Holt | 382/26 |
| 3,766,520 | 10/1973 | Patterson | 382/21 |
| 3,889,234 | 6/1975 | Makihara et al. | 382/27 |
| 3,909,785 | 9/1975 | Howells | 382/37 |
| 3,999,161 | 12/1976 | Van Bilzem et al. | 382/25 |
| 4,047,010 | 9/1977 | Perotto | 382/1 |
| 4,066,998 | 1/1978 | Liokea | 382/20 |
| 4,087,788 | 5/1978 | Johannesson | 382/55 |
| 4,090,223 | 5/1978 | Holt | 360/35 |
| 4,139,869 | 2/1979 | Holt | 360/35 |
| 4,155,072 | 5/1979 | Zawa | 382/20 |
| 4,163,214 | 7/1979 | Zomori et al. | 382/18 |
| 4,193,056 | 3/1980 | Morita et al. | 382/20 |
| 4,201,978 | 5/1980 | Nally | 382/7 |
| 4,288,779 | 9/1981 | Otsu et al. | 382/18 |
| 4,318,083 | 3/1982 | Argyle | 382/28 |
| 4,365,235 | 12/1982 | Greanias et al. | 382/13 |
| 4,385,285 | 5/1983 | Horst et al. | 382/3 |
| 4,395,700 | 7/1983 | McCubbrey et al. | 382/27 |
| 4,398,176 | 8/1983 | Dargel et al. | 382/27 |
| 4,414,685 | 11/1983 | Sternberg | 382/49 |
| 4,415,880 | 11/1983 | Scott | 382/27 |
| 4,461,029 | 7/1984 | Van Bilzem et al. | 382/25 |
| 4,468,808 | 8/1984 | Mori et al. | 382/25 |
| 4,491,960 | 1/1985 | Brown | 382/2 |
| 4,523,330 | 6/1985 | Cain | 382/7 |
| 4,525,860 | 6/1985 | Boivie | 382/21 |
| 4,547,898 | 10/1985 | Tsikos | 382/4 |
| 4,561,106 | 12/1985 | Yoshida | 382/49 |
| 4,617,457 | 10/1986 | Granzow et al. | 902/18 |
| 4,628,532 | 12/1986 | Stone et al. | 382/21 |
| 4,680,803 | 7/1987 | Dilella | 382/9 |
| 4,685,141 | 8/1987 | Hoque et al. | 382/7 |
| 4,837,842 | 6/1989 | Holt | 382/7 |

OTHER PUBLICATIONS

Proceedings of the IEEE, vol. 56, No. 8, Aug. 1968, p. 1292-1 "Recognition of Handwritten Numerical Characters . . .".

Datamation Reprint, Oct. 1970, Arthur W. Holt "Smart Terminals".

(List continued on next page.)

*Primary Examiner*—Michael Razavi
*Assistant Examiner*—Jose L. Couso
*Attorney, Agent, or Firm*—Jim Zegeer

[57] ABSTRACT

Banking apparatus for reading numeric information on bank checks, drafts and like documents. An electronic black/white pixel image of the numeric information is analyzed by a system capable of reading unconstrained, constrained, printed and typed numeric characters, locating the division between dollar and cents amounts. The invention also reads overlapping touching and not touching characters. A check is fed (330) to a scanner (331) and converted to a black and white image. A courtesy amount field (CAF) on the check is located by a CAF locator (332) and is provided to a recognition system (333).

19 Claims, 36 Drawing Sheets

OTHER PUBLICATIONS

Computer Design, Feb. 1974, pp. 85-89 "Algorithm For a Low Cost Hand Print Reader".

IBM J. Res. Develop., vol. 27, No. 4, Jul. 1983 "Image Thresholding For Optical Character Recognition . . ." pp. 400-411 (J. M. White et al.)

IBM J. Res. Develop., vol. 27, No. 4, Jul. 1983 "A Processor-Based OCR System", pp. 386-399 (R. G. Casey et al.)

Proceedings of the IEEE, vol. 68, No. 4, Apr. 1980, pp. 469-48 "Automatic Recognition of Handprinted Characters—The Stat of the Art" (C. Y. Susa et al.)

IEEE Transactions on Military Electronics, Apr.-July. 1963, pp. 113-115 "A Discrete Model For Eye Track".

Scientific America, Jun. 1982, pp. 124-134"Brain Mechanisms of Visual Attention" (Wartz et al.)

3rd Advanced Technology Conference, pp. 813-826 May 3-5, 1988 Mitchell et al. "Advanced Research In Recognition . . ."

Bell Communications Research, pp. 722-735 Karen Kukich, "Variations On A Back Propagation Name . . ."

State Univ. of New York, pp. 751-767 Pawlicki et al., "Neural Network Models and Their Application To . . ."

Univ. of Texas, pp. 768-781 Kamangar et al., "Recognition of Handwritten Numerals Using A Multilayer . . ."

CGA-HBS, pp. 797-812 Gardin Du Boisdulier et al., "Topological Modelization of Handwritten Digits . . ."

Concordia Univ., pp. 855-866 Suen et al., "Recognition of Totally Unconstrained Handwritten Zip Codes"

Univ. of Arkansas, pp. 303-317 Bass, "Connectionist Architectures For Postal Applications"

State Univ. of New York, pp. 318-326 Palumbo et al., "Advanced Computer Architectures For Address Block . . ."

Eastman Kodak Co., pp. 343-359 Cok et al., "A Medium Grained Parallel Computer For Image Processing"

Byte, Oct. 1987, pp. 155-162 Jones et al., "Back Propagation. A Generalized Delta Learning Rule"

Omni, Erik Larson, "Neural Chips", pp. 113,114,116,168&169.

Science News, vol. 132, p. 14, Karen Hartley, "Seeing The Need For 'Art'" p. 14.

Science News, vol. 132, p. 76, Stefi Weisburd, "Neural Nets Catch The ABCs of DNA" p. 76

Byte, Oct. 1987, pp. 183-192, Gary Josin, "Neural-Network Heuristics"

IEEE ASSP Magazine, Apr. 1987; pp. 4-22, Lippma "An Introduction To Computing With Neural Nets"

Discover, Feb. 1988, pp. 70-79, Heppenheimer, "Nerver of Silicon"

"Inventor of Thinking Computer" T. J. Sejnowski p. 1-P8.

QUADRANT SENSITIVE GATES

| | NE | SE | SW | NW |
|---|---|---|---|---|
| 31 — VCR | $[i][j+1]$ | $[i][j-1]$ | $[i][j-1]$ | $[i][j+1]$ |
| 32 — PIR | " | " | " | " |
| 34 — HCR | $[i+1][j]$ | $[i+1][j]$ | $[i-1][j]$ | $[i-1][j]$ |
| 35 — PIR | " | " | " | " |
| 53 — EMR | $[i-1][j]$ | $[i-1][j]$ | $[i+1][j]$ | $[i+1][j]$ |
| 54 — HCR | $[i][j]$ | $i,j$ | $i,j$ | $i,j$ |
| 56 — EMR | $[i][j-1]$ | $[i][j+1]$ | $[i][j+1]$ | $[i][j-1]$ |
| 57 — VCR | $[i][j]$ | $i,j$ | $i,j$ | $i,j$ |

TABLE OF GENERIC ENCLAVE NAMES
X ≡ BLACK PIXEL  • ≡ WHITE PIXEL

| | | | |
|---|---|---|---|
| NORTH TEMPLATES | T10 = 75 | T11 = 70 | BEST-IN-NORTH = 75 |
| EAST TEMPLATES | T20 = 50 | T21 = 40 | BEST-IN-EAST = 50 |
| SOUTH TEMPLATES | T30 = 48 | T31 = 50 | BEST-IN-SOUTH = 50 |
| WEST TEMPLATES | T40 = 100 | T41 = 95 | BEST-IN-WEST = 100 |

BEST SCORE FOR ENCLAVE #1 = 100
THIS SCORE WAS PRODUCED BY T40

TABLE OF ARABIC NUMERALS

```
   # # #            2 2 2 2 #              X X X
 # 1 1 1 #          2 2 2 # 1           X X • • X
# 1 1 1 1 #         2 2 # 1 1         X • • • • X
# 1 1 1 1 #         2 2 # 1 1         ①• • • • •X
 # 1 1 1 #          2 # 1 1 1          • • X X X •
   # # #            # # 1 1 1          • X • • • ②
                                       X X X X X X
```

① ≡ BEST LOOP          ① ≡ SE VEX            ① ≡ BEST IN WEST
                       ② ≡ NW VEX            ② ≡ BEST IN EAST
                                             BIW OVER BIE

① ≡ BEST IN WEST       ① ≡ BEST IN NORTH
② ≡ 2d BEST IN WEST    ② ≡ BEST SW SQ
                       ③ ≡ BEST NE SQ
                       ④ ≡ BEST SE SQ

① ≡ BEST SHARP LOOP (BSL)
② ≡ BEST SW SQ (SWSQ)
③ ≡ BEST NE SQ (NESQ)
④ ≡ BEST SE SQ (SESQ)
⑤ ≡ BEST NW VEX (NWVEX)

$$\text{FOUR}_{CT} = \frac{BSL + SWSQ + NESQ + SESQ + NWVEX}{5}$$

① ≡ BEST IN EAST
② ≡ BEST IN WEST
③ ≡ BEST SEVEX
    BIE OVER BIW $$FIVE = \left(\frac{BIE + BIW}{2}\right) \times RPR[5]$$

① ≡ BEST IN EAST
② ≡ BEST LOOP
③ ≡ BEST NWVEX
    BIE OVER LOOP $$SIX = \left(\frac{BIE + BL}{2}\right) \times RPR[6]$$

① ≡ BEST IN WEST
② ≡ BEST SEVEX $$SEVEN = \frac{BIW + SEVEX}{2}$$

① ≡ BEST LOOP (BL)
② ≡ SECOND BEST LOOP (SBL)
③ ≡ BEST IN WEST (BIW)

$$EIGHT = \frac{BL + SBL + BIW}{3}$$

① ≡ BEST LOOP (BL)
② ≡ BEST IN WEST (BIW)
③ ≡ SEVEX $$NINE = \frac{BRL + BIW}{2}$$

FIG 12   TABLE OF RECOGNITION EQUATIONS $\underline{REQ\ \phi-\phi} = BL - NEG\ [SBL]$
WHERE:
$NEG\ [SBL] = 0\ \text{IF}\ SBL < 75$
$= 100 - SBL,\ \text{IF}\ SBL \geq 75$ $\underline{REQ\ 1-\phi} = \dfrac{SEVEX + NWVEX}{2}$ $\underline{REQ\ 2-\phi} = \dfrac{BIW + BIE}{2} \times RPS\ [2] - NEG\ [SBIW]$ $RPR\ [2] = 1\ \text{IF CENTROID OF BIW IS ABOVE CENTROID OF BIE}$
$= 0\ \text{IF NOT}$ $NEG\ [SBIW] = 0\ \text{IF}\ SBIW < 75$
$= 100 - SBIW\ \text{IF}\ SBIW \geq 75$ $\underline{REQ\ 3-\phi} = (BIW + BIIW)/2$ $\underline{REQ\ 4-\phi} = (BIN + SWSQ + NESQ + SESQ)/4$
(OPEN TOP)

$\underline{REQ\ 4-1} = (BSL + SWSQ + NESQ + SESQ + NWVEX)/5$
(CLOSED TOP)

$\underline{REQ\ 5-\phi} = (BIE + BIW)/2 \times RPR\ [5] - NEG\ [SBIW]$
WHERE:
$RPR\ [5] = 1\ \text{IF CENTROID OF BIE IS ABOVE CENTROID OF}$
$= \phi\ \text{IF NOT} \qquad\qquad BIW$ $\underline{REQ\ 6-\phi} = (BIE + BL)/2 \times RPR\ [6]$
WHERE:
$RPR\ [6] = 1\ \text{IF CENTROID OF BIE IS ABOVE CENTROID OF}$
$= \phi\ \text{IF NOT} \qquad\qquad BL$ $\underline{REQ\ 7-\phi} = (BIW + SEVEX)/2$
$- NEG\ [SBIW]$ $\underline{REQ\ 8-\phi} = (BL - SBL + BIW)/3 \times RPR\ [8]$
WHERE:
$RPR\ [8] = 1\ \text{IF CENTROID OF BIW IS BETWEEN CENTROIDS}$
$\text{OF BL AND SBL}$
$= \phi\ \text{IF NOT}$ $\underline{REQ\ 9-\phi} = (BL + BIW)/2 \times RPR\ [9]$
WHERE:
$RPR\ [9] = 1\ \text{IF CENTROID OF BL IS ABOVE CENTROID OF}$
$= \phi\ \text{IF NOT} \qquad\qquad BIW$

FIG 13A

```
            x x x x x                          x x x x x
         x           x                      x           x
         |           x                      |           x
         |           x                      | |         x
TEST→A   |         x                        A | |       x
COR      |       x                          | |       x
                x                           |       x
         x x x                              x x x
         x x x x x x x                      x x x x x x x
```

FIG 13A.1 PHASE 1      FIG 13A.2 PHASE 2

```
      x x x x x                          x x x x x
   x           x                      x | | | | | x
   | |         x                      | | | | | | x
   | | |       x                      | | | | | | x
   A | | |   x                        A | | | | x
   | | |   x                          | | | | x
   | |   x                            | | | x
   x x x                              x x x
   x x x x x x                        x x x x x x
```

FIG 13A.3 PHASE 3      FIG 13A.4 FINAL

FIG 13B.1
PENETRATION OF VOID

FIG 13B.2
LIMITATION OF PENETRATION DUE TO BLACK INHIBITIONS

```
  X X X X X
X I I I • • X
I I I X I I X
I I I I I I X
A I I I I X
I I I I X
I I I X
X X X
X X X X X X X
```

FIG 13B.3
LOSS OF MEMBERSHIP DUE TO PEPPER NOISE

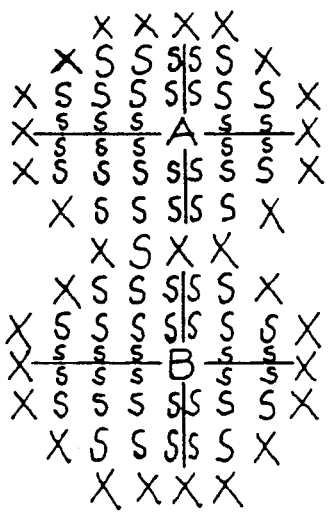

S ≡ BOUNDED ON BOTH VERT AND HORIZ

MEMBERS A = 26
MEMBERS B = 25

% S OF A = 100 ; LOOP = 100
% S OF B = 100 ; LOOP = 100

VOID IN CROSSBAR MEMBERSHIP BEYOND CROSSBAR IS PREVENTED BY LINE-OF-SIGHT INHIBITIONS FROM COR A.

RECOGNITION EQUATION SCORE FOR EIGHT = $\left(\frac{100+100}{2}\right) = 100$

FIG 14D

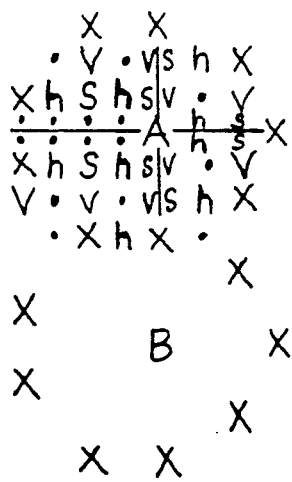

DETAILS FOR SCORING ENCLAVE A:

NE MEMBERS = 6    S=2, V=2, h=2
SE    "       = 6    S=2, V=2, h=2
SW    "       = 8    S=2, V=3, h=2
NW    "       = 6    S=2, V=2, h=2
MEMBERS OF A = 26

% S = 8/26 = 30%
% V = 9/26 = 31%
% h = 8/26 = 30%

"A" LOOP = 30/100 = 30

H ≡ BOUNDED HORIZ ONLY
V ≡ BOUNDED VERTICALLY ONLY
S ≡ BOUNDED BOTH HORIZ AND VERTICALLY

DETAILS FOR SCORING ENCLAVE B: SIMILAR TO ENCLAVE A: "B" LOOP = 30/100 = 30

RECOGNITION EQUATION SCORE FOR EIGHT = $\frac{(30+30)}{2} = 30$

BEST LOOP = 100

FIG 16C

ENCLAVE A
- NE MEMBERS = 11; %S = 100
- SE MEMBERS = 6; %S = 100
- SW MEMBERS = 3; %V = 100
- NW MEMBERS = 11; %V = 100
- BEST-IN-WEST = 100

ENCLAVE B
- NE MEMBERS = 17; %V = 100
- SE MEMBERS = 0; %• = 100
- SW MEMBERS = 12; %h = 100
- NW MEMBERS = 3; %S = 100
- SEVEX = 100

FIG 16D

ENCLAVE A
- NE MEM = 53; %S = 100
- SE MEM = 26; %S = 100
- SW MEM = 7; %V = 100
- NW MEM = 33;
  - %S = 10/33 = 30
  - %V = 23/33 = 70
- BEST-IN-WEST = $\frac{100+100+100+70}{4} = 90$

ENCLAVE B
- NE MEM = 22; %V = 100
- SE MEM = 0; %• = 100
- SW MEM = 28; %h = 100
- NW MEM = 8; %S = 100
- SEVEX = 100

SEVEN = $\frac{90+100}{2} = 95$

```
X X X X X X X X X X X X X X X X X
V V V V V V S S S S S S S S S X S V      ENCLAVE C
V V V V V V S S S S S S S S S X S V         NW MEM = 7 ; %S = 100
V V V V V V S S S S S S S S S X S V         SE MEM = 5 ; %S = 100
V V V V V V S S S S S S S S X S S V         SW MEM = 3 ; %V = 100
V V V V V·A S S S S S S S X S S·D           NW MEM = 38 ; %V = 100
V V · · · S S S S S S S X S S S V           SECOND - BEST-IN-WEST
V V V · · S S S S S S X S S S S V              = 100
V V V V · S S S S S X S S S S S V
V V V V V X X X X X X X X X X X
V V V V V V V S S S X S S V V V V        ENCLAVE D
V V V V V V V S S S X S S V V V V           NW MEM = 3 ; %V = 100
V V V V V V V C S X S S S V V V V           SE MEM = 3 ; %V = 100
            V S S X S S S V V V V           SW MEM = 15 ; %S = 100
            V S X S S S B V V V V           NW MEM = 10 ; %S = 100
            V S X h h h · · · ·              BEST-IN-EAST = 100
            X h h h h · · · ·
            X h h h h · · · ·
            X h h h h · · · ·
            X h h h h · · · ·
```

$$REQ\ 7-1 = \frac{BIW + SBIW + BIE + SEVEX}{4} = 100$$

ENCLAVE A
   NE MEM = 43 ; %S = 100
   SE MEM = 27 ; %S = 100
   SW MEM = 3 ; %S = 100
   NW MEM = 29 ; %V = 100
   BEST-IN-WEST = 100

ENCLAVE B
   NE MEM = 24 ; %V = 100
   SE MEM = 0 ; %· = 100
   SW MEM = 27 ; %h = 100
   NW MEM = 10 ; %S = 100
   SEVEX = 100

```
            X X X
            X S X                    X X        LOWER SEG TEM
            X S X                    X X
            X S X                    X X        NE % S = 100
          X X S X                    X X        SE % S = 0
          X S S X                    X X        SW % S = 0
          X S S X              X X              NW % S = 100
        X X S S X X X X X X X X
        X S S S S S S S S X X
        X S S S S S S S S X
      X X S S S S S S S X X
      X S S S S S S S S S X
      X S S S S S S S S S X
      X S S S S S S S S S X
      X S S S S S S S S S X
      . . . . S S S S . . . X
            . . . A h h h . . .
      . . . . . . . . . . .
```

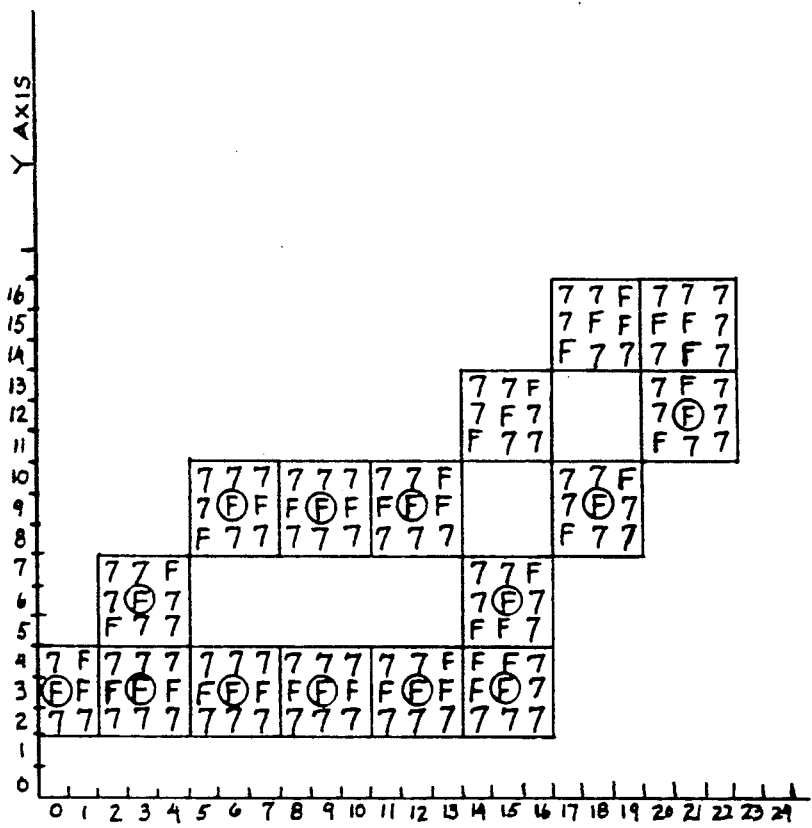
FIG 20B
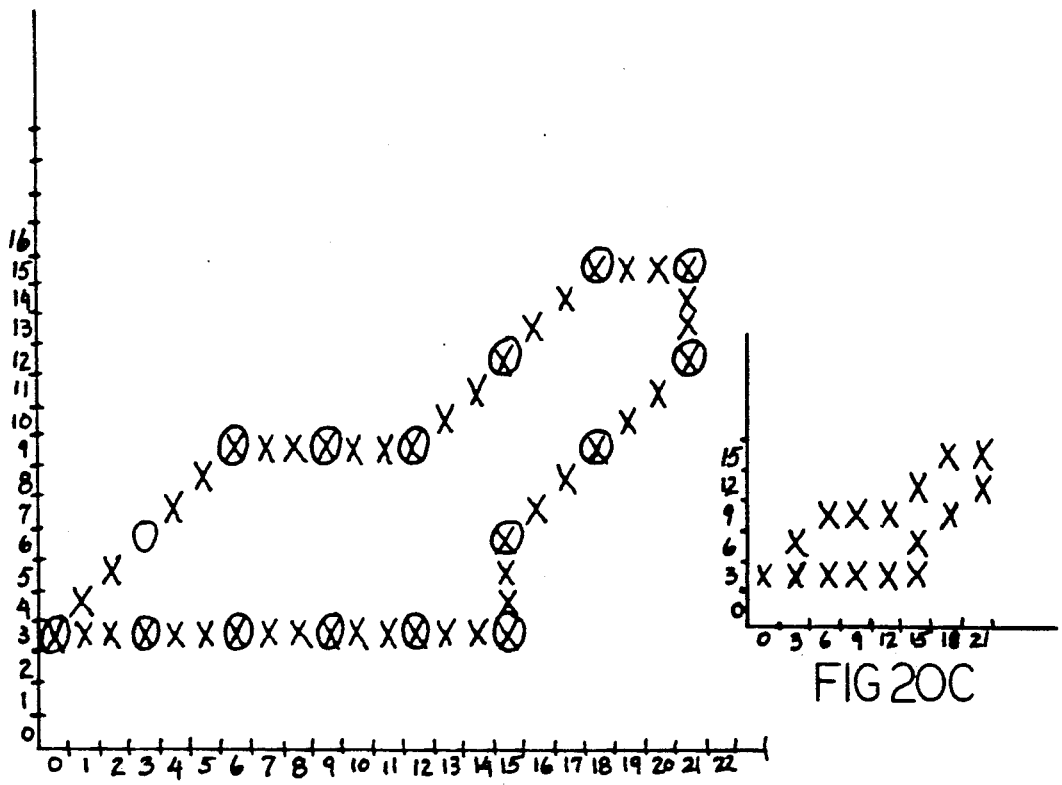
FIG 20C
FIG 20D

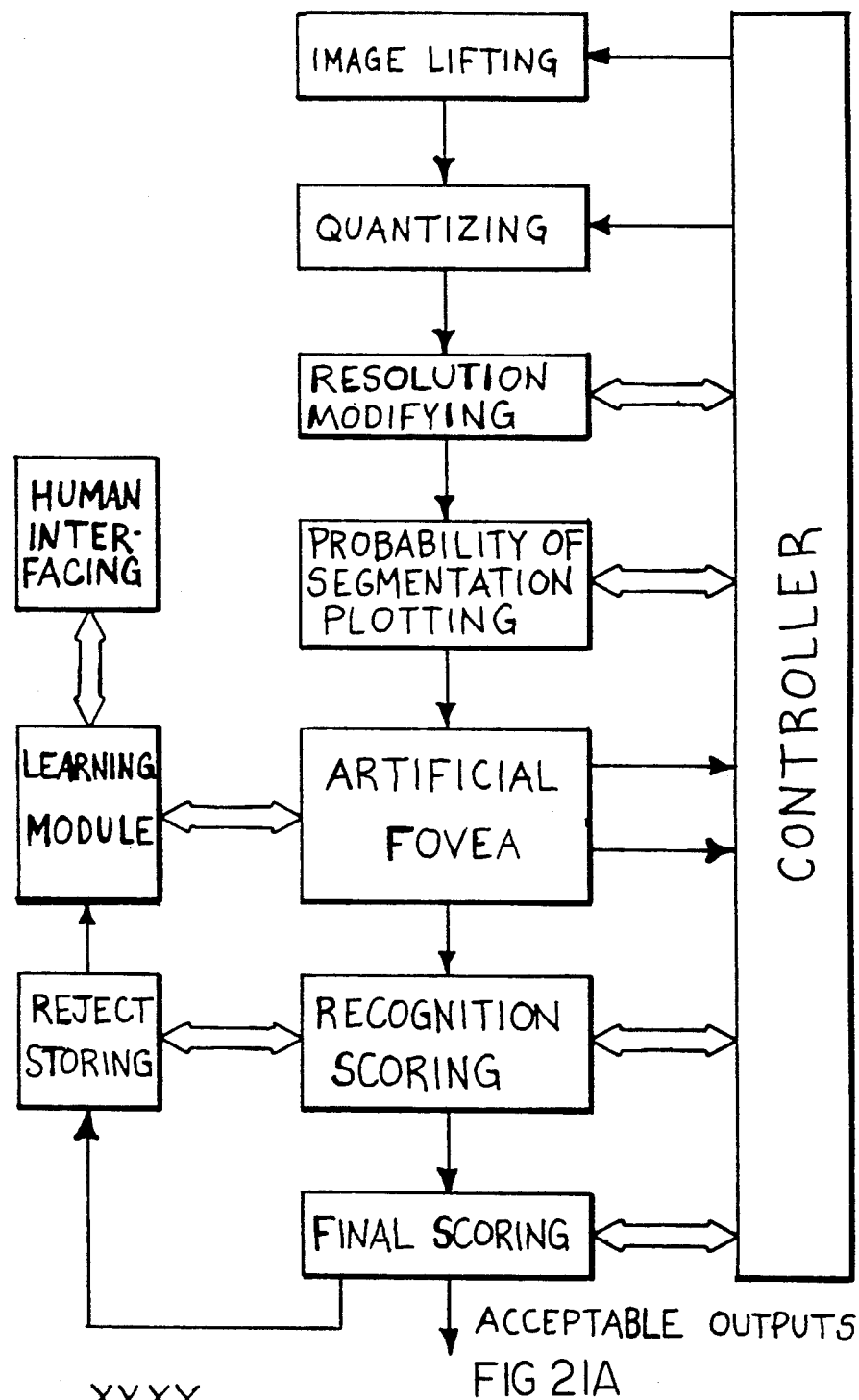
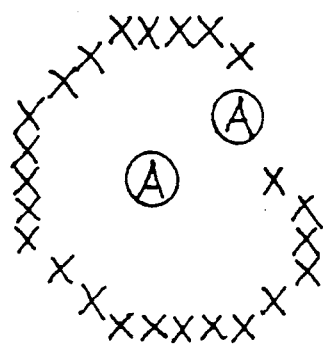
FIG 21A
FIG 21B

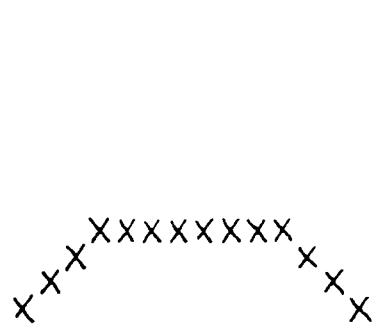
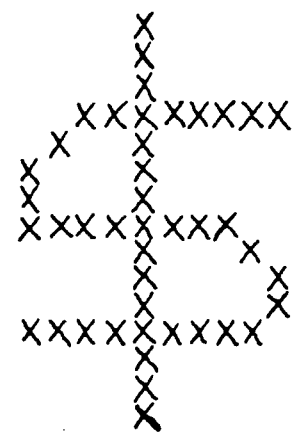
FIG 22A　　　　　FIG 22B
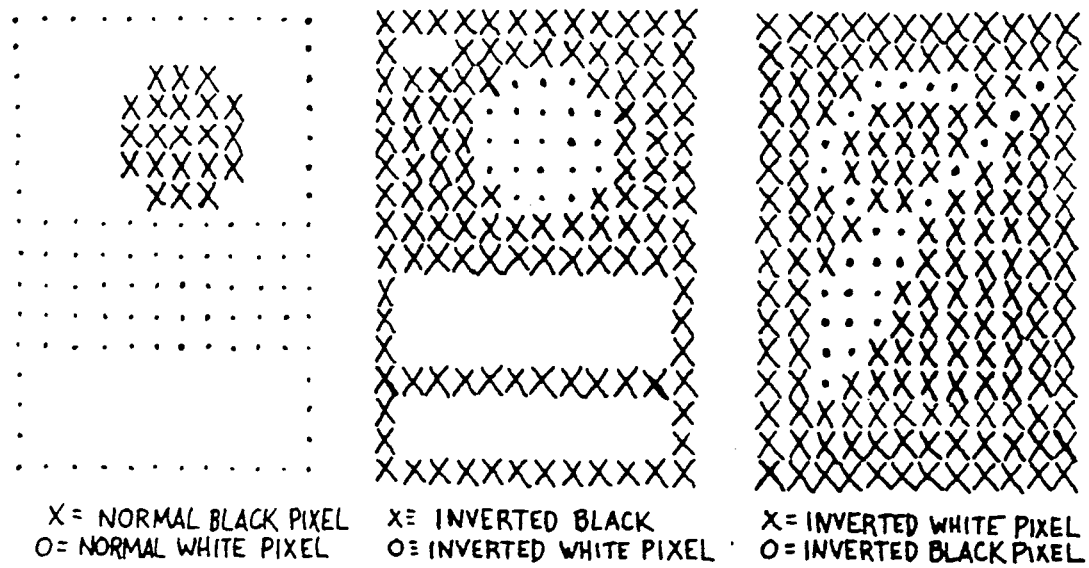
X = NORMAL BLACK PIXEL　　X = INVERTED BLACK　　X = INVERTED WHITE PIXEL
O = NORMAL WHITE PIXEL　　O = INVERTED WHITE PIXEL　　O = INVERTED BLACK PIXEL
FIG 24A　　　　FIG 24B　　　　FIG 24C
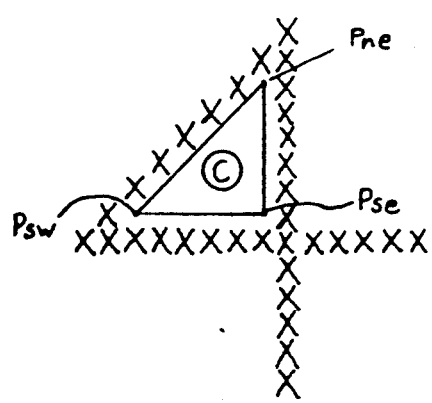
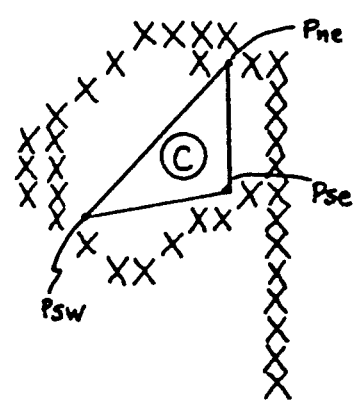
FIG 23A　　　　　FIG 23B

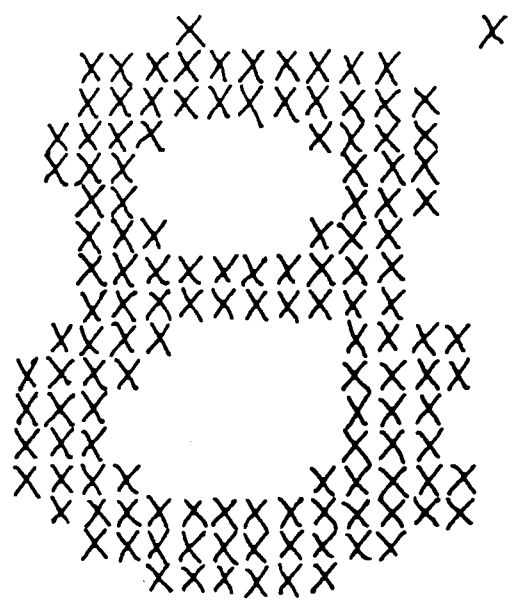
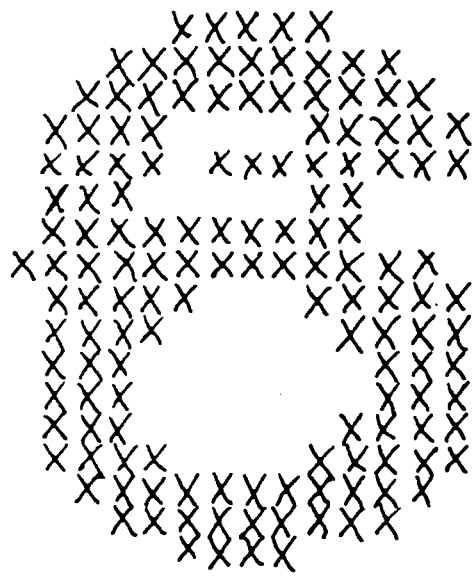
FIG 28
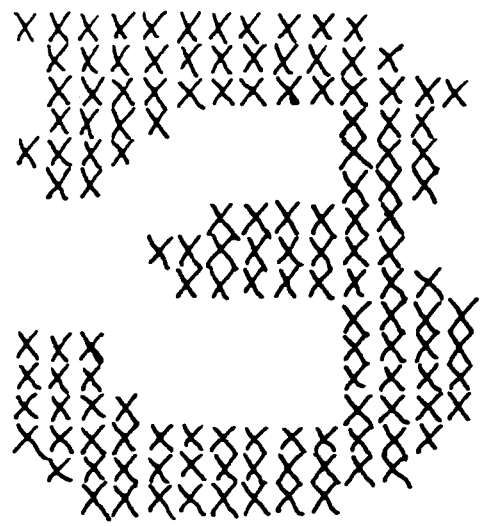

METHOD AND APPARATUS FOR PROCESSING BANK CHECKS, DRAFTS AND LIKE FINANCIAL DOCUMENTS

This application is a continuation-in-part of U.S. application Ser. No. 07/026,817 filed 3/17/87, now abandoned.

BACKGROUND OF THE INVENTION

The present invention relates generally to character and pattern recognition machines and methods, and more particularly, to feature extraction systems for use with optical readers for reading characters which have been hand printed without any constraints, such as, surrounding box limits, red center lines, or similar artifical devices. One novel feature of this invention is in the method of choosing the features and the highly normalized method of measuring the individual feature parameters. The invention can be said to perform a crude simulation of a little known psychological phenomenon occuring in primates called the "saccadic flick".

The present invention also relates generally to bank check, drafts and like financial document processing machines and method incorporating character and pattern recognition systems and, more particularly, to systems for reading numeric characters and symbols (e.g., "xx", fraction lines, etc.) and recognizing dollars and cents in the courtesy amount field (CAF) of a bank check, draft and like business documents and which have been typed or printed, particularly hand printed without any constraints, such as surrounding box limits, red center lines, or similar artificial devices.

While there are generally different views on the definition of the features of patterns, many studies made on the recognition of characters as well as the recognition of patterns have proved that the so-called quasi-topological features of a character or pattern such as the concavity, loop, and connectivity are very important for the recognition. To date, many different methods have been proposed for the purpose of extracting such quasi-phasic features. Up until this invention these methods all use analysis of the progressive slopes of the black pixels. Mori et al. U.S. Pat No. 4,468,808 classifies those analyses into three types. The first is the pattern contour tracking system developed by Grenias with IBM. Mori calls this a serial system. The second type is Mori's preferred, the earliest patented example of which is Holt called the "Watchbird". In this type of analysis sequential rows and columns are compared. Another example of the sequential rows and column type is Holt's Center Referrenced Using Red Line. Mori's third type is a parallel analysis system which Mori dismisses as either taking too long or costing too much. All systems involving the sequential analysis of the slope of black pixel groups suffer severely from smoothing and line thinning errors. Worse yet, they are very likely to produce substitution errors when the lines have voids or when unwanted lines touch. A comprehensive survey of prior art handprint recognition systems is found in an article by C. Y. Suen et al. entitled "Automatic Recognition of Handprinted Characters—The State of the Art", Proceeedings of the IEEE, Vol. 68, No. 4, Apr. 1980, which is incorporated herein by reference. The preferred handprint character recognition technique of this invention uses none of the methods mentioned by Suen et al. or Mori et al.

The character recognition system of the present invention, while using quasi-topological features, employs a novel method of measuring and scoring such features, resulting in great improvement in performance of the reading machine.

Briefly, the character recognition system of this invention employs measurement of the enclosure characteristics of each white pixel independently of other white pixels. Since the measurements are made in two (or more) dimensions rather than in one dimension (such as slope), the results are insensitive to first order aberations such as accidental voids, touching lines and small numbers of black pixels carrying noise only. In the preferred embodiment, no noise processing is performed at all since all forms of noise processing are done at the expense of accuracy in recognition. As used herein, a pixel is defined as an image information cell constituted by the binary states "on" and "off" or "black" and "white", respectively.

The financial document processing portion of this invention locates the courtesy amount field (CAF) bank check and then locates the division between the dollars portion of the CAF and the cents portion and then reads the dollar and cents amounts. Overlapping characters, overlapping and touching characters, symbols (e.g., "xx") "100" and characters touching the fraction line, in the CAF and treated as a character unit.

SUMMARY OF THE INVENTION

This invention has the following desirable characteristics and features:

1) It recognizes typed or printed, especially hand-printed numeric characters and symbols ("xx", fraction lines, etc), in the courtesy amount field (CAF) of a bank check, draft, for example, regardless of their absolute size, except when the size or relative size of the enclaves is necessary for discrimination between classes.

2) The invention recognizes numeric characters and symbols (e.g., "xx", fraction lines, etc.) in the CAF essentially independently of small variations in line thickness, independently of small voids, and independently of small numbers of extraneous black pixels in and around the character; this is accomplished because the recognition algorithm is based on the normalized number of white cells within the enclave bounds, but not on the easily poisoned curvature of the black lines.

3) The invention is able to pick out well known numeric characters and symbols from an image which includes a great many patterns of types not previously taught to the machine: this is accomplished because the measurements of unknown enclaves must have high correlation with previously taught enclaves before they are even considered.

4) It is able to achieve a substitution rate (the percentage of wrongly chosen class names divided by the number of class names correctly chosen by a human judge working from only the same images) of zero and thus it is particularly useful where bank check and similar documents are being processed. This remarkable characteristic is accomplished because the recognition algorithm uniquely allows for continuous linear scoring and comparison throughout all correlations. This characteristic is to be stringently observed as being specifically different from all forms of decision making in which choices are made on a yes/no basis; all forms of tree-based logical recognition methods have the inherent Achilles heel of making an absolutely wrong decision with absolute certainty. This is often caused by an insignificant variation in the large pattern.

5) Another great advantage of this invention is that it is able to judge the acceptability of numeric characters and symbols on the basis of comparisons to an absolute Minimum Acceptable Level (MAL) and also to a Minimum Doubles Ratio (MDR). These virtues again spring from the linear scores which are continuously generated. These capabilities provide great advantage because they allow the machine ( or the operator) to vary the acceptability criteria depending on context, character set, quality of images, etc. in the case of bank checks, for example.

6) Furthermore, the numeric character recognition system of this invention id adaptive in the sense that it can learn the names of previously unknown patterns and automatically generate new enclaves and new recognition equations which are carefully crafted to be non-conflicting with previously learned patters. Typically the bank's manual operator will provide a correct classification for a rejected character; non-supervised learning can also take plate, e.g., learning using an automatic dictionary.

7) With respect to handprinted numeric characters and symbols, one of the most important characteristics of my invention is its ability to recognize touching and overlapping characters. This has been, up until now, and impossible task for any handprint reader. This is accomplished by two methods, which can be mutually supportive in their decision. The first is the use of "test segmentation and analysis". The second method is by the use of "superclass" training, e.g. "three" touching a "four", for example is trained to be recognized as a new class called a "three-four". Likewise a blob in which a "one" touches a "zero" which in turn overlaps a "nine", for example, is recognized as the class', "one-zero-nine". In bank checks, the cents amount frequently is written as a fraction with arabic numerals denoting cents above a line or slash "/" and "100" indicating units or $1, e.g. XX/100. According to the invention, the decimal point line or slash is located and the "100" below the line is ignored (in many instances the maker may simply not write out "100" e.g. "xx/".

BRIEF DESCRIPTION OF THE DRAWINGS

The above and other objects, advantages and features of the invention will become more apparent when considered with the accompanying drawings wherein:

FIG. 12 is a Table of Recognition equations, showing typical negations and typical relative position requirements.

FIGS. 13A.1-A.4 illustrates Progressive Samples of Membership Qualification in a Generic Character, FIGS. 13B.1-13B.3 illustrates Progressive Samples of Membership Qualification in a character with voids, FIG. 14D illustrates the scoring pattern for FIG. 14A, FIG. 14E illustrates the scoring pattern for FIG. 11B, FIGS. 15A and 15B illustrate Examples of Characters with extra black pixels that would fail to be recognized by line tracking methods, FIGS. 16A-16E illustrate Examples of Other Characters which can be recognized, such as widely varying size, FIGS. 17A-17K illustrate recognition of Touching and Overlapping Characters in accordance with the invention.

FIG. 20B illustrates Examples of Resolution Considerations, FIG. 20C illustrates reduction and quantization of FIG. 17B by 3×3, FIG. 20D illustrates a quantization of FIG. 17B with no reduction, FIG. 21A is a block diagram of a recognition system incorporating the invention and utilizing a learning module, FIG. 21B illustrates Learning Capabilities using a zero with an opening.

FIGS. 22A and 22B illustrate Capabilities for Rejecting Nonsense Shapes and Disorderly Noise, FIGS. 23A and 23B illustrate the analysis of pointyness triangles for closed top "4" and a well formed "9", FIGS. 24A, 24B and 24C, illustrate a "period" in black white, inverse, black white "period" and inverse display of a blob eight, respectively, FIG. 28 is a font from the standardized OCR-A.

DESCRIPTION OF THE PREFERRED EMBODIMENTS

Figure 1A:
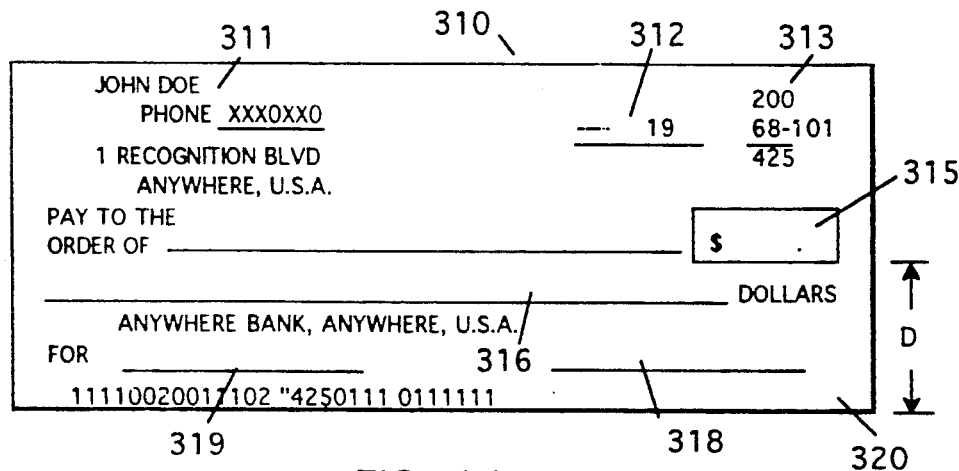
FIG. 1A is a typical bank check which can be processed by the present invention.

The present invention will now be described in greater detail with reference to the illustrated embodiments.

FIG. 1 is a plan view of a conventional bank check or draft 310 having the usual areas for the printed name and address of the maker 311, date 312, check number 313, which may be printed with magnetic ink in a machine readable format, "pay-to-the-order" of line 314, courtesy amount field 315 wherein the amount of the check is entered by the maker in arabic numerals (e.g. numeric characters), the written or spelled amount line 316 on which the amount of the check is written or spelled in alphabetical characters, for "for" portion 317 which serves as a memo to the maker, and a signature portion 318 for signature of the maker. A line of machine readable magnetic ink character recognition (MICR) encoded characters 319 is provided which is preprinted on the check in magnetic ink which show the bank and branch number, the "on-us" characters, and the maker's account number. In addition, the line of MICR characters may also include the check number in machine readable format on the same line as the other MICR characters. A blank space 320 is provided for later entry of machine readable MICR characters of the amount which may be hand written or formed by machine typed in portions 315 and 316, and which are to be read by the numeric character reading system disclosed earlier herein.

In current bank check/draft processing systems, large numbers of people are required to read the written or spelled amount field 316 and/or the courtesy amount field 315 and operate a keyboard entry device for entering the machine readable MICR characters for printing in a machine readable format along with the other MICR characters in the blank space 320 along with the rest of the line MICR characters 319.

Figure 2A:
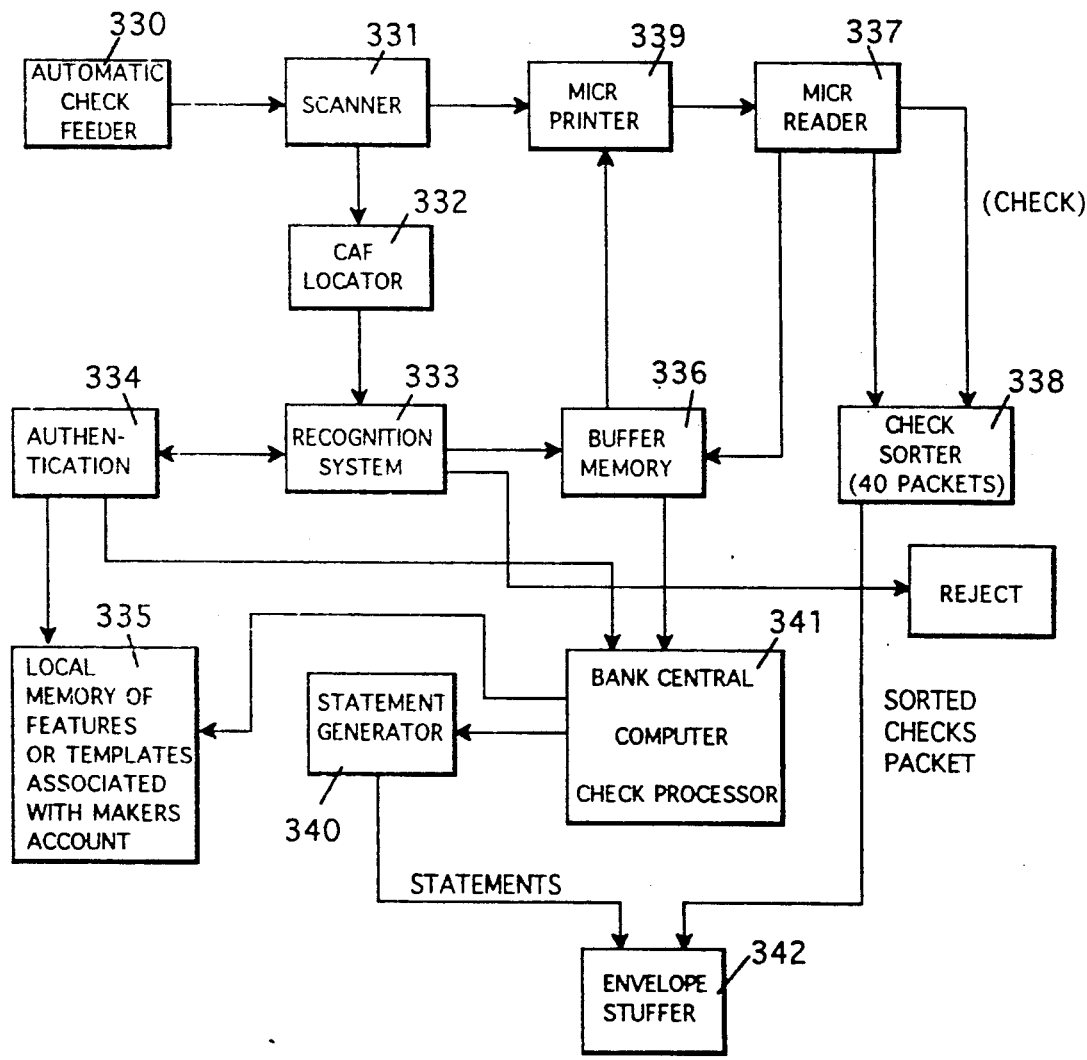
FIG. 2A is a block diagram of a bank check processing system incorporating the invention.

FIG. 2A is a block diagram of an automatic check reading system incorporated in a bank check processing system according to this invention. In the bank check processing system shown in FIG. 2A, an automatic check feeder 330 feeds checks in a predetermined orientation from a hopper, magazine or other mechanical check storage system (not shown) to a scanner 331. Scanner 331 lifts off the courtesy amount field 315 as well as any other field of interest which is desired to be read. A courtesy amount field locator 332 generates a high probability of the coordinates of where to focus the reader's attention and may use the dollar sign or symbol ($) shown to the left of courtesy amount recognition field 315, fluorescent background (as shown in the art), coordinates systems or a dimension system where the measurements of the box or rectangle is taken and utilized to locate the particular field. It is to be understood that numeric characters in the CAF may extend outside box 315 and still be read according to the invention. The CAF locator causes the characters which are scanned and lifted off of the courtesy amount recognition field 315 to be supplied to the recognition system 333 and constitutes the pattern input of pattern source 10 of FIG. 3. The handprint recognition system passes the features or templates extracted from the characters in the courtesy amount field 315 to authentication unit 334 which compares these features or templates with features or templates uniquely associated with the maker's account and stored in a local memory 335. The local memory 335 stores features or templates associated with each maker's account number and it stores this filtered information (which could be a joint or multiple party account with features of all parties stored. It constitutes in effect a template histogram of features associated with the maker's account. Thus, the particular way that maker makes his zeros, ones, twos, threes, etc. . . is stored in local memory 335 and associated with the maker's account number. Thus, the system automatically verifies the handwriting of the maker. Instead of being a local memory of features of templates (described more fully hereafter) associated with the maker's handwriting, this local memory could just as well be, a storage of the type of font typewriter or other implement used for printing a check 310 which is known to be located in the offices of the maker. Thus, if desired, the local memory or features or templates 335 provides an easily adaptable system for validating each of the maker's checks automatically. The advantage of this is that most counterfeiters or those seeking to pass off checks of others will trace a signature for another check of the maker without sufficient due regard to the manner in which the maker may write certain characters which have their features or templates stored in the local memory 335. Rejected checks are stored in reject hopper 370 for manual processing, and the machine learning phase to establish the local memory 335, for example. If none of the characters are rejected the information from the handprint recognition system is supplied to buffer memory 336 which supplies the information to drive microprinter 339 which prints the courtesy amount in machine readable form in space provided in the lower right-hand corner below the signature line for the maker. At the same time, the buffer memory 336 puts a header onto this data which is then supplied to the bank's central computer check processor. In this embodiment, the check is then passed from the MICR printer 339 to the MICR reader 337 which reads all of the MICR imprinted or all of the machine readable characters on the bottom of the check and feeds this information to the bank's central computer check processor 341 and also feeds this information to the check sorter 338. The check is also transported by the transport mechanism to the check sorter 338 where the check is sorted into pockets and, if so equipped, into numerical order. The central bank computer check processor 341 has a mass memory system which contains all of the data relating to all of the accounts of that particular bank and its customers. Each check therefor is processed by the bank's central computer check processor 341 to debit checks or credit deposits to the maker's account and produce a statement in statement generator 341 which is transported to envelope stuffer 342.

It will be appreciated that in some systems, the lift off of various fields on a check may be done in such a way that a reconstruction thereof is printed out in the manner of a bank statement without need of returning cancelled the checks to the maker. Such a system therefor eliminates the need of returning the cancelled checks to the user. Even though the courtesy amount field is read by the handprint recognition system 333, with an imprinting on the check of the courtesy amount field in machine readable characters, it is possible that there is no need to imprint that amount on the check since the reader of this invention takes the place and performs the function of the MICR characters for the courtesy amount field. In many cases however, it is desirable to imprint the MICR characters of the courtesy amount field in the space so provided because the check typically will be sent on to other banking institutions where the check will be machine processed without intervention of any human.

Thus, the present invention solves the problem of manually reading or "eye-balling" the bulk checks individually at the receiving or initial receiving banking institution as is required by the Federal Reserve Banking System. The handprint recognition system 330 described earlier herein is capable of a less than human substitution rate which is highly advantageous since substitutional errors can be most damaging to the bank involved.

There is a vast variety of unconstrained writing of the dollar and cents amount in the courtesy amount field of a bank check.

In some cases the dollar amount shows a "6" and a "1" with a small tail at the base of the "1" and the cents amount may have two zeros "0", "0" over a line and two X's below the line to symbolize "100". In the upper part of the "3" is not clear and indicates that a greater degree of resolution in the scanner is needed so this check may be rejected. Similarly, when the CAF is unreadable and is thus rejected. Still in other cases the zero in the "cents" portion is "open" in the upper left quadrant and would be rejected because of the uncertainty. In some accounts two X's are placed above and below the line, respectively, to symbolize "zero" cents. In the learning phase, the local memory bank 335 of memory features or templates associated with that particular account be trained to recognize this as a "zero cents" symbol for that particular account, along with other numeral writing peculiarities of the holder of that particular account. Recognition of the line is one criteria for separating the dollar amount from the cents amount. Other hand check writers use a decimal point as do most typed or printed checks. The decimal point is typically two characters from the right and after the third character from the right, and it is important to positively recognize the decimal point and whether a check is above a certain amount e.g., above $10,000.00 or $1,000.00 etc. Some check writers do not use a comma to indicate "thousands". In most (but not all) cases, the space between the last character in the dollar portion of the CAF is larger than the spacing between characters and this can also be used to segment the dollars from cents positions of the CAF.

In some cases a space is left between the dollar amount and the cents amount and the cents amount is written as two zeros connected by a line (a pseudo cursive technique used by some people). In such case, it is preferable to initially reject the check and then train the apparatus to recognize that manner of writing the dollar and cents amounts for that particular account. Some automatic check writing machines use some symbols to fill in a line before and after the dollar and cents amounts, such as a line of astericks (********) and the invention can be trained to locate the astericks to help locate specific fields.

In a number of circumstances, where the separation between characters is not clear or the check background introduces black pixels in the background, it is helpful to return to the analog image of the characters to possibly change some of the pixels from black to white and vice-versa and thus eliminate some ambiguous pixels.

Where there is a fractional character for the cents amount, the invention recognizes the line (there can be more than one line which can be horizontal or slanted (generally upwardly slanting from left to right and wipes out or ignores characters or symboles which are below the line. Moreover, by recognizing the presence of a fraction line, the need to identify location of a decimal point is obviated, as they signify essentially the same thing - namely, the cents amount of the CAF.

Figures 1B, 1C, 2B:
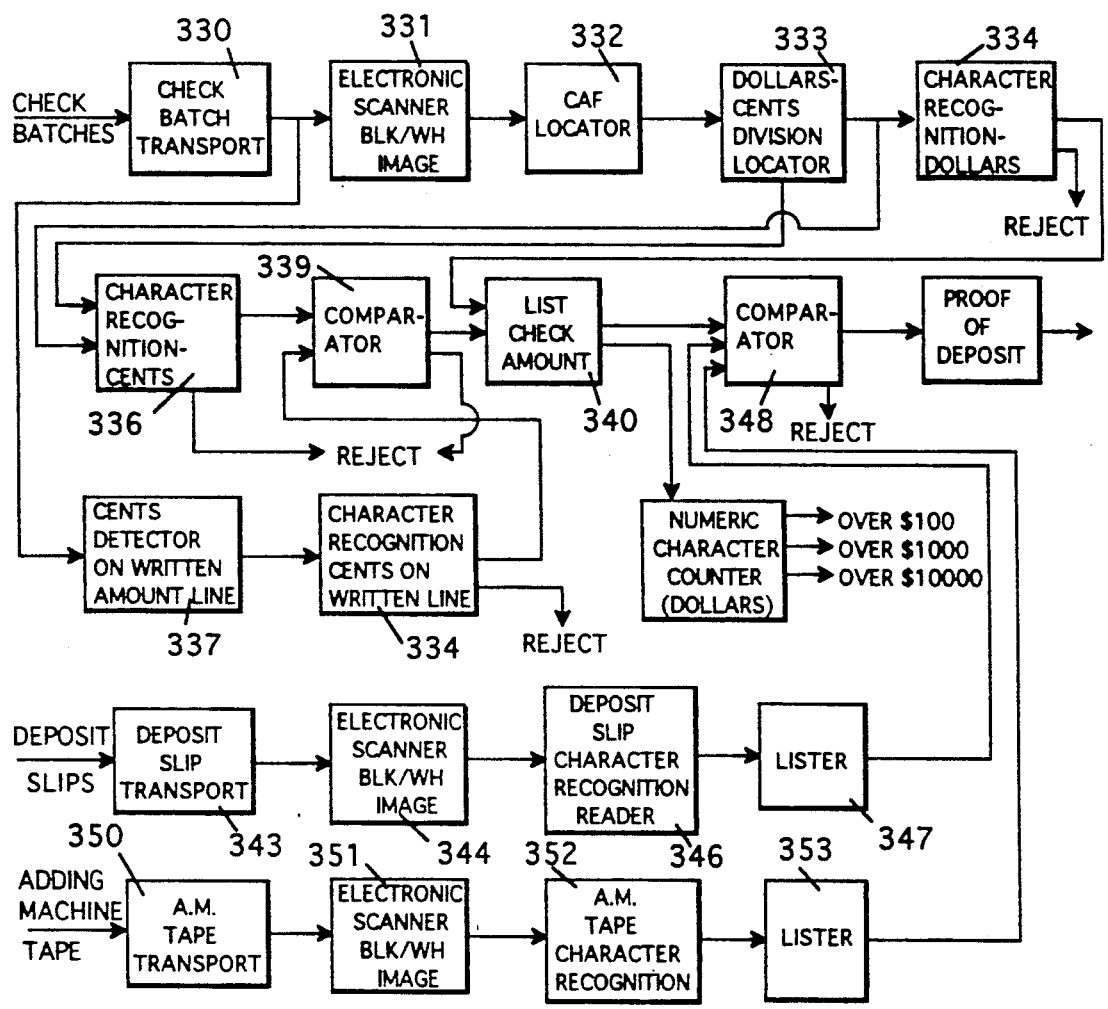
FIG. 1B is a typical deposit slip (reverse side)
FIG. 1C is a typical adding machine tape having numeric characters and symbols which can be read according to the invention.
FIG. 2B is a block diagram of a modification of the bank check processing system shown in FIG. 2A.

Referring now to FIG. 2B, check transport 330 transports batches of checks singly through the system where they are scanned and an electrical black/white image produced which is supplied to CAF locator 332 which utilizes objects in the image to locate the CAF 315. For example, the MICR characters are printed in magnetic ink and in a very standardized font and hence are easily recognized and located. The CAF is located in a predetermined portion of the check 310. CAF locator 332 may have additional inputs such as location of the bottom edge, check dimensions, etc. to facilitate locating the courtesy amount field. The CAF image is supplied to the dollars and cents division locator 360 (shown in FIG. 2C). As discussed earlier herein, there are numerous criteria useful for locating the division between dollars and cents, such as the fraction line, decimal point (which may be a comma which would be recognized using the same technique used to recognize a period (.) as a decimal point shown in FIGS. 24A and 24B). The dollars and cents division locator essentially performs a segmentation function between groups or strings of characters in the same field (CAF). Segmentation between characters is performed using the techniques shown in FIG. 17A, with the numbers of adjacent continuous path while pixels determining the degree of segmentation and the ratio of such paths between the last time character and the next character (or decimal point) may be uses a criteria in the dollar and cents division locator 452 (FIG. 2C).

Figure 2C:
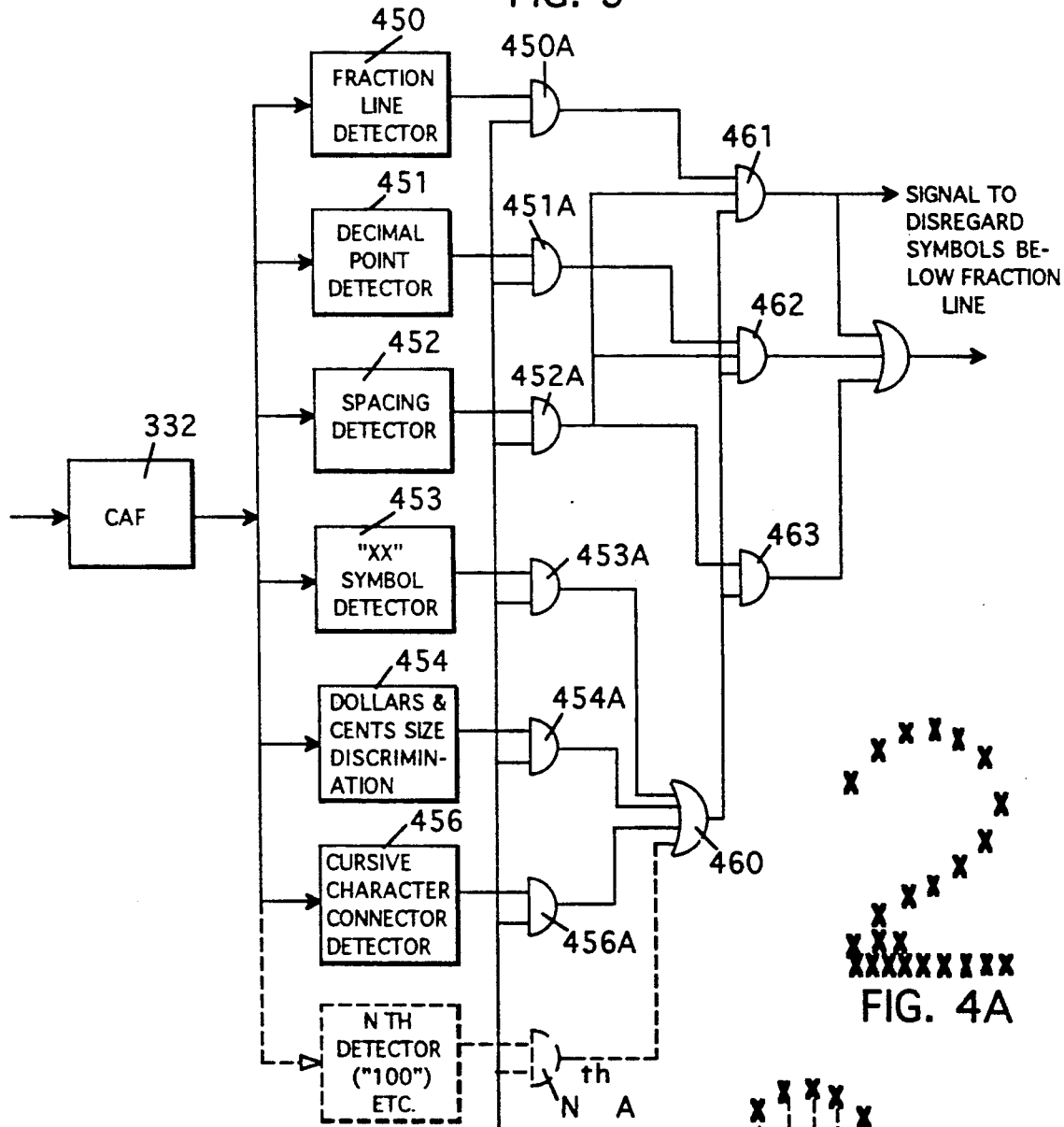
FIG. 2C is a block diagram of the dollar, cents division locator of FIG. 2C.

The division between dollars and cents locator 333 is shown in FIG. 2C. The dollar and cents division locator causes the respective dollar portion strings of characters to be delivered to character recognition dollars circuits 334 and the cents strings of character and or symbols to be delivered to the character recognition cents circuits 335.

In order to validate the "cents" portion of the CAF field, a double reading can be performed by extracting any numeric cents amounts written on the written or spelled amount line 316 (FIG. 1A). A cents detector 337 receives the digital electrical black/white image from scanner 331 and similar to technique used to locate the dollar and cents division locates the cents or fraction amount on spelled line 316. Of course, in some instances, the cents may also be spelled our (" . . . and forty cents") in which case there would be no additional validation of the cents portion of the CAF. Any numeric characters located in a predetermined portion of the right hand portion of the written or spelled line 316 may be deemed the cents portion and supplied to a character recognition unit 338 the output of which is supplied to a comparator 339 and compared with the results of the character recognition of cents characters by recognition unit 334. When a character is unreadable or there is an uncertainty or ambiguity, a signal (labeled "reject" is produced which may result in the CAF amount not being read. The dollars and cents amounts for the check batches are listed and stored in lister 340.

The check batches may optionally further be validated by comparison with the dollar and cents amounts on deposit slips and/or adding machine tapes. FIG. 16 shows a typical example of the reverse side of a deposit slip 341 with the listed checks corresponding the CAF. A typical adding machine tape 342 is shown in FIG. 1C with the corresponding CAF amounts shown therein. The deposit slip 341 will usually have the account number and other data in MICR or machine reaable format, on deposit slip 341 this would be on the reverse side. The deposit slips are transported by scanner 344 to produce an electrical black/white image and the numeric character strings 341-1, 341-2 . . . 341-n are read by deposit slip character reader 346 and listed and stored in lister 347 the output of which is compared in comparator 348 with the numeric characters from check lister 340 to validate the reading of each check's CAF amounts and since the numeric amounts in the CAF of each check can be added to validate the amount of the deposit in the proof of deposit unit 349.

The numeric amounts in the CAF as well as the numeric amounts on deposit ticket 341 may be further validated by comparisons with an adding machine tape 342. Adding machine tape 342 is conveyed by adding machine tape transport 350 through scanner 351 and the strings of printed numeric characters 342-1 . . . 342-n are read by reader 352, listed and stored in lister 353 and compared by comparator 348 against the list of numeric amounts read from the CAF of each check and the deposit ticket listings. Comparator 348 may weight the reading according to the reliability of reading machine printed characters against handprinted characters whereby any disagreement between the adding machine tape read characters and the handwritten versions, the adding machine tape reading would prevail. Thus, if the adding machine tape reading agrees with the reading of the numeric amounts read from the CAF of the checks, but disagrees with the reading from a handwritten deposit slip, for any given entry 341-1, 341-2 . . . 341-n, or 342-1, 342-2 . . . 342-n, the adding machine version would be deemed accurate and the deposit slip version rejected.

The courtesy amount field locator 332 feeds a digital image of the numeric characters and symbols in the courtesy amount field to a fraction line detector 450, a decimal point detector 451, spacing detector 452, "XX" symbol detector 453, size disconnector 454, and cursive connector detector 456. The fraction line detector 450 seeks the longest generally horizontally extending line in the right side of the CAF (and a fraction line, if found, on the written amount line 316) or to the right of any spacing. It operates on black pixels (similar to the scheme for detecting overlapping but not touching characters (FIG. 17)) by beginning with the left lower most black pixel and comparing it with its neighbor to the right and as long as there is found a contiguous black pixel adjacent and to the right, or just above on a diagonal, the comparison continues and if a predetermined number of pixels span a given horizontal path which includes the slanted fraction line which, of course, is more frequently used than a perfectly horizontal straight line. The verticality of the line, of course, has to be distinguished from the numeral "one" ("1").

A decimal point is detected by detector 451 using the techniques illustrated in FIGS. 24A and 24B. The spacing detector 452 utilizes the brush fire principle shown in FIG. 17 to locate one or more adjacent contiguous vertical sequence of white pixels between characters. The "XX" symbol detection 453 treats the XX symbol as a character to e identified, and essentially as a dyad type (twin intertwined characters) in which given corresponding templates are stored in template storage 15. Size descriminator 454 simply counts the number of vertical pixels in the last two numeric characters (either as individual characters of as a dyad) in the courtesy amount field averages them and does the same for all of the characters to the left of the last two characters in the courtesy amount field (which may be treated as a dyad or tryiad as shown in FIGS. 17A-K). If the average vertical black pixel count for the last two characters is below the average black pixel count for all numeric characters to the left of the last two characters is less than a predetermined value, it is assumed that the last two characters are cents characters. Finally, the cursive corrector detector 456 examines the upper portion only of the last two characters image to detect a generally horizontal string of black pixels and the absence of any sequentially continuous vertically running line of white pixels, which is thus deemed to supply the presence of a cursive line connector.

The logical outputs of each of the detector is suppled to AND gates 450A, 451A, 452A, 453A, 454A and 456A which are gated by a read signal combinations of these AND gate outputs may be selectively OR gated by OR gate 460 and its logical output selectively combined by a plurality of AND gates 461, 462 and 463 with certain ones of detectors 451-456. Thus for logical output on line 461-0 requires the presence of an output from fraction line detector 450, spacing detector 452 and at least one of the "XX" symbol detector 453, dollars and cents size descriminator 454 or cursive character connection detector 456. A decimal point is not required in this case to locate the division between dollars and cents. This is merely exemplary of this aspect of the invention. In some cases, the check writer merely draws a line indicating cents, and such line can be recognized as a fraction line, but if there are not characters above the line (e.g., the space is blank), it is assumed to be "00" cents. The absence of the cents indicia (fraction line, decimal point, spacing, etc.) is likewise deemed "00" cents.

Thus, the invention may utilize one of two fairly distinct methods of reading a fraction image or frame. One of them is to simply wipe out everything underneath a discovered fraction bar and then read, as a single class, single entity, everything above the bar. In other words, what is being read is a double digit numeric sitting on a bar (the fraction line). The way this is done is simply call out a character class. If a "6 2" is sitting on a bar (62 cents) then according to the invention, that is a separate character class just like a "1 0 9" is the triac as disclosed in my above-identified application, this is a separate character class. They are not the same set of character equations as it would be for a touching "2", "3", for example. This is a "2", "3" sitting on a bar and there may be several character equations necessary for that. So that is what we will call a dyatic bar.

Another totally separate way is to detect where the lowest of the bottom of the bar is and wipe out one row of black pixels from the bar then electronically cut the image remaining in half vertically so that if it is image symmetrical then the "2" is on one separate frame and the "3" sitting on a bar on another separate frame. This can be read as a single numeral sitting on a bar. In other words, not much of an effort is actually made to segment the numeral from the bar itself except the fact that this invention will wipe out a piece of the bar and everything underneath it and then make two images out of it, left and right, and then recognize them. If at that time, if it rejects, then the system will go back and wipe some more off and keep going until an acceptable character one or the other and wipe some more off the other side if it doesn't. If good numbers are not found then the system will go to the diatic sitting on the bar method. Again, the basic principle here is to have great reliance and great capability to reject numeric image that do not have good scores.

Instead of a decimal point, a dash is sometimes used and then cents numerals e.g., "2", "3". The dash is deemed the decimal point cents. Europeans also use commas instead of decimal points. Commas are a little bit bigger than decimal points and the Europeans are pretty good that way but they also, of course, use commas after the thousands. Thus, in some cases, recognition of a period can include recognition of a comma (,).

Figure 3:
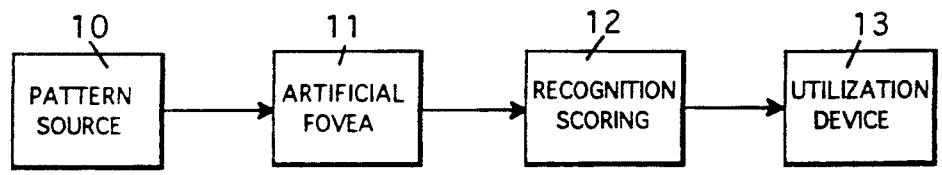
FIG. 3 is a simplified block diagram of a pattern recognition machine incorporating the invention.

FIG. 3 is a simplified block diagram of a pattern recognition machine which incorporates this invention. The arabic patterns may be from widely different kinds of sources. Such objects may be handprinted arabic numerals, or machine printed characters. It can also be taught to recognize cursive script for reading the written dollar line.

The Pattern Source 10 shown in FIG. 3 therefore represents a source of data containing a pattern to be recognized which in this case is the digitized image of the CAF of the bank check shown in FIG. 1. Since this invention is not concerned with methods of scanning original bank check patterns, the hardware per se of the pattern source in this embodiment can be some form of well known type of computer memory, such as Random Access Memory (RAM). Pattern source 10 can also be part of an on-line system such as a display tube or panels or graphic tablet wherein each resolvable element can be deemed a pixel and the movement of the stylus (or finger) on or over the tube, panel or tablet forms the character to be recognized to thereby enter an private secure account number for access to automatic teller machines and the like, for validation of the user by the user's writing style.

Block 11 shown in FIG. 3 is labeled Artificial Fovea. This block represents apparatus which emulates the behaviour of a human fovea, including temporary storage of the image, shifting of the image, measuring of image sections (called "enclaves"), and scoring of these measurements against earlier stored measurements (called "templates"). The best of these scores are called "features".

Block 12 shown in FIG. 3 is labeled Recognition Scoring. Block 12 represents apparatus which stores and evaluates a number of equations, called "Recognition Equations". These equations call for various feature values to be combined in such a way that the highest scoring equation reveals the most probable class to which the unknown image belongs.

This utilization device 13 represents a device which is an "end user" of the recognition process which, in this embodiment is the bank check processing system.

Figure 4A:
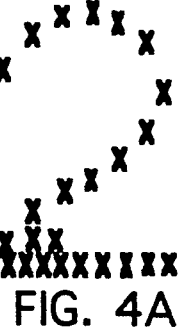
FIG. 4A is a example of a typical pattern stored in a Pattern Source.

FIG. 4A is an example of a typical pattern stored in a Pattern Source. Note that it has been shown in a two dimensional array and that the values of the pixels shown are binary, i.e., black and white. The two dimensionality and binary values are normal for most of the applications of this invention, although it is not restricted to those characteristics. The number of pixels per pattern is not to be limited to the number shown in this example; one of the great advantages of this embodiment of the invention is that the absolute size of the patterns is normalized as an inherent part of the measurements. The pattern shown is called a generic handprinted 'two' because the shape satisfies the basic requirements for a handprinted "two" without including any other extra information. Such extra information (normally confusing to analysis) consist of extra loops (at the beginning or middle of the "two"), white pixels in sections of black line pixels (voids), and extra nonconnected black pixels and variations in the width of the line forming the character. In most of the examples herein, the "line" width is shown as a single pixel but it will be appreciated that in many characters this will depend on the width of the writing implement.

Figure 4B:
FIG. 4B shows an exemplary output from an Artificial Fovea.

FIG. 4B shows an exemplary output from an Artificial Fovea. Note that the Artificial Fovea 11 has found two excellent Centers of Recognition (CORs) and has labeled them "A" and "B". It has also Labeled all the pixels belonging to Enclave No. 1 with a numeric "1". The Artificial Fovea 11 has also scored both enclaves against known templates stored in its memory. It has found that a Feature called "Best-in-West" has the best score for Enclave No. 1, and the score is 100. Similarly the Artificial Fovea 11 has found that the best score for Enclave No. 2 is developed by a feature called "Best-In-East", which also has a value of 100. Score values run between zero and 100, an enclave with a strange shape, or a pattern containing a void would have lower scores.

Figure 5:
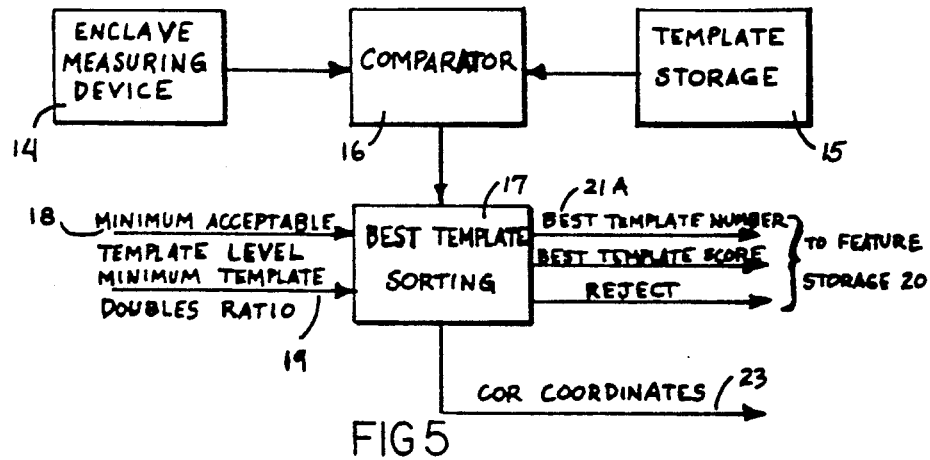
FIG. 5 is a Block Diagram of an Artifical Fovea.

FIG. 5 is a Block Diagram of an Artificial Fovea. It includes four blocks. They are an Enclave Measuring Device 14, Template Storage Device 15, Comparator 16, and Best Template Sorting Device 17.

The term "enclave", as used in this invention, means an area of white pixels which are more or less bounded by black pixels or the edge of the image. An example of an enclave is an area of white pixels surrounded by black pixels; another example is an area of white pixels bounded by black pixels except in one or more directions. Some useful enclave shapes are shown in FIG. 7.

It is important to emphasize at his juncture that almost any white area can be defined as an enclave, and that the most useful enclaves are memorized by humans and by this apparatus of my invention.

Figure 7:
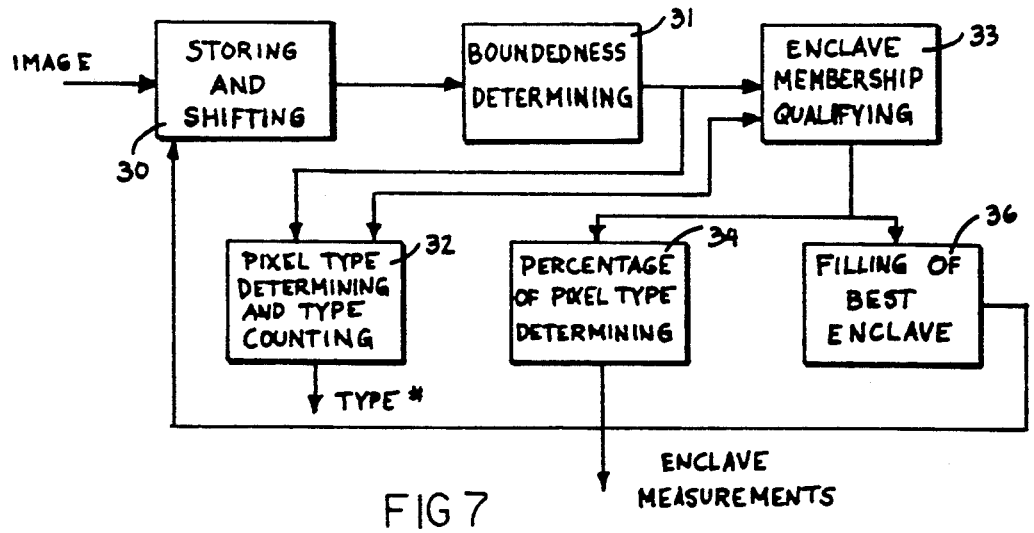
FIG. 7 is a Block Diagram of an enclave Measuring Device.

Referring again to FIG. 5, Enclave Measuring Device 14 is shown in much more detail in FIG. 7. Stated simply, enclave measuring device 14 produces a set of measurements which describe the shape of the area within the enclave. These measurements emphasize the differences between enclaves that are necessary to separate pattern classes from each other, but they "normalize" the differences between enclaves which are not necessary for separation of classes. These measurements primarily describe the positions and abundance of those white pixels which are bounded by black pixels on the edges of the enclave. In one embodiment the area of the enclave is divided into quadrants, designated NorthEast (NE), SouthEast (SE), SouthWest (SW), and NorthWest (NW). In each quadrant there are four possible pixel types: those that are not bounded (within that quadrant) by black pixels in either the vertical or horizontal direction, those those that are bounded vertically but not horizontally, those that are bounded horizontally but not vertically, and those that are bounded both horizontally and vertically.

Template Storage Device (TSD) 15 stores hundreds of selected sets of measurements for comparison at a later time with measurements taken from new and unknown enclaves. As soon as these sets are selected and stored they are known as "Templates". The physical methods used to store the Templates can be any type of memory that has reasonable access time such as RAM, ROM, magnetic disks, optical disks, etc. If the memory is dynamic or volatile, procedures must be provided to maintain the information or to reload.

Comparator 16 correlates the output of the enclave measuring device 14 with each one of the hundreds of Templates stored in the TSD 15. The result of each correlation is a score running linearly between zero and 100.

One embodiment of Comparator 16 develops its score by considering each quadrant independently; the absolute differences between the enclave measurements and the Template values are summed and normalized. The hardware used in the comparator may consist of an absolute value subtraction circuit, plus a summing mechanism and a low accuracy dividing circuit to take percentages.

Best Template Sorting Device (BTSD) 17 accepts each new score produced by Comparator 16 and stores the value of that score in a list which has been ordered by the value of the score. The identifying number of the Template is to be stored in such a way that it can be identified as belonging to each score, and the coordinates of the Center of Recognition (COR) used by the EMID 14 must likewise be associated with the score. In practice, only the scores associated with the best two Templates must be kept by the BTSD 17. When an end to the particular scoring cycle has occurred, the BTSD 17 will output the Best Template Number, the Best Template Score, and the coordinates of the Test COR which defines the winning enclave.

The concept of orderly rejection of nonsense shapes and disorderly noise is a strong feature of this invention. An important output of the BTSD 17 is the REJECT capability. In order to make intelligent rejection of test enclaves two inputs must be additionally provided to the BTSD 17; these are the Minimum Acceptable Template Level (MATL) on line 18, and the Minimum Template Doubles Ratio (MTDR) on line 19. The object of these inputs is to force the output of the BTSD to be a reject if either a) the absolute score of the best template is less than the MATL, or b) the ratio of the best score to the next best score (of another template) is less than the MTDR.

Figure 6:
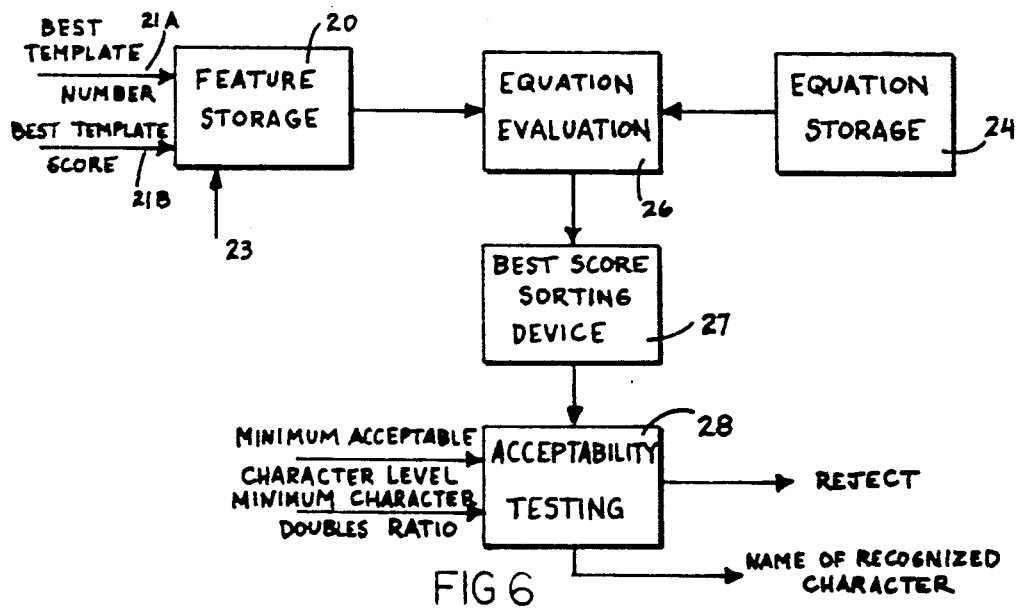
FIG. 6 is a block diagram of a Recognition Scoring Device.

FIG. 6 shows a block diagram of a Recognition Scoring Device. Its purpose is to perform the second and final stage of recognition of individual patterns. It does this by using the feature scores to evaluate the character equations, sorting the resulting equation scores, and performing acceptability testing.

With reference to FIG. 6, Feature Storage Unit 20 stores the information provided by the operations of the artificial fovea shown in FIG. 5. This information consists of a set of data describing the best correlation or the best template number on line 21-A obtained for each of a plurality of enclaves within the image; the set also includes the Best Template Score inputted on line 21-B for each of the winning scores and a short description of the location of each enclave, in the form of the COR coordinates on line 23, with respect to the other enclaves. Physically the Feature Storage 20 comprises a digital memory which has an access time reasonably matching the speed requirements of the system.

Equation Storage Unit 24 stores recognition equations which have been developed by previous human analysis and machine experience. According to the invention. These recognition equations typically are the sums of terms. Each term consists of feature. The memory or storage hardware hardware performing Equation Storage Unit 24 is similar to the hardware chosen for the Feature Storage Unit 20.

Equation Evaluation Device 26 performs the additions, subtractions, multiplications, and divisions which are called out by the recognition equations stored in the equation Storage 24. It must also perform any logical operations called out by the equations, such as relative location requirements. Physically, the Equation Evaluation Device 26 is preferrably a set of dedicated hardware chips which perform high speed arithmetic and logical functions. It may also consist of a fairly general purpose computer chip.

The Best Score Sorting Device 27 and the Acceptability Testing Device 28 are almost exactly similar in function to the Best Template Sorting Device 17 shown in FIG. 5. It's output consists of the name of a recognized character if the acceptability criteria (minimum acceptable character level and minimum character doubles ratio) are passed; if the criteria are not passed, a REJECT code is produced.

FIG. 7 is a Block Diagram of an Enclave Measuring Device 14 shown in FIG. 2. Storing and Shifting (S&S) device 30 accepts a pattern or image from the Pattern Source 10 shown in FIG. 3. This pattern may be transferred from Pattern Source 10 either by any one of several parallel information transfers or serially, pixel by pixel. Note that at this point in the processing the pixels have only two states or "colors": black and white, "on" or "off", "1" or "0". Because the pattern will be shifted often during the operation of the Artificial Fovea it will be convenient to have the pattern loaded into the S&S Unit 30 using a serial method. The S&S Unit 30 provides information directly to almost all of the other blocks in FIG. 7. The pattern is initially shifted so that a white pixel falls right on the center of the storage area of the S&S Unit 30. This center of the storage area is abbreviated CSA.

Element 31 is a Boundedness Determining Unit. The meaning of "boundedness" in this invention is that each white pixel is called "bounded" if any black pixel exists in the same row or column at a distance further away from the Center of the Storage Area (CSA) than the location of the white pixel. A pixel may be bounded vertically only, horizontally only, or bounded both vertically and horizontally. It will be appreciated that the states may be inverted wherein a white pixel becomes a black pixel and a black pixel becomes a white pixel.

Pixel Type Determining and Type Counting Unit 32 performs the functions of labeling each of the pixels with labels describing their boundedness characteristics, and then counting the absolute number of pixels of each different type. For nomenclature purposes, the area around the CSA is divided into quadrants named NorthEast, SouthEast, SouthWest, and NorthWest (see FIG. 8A). There are four types of pixel in each quadrant, so the total number of descriptors per enclave is 4 types time 4 quadrants, making 16 descriptors.

Enclave Membership Qualifying Unit 33 specifies, according to specific rules, which of the white pixels surrounding the CSA are to be included as belonging to an enclave. This block performs this qualification primarily by using information obtained from the Boundedness Determining operation of unit 31.

Percentage of Pixel Type Determining Unit 34 performs a simple low accuracy (1%) division procedure in which the absolute number of each pixel type in each quadrant is multiplied by 100 and divided by the number of enclave members in that quadrant. These percentages are, in fact, the enclave measurements.

Finally, Filling of Best Enclave Unit 36 performs a function which occurs after final determination of which enclave best matches a stored template, as described in FIG. 5. This operation shifts in codes to the storage matrix 30 which are stored along with the color (black or white) of the pixel. These codes will prevent each pixel thus coded from becoming a member of another enclave.

Figure 8A:
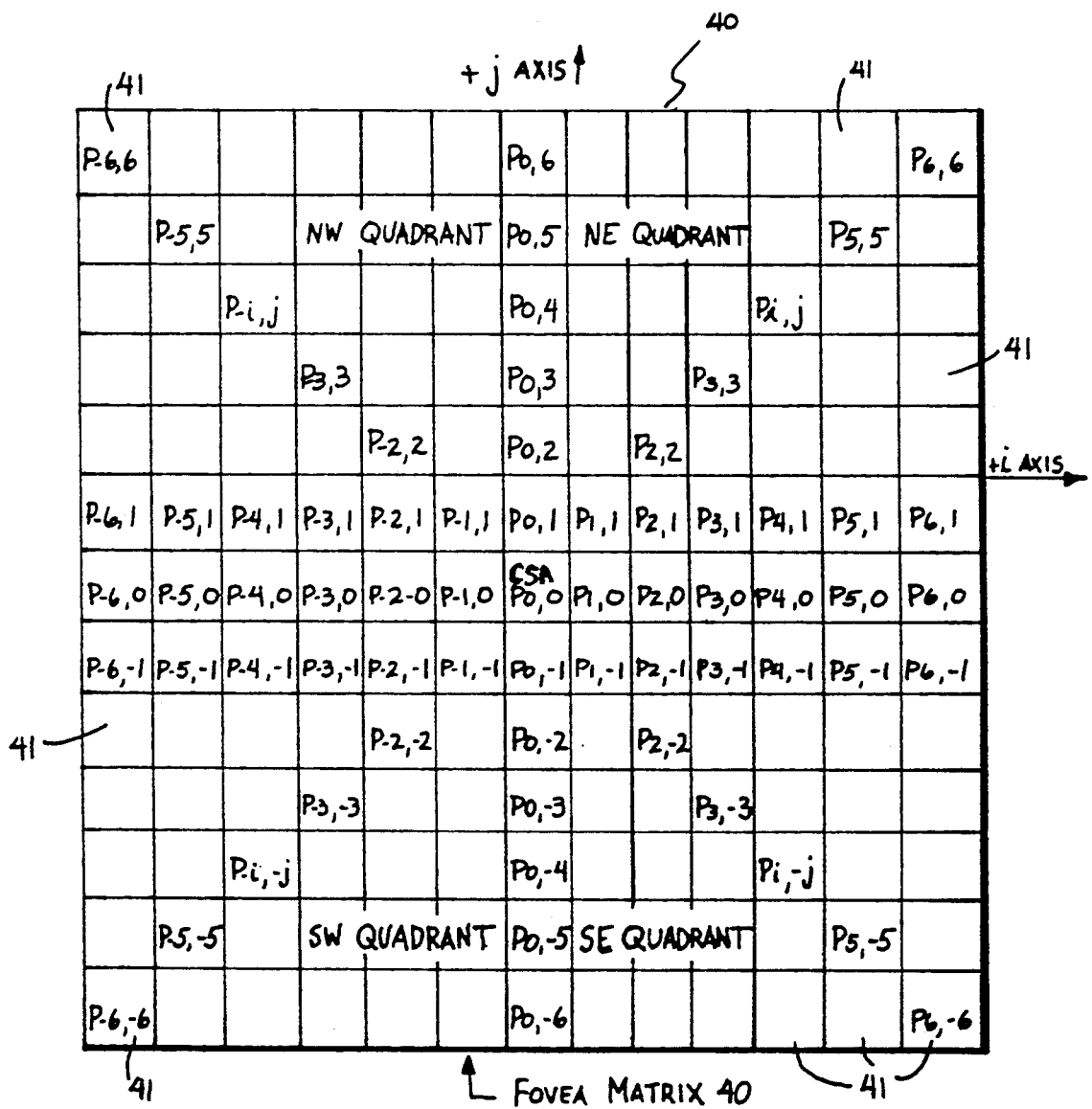
FIG. 8A is a diagram showing the Foves Matrix, which contains specific circuitry capable of performing most of the functions of an Enclave Measuring Device.

FIG. 8A is illustrates a Fovea Matrix. It shows a preferred embodiment of most of the functions of an Artificial Fovea. FIG. 8B, FIG. 8C, FIG. 8D and FIG. 8E contain additional details of the embodiment.

The Fovea Matrix 40 shown in FIG. 8A is a 13 by 13 square array of elements called "Polyps". The exact number of Polyps 41 may vary from application to application and is only critical in the sense that the number of polyps be greater than any enclave which is necessary to be measured in a given application. The odd number of polyps on each edge is significant only because an odd number yields a central symmetry about both the vertical and horizontal axes. The system chosen to number the Polyps is one which labels all quadrants symmetrically, except for minus signs. Thus, the central Polyp is labeled P00, the furthest NE Polyp is labeled P66, the furthest SE Polyp is labeled P6,−6; the furthest SE Polyp is labeled P−6,−6; and the furthest NW Polyp is labeled P−6,6.

Figure 8B:
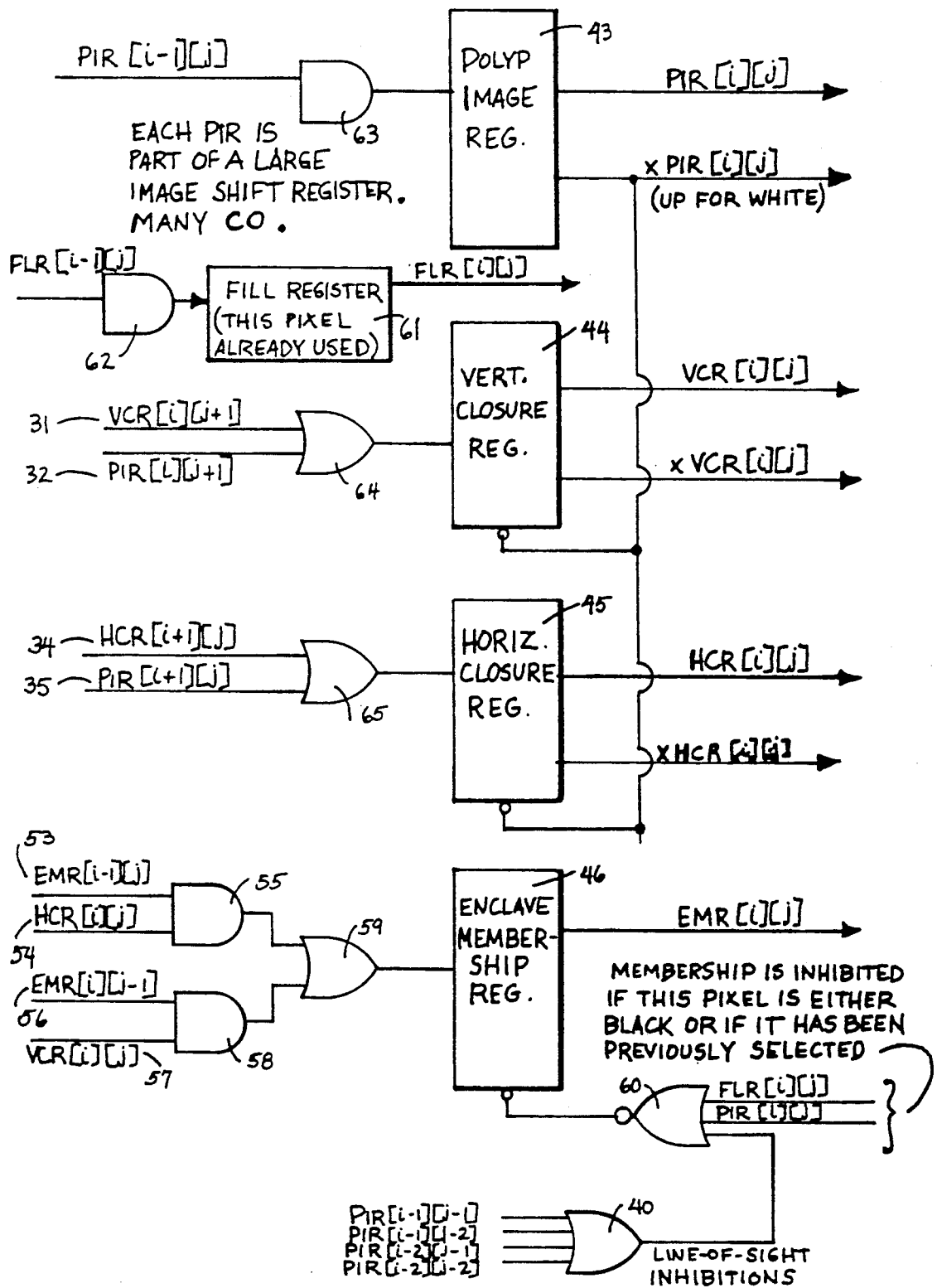
FIG. 8B is a circuit diagram showing a single Polyp In the Northeast Quadrant, a "Polyp" being defined as one element in the Fovea Matrix.
Figures 8C, 8D:
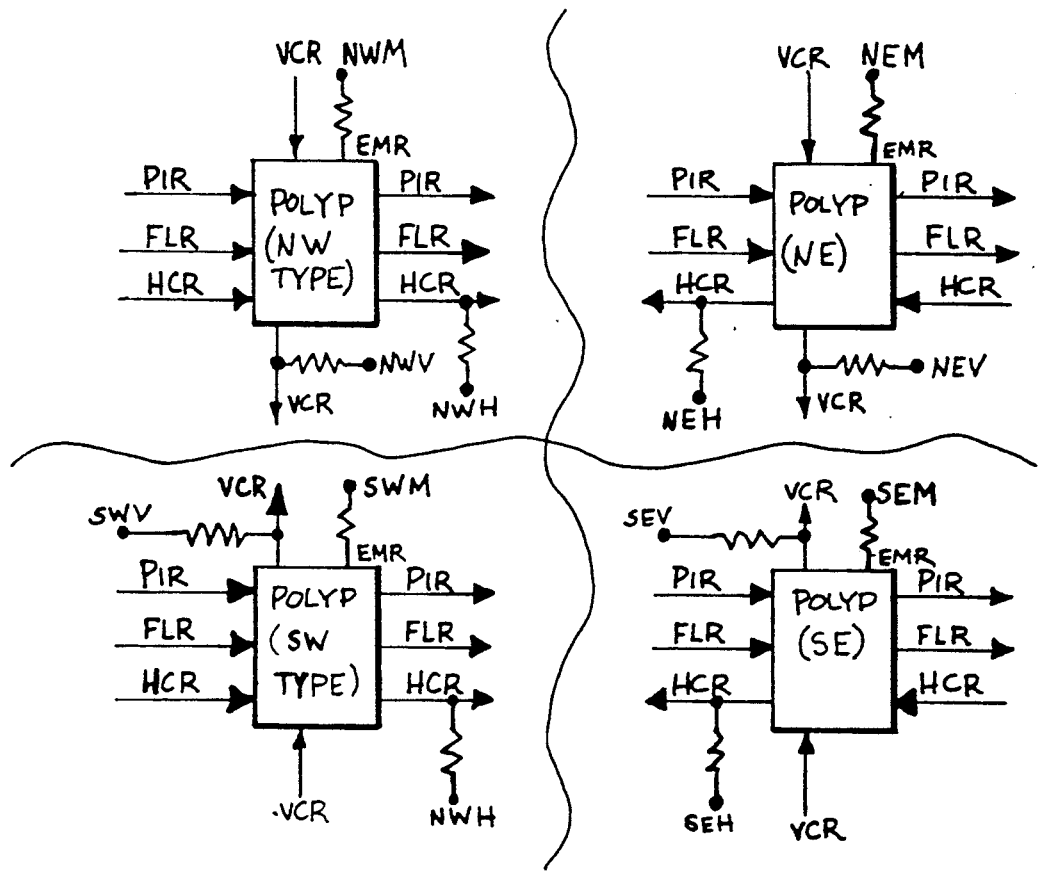
FIG. 8C is a Table showing how the names of the gate functions of FIG. 8A are modified for Polyps appearing in other quadrants.
FIG. 8D is a Diagram showing a Single Typical Polyp In Each Quadrant.

FIG. 8B is called "Polyp in NE Quadrant". This figure illustrates actual logical electronic circuitry which will perform many of the complex functions required of an Artificial Fovea. This figure describes the circuitry that every Polyp in the NE Quadrant will contain. (With some sign changes shown in FIG. 8C), this circuitry will also apply to the Polyps of all other quadrants.) The numbering of the Polyps is important to the understanding of the operations. The generalized NE Polyp of FIG. 8D is labeled Pi, j; the subscript "i" stands for the number of the vertical column of which the Polyp is a member, and the subscript "j" is the number of the horizontal row. This numbering system is consistent with the Pi,j elements shown in FIG. 8A.

FIG. 8B contains 5 groups of circuits which are closely related to the blocks shown in FIG. 7. The first group is labeled "Polyp Image register" 43, and its function is to perform the storage and shifting functions (S&S) of the Fovea Matrix described earlier. The second and third groups perform the "Boundedness Determining" described in connection with FIG. 7. The fourth group performs the qualification of enclave membership for that Polyp and also stores the membership status. The fifth group (called the "Fill Register") stores a binary one if that Polyp has been previously selected as part of an enclave.

Figure 8E:
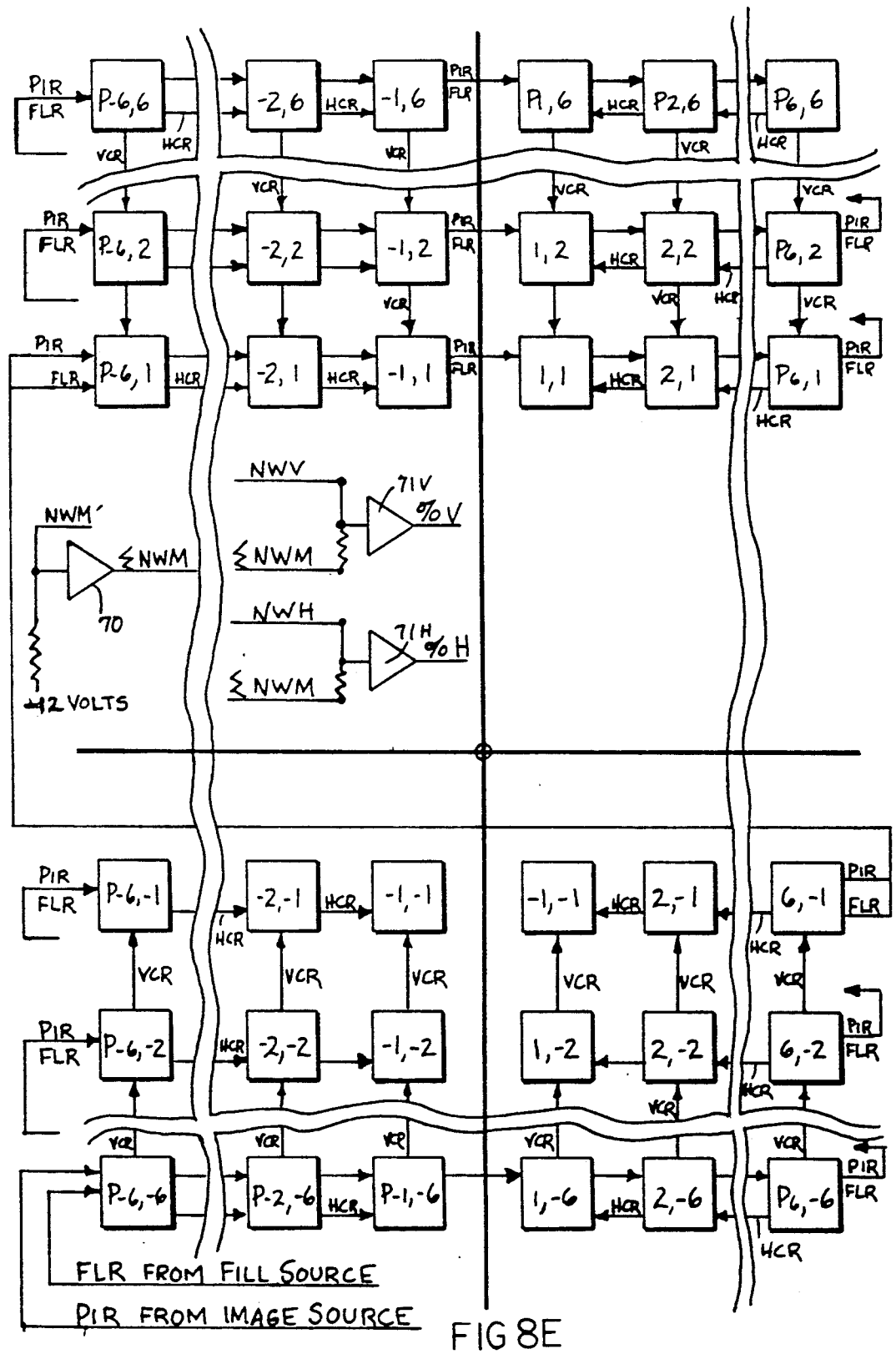
FIG. 8E is a diagram of the Simplified Connections in a Fovea Matrix.

The polyp Image Register (PIRi,j) 43 performs the functions of both storage of the pixel color and that of a shift register. This type of element is well know in the art, being basically a flip-flop with a shifting gate 63 having enough dynamic storage characteristics to allow it to act also as one stage of a shift register. It receives its color input from PIR[i−1] [j], which is located on the same row directly to the left; its shifting output goes to PIR[i] [j], which is located on the same row directly to the right. Polyps on the left edge of a row receive their inputs from the rightmost Polyp in the next lowest row, while Polyps on the right edge of a row shift their outputs to the leftmost element in the next highest row. This is illustrated in FIG. 8E.

Referring still to FIG. 8B, the Vertical Closure Register 44 (whose output is VCR[i][j]) becomes a binary "one" if any of the Polyps further up in the vertical column contain a black pixel description. This is accomplished by using the "OR" gate 64 whose inputs are labeled 31 and 32. Input 31 is true if the Vertical Closure Register 44 of the polyp immediately above Pij is true, and this sets VCRij to a true status. Input 32 is true if the Polyp immediately above Pij is storing a black pixel color; if true, it also sets VCRij to true status. This matrix arrangement of OR gates provides a "ripple" such that within a small portion of a microsecond the presence of a black pixel at the top of any matrix column will cause the VCRs 44 below it to propagate a "true" status downward. The Horizontal Closure Register VCRij 45 has a similar logical set of gates 65, and its function is the same except for the fact that it detects boundedness to the right of Polyp Pij.

The Enclave Membership Register 46 of FIG. 8B uses many of the outputs of surrounding Polyps to determine whether the the pixel represented by Pij is qualified for enclave membership. Inputs 53 and 54 connect to AND gate 55 which becomes true if the Polyp just to the left of Pij is a member and if Pij itself is bounded horizontally. Inputs 56 and 57 connect to AND gate 58 which becomes true if the Polyp just under Pij is a member AND if Pij is itself bounded vertically. OR gate 59 becomes true if either gate 55 or gate 58 becomes true, and this will cause the enclave membership Register 46 to be true unless there are any "inhibitions". Inhibitions are applied to the EM 46 via OR gate 60; if it is true, then the EMOR remains false. Gate 60 becomes true if any of its inputs become true. Inhibiting inputs are as follows:

FLRij
PIRij
PIR[i−1] [j−1]
PIR[i−1] [j−2]
PIR[i−2] [j−1]
PIR[i−2] [j−2]

Fill Register FLRij 61 requires that the Polyp may not be a member of a new enclave if it has already been chosen as part of another enclave. PIRij requires that if the pixel represented is black, that Polyp may not be a member of any enclave. The other four PIR inhibitions represent the inhibiting effect of black pixels at points closer to the Center of the Storage Area (CSA). The output of OR Gate 40 collects these signals, which are collectively called "Line-of-Sight Inhibitions". They effectively prevent enclave membership form propagating in an area which is mostly isolated from the main enclave. Other functions besides the function represented by OR Gate 40 may be used to accomplish this result. Note that such functions must not prevent legitimate propagation through "pepper noise" within an enclave.

The last of the circuitry groups in FIG. 8B is the Fill register 61 and its output is called dFLRij. It is loaded through shifting gate 62 whose input is from the Fill Register directly to the left. The Fill signals are supplied and shifted through the Fovea Matrix each time a Best Enclave has been selected. The shifting is accomplished by exactly the same technique as that used for loading the pattern itself.

As mentioned before, FIG. 8A applies in detail only to those Polyps in the NE quadrant. When modified by the information in FIG. 8D, however, a design for all four quadrants can be obtained from FIG. 8A. Specifically, FIG. 8C is a table showing the gate input designations for each of the different quadrants.

Using a Fovea Matrix nomenclature which has a zero column number and a zero row number creates confusion as to which quadrant the zero column and zero should be assigned during enclave measurements. From a theoretical point of view it does not matter so long as the choice is consistent. Furthermore, if the resolution of the data is sufficiently high, the data of this row and this column can be discarded. From a cost point of view, however, resolution must be kept as low as is possible consistent with good results. In this description the zero row to the east of the CSA is considered part of the NE quadrant, the zero column to the South of the CSA is considered part of the SE quadrant, the zero row to the West is treated as part of the SW quadrant, and the zero column to the North is treated as part of the NW quadrant.

FIG. 8D shows a Single Polyp in each quadrant. The resin purpose of this figure is to show the additional circuitry which is used to calculate the percentage used in the measurements. Of the many possible ways of electronically generating percentages I have chosen an analog method as the preferred embodiment. In order to do this it is first necessary to generate signals that are proportional to the absolute number of pixels. In the NW quadrants these signals are NWM (NorthWest Membership), NWH (NorthWest Horizontal), and NWV (NorthWest Vertical). They are respectively EMR (Enclave Membership Register) through a high value of resistance, and VCR (Vertical Closure Register) through a high value of resistance. All of the NWM points are to be tied together and also connected to a very low impedance device shown in FIG. 8E as an operational amplifier 70. The voltage output of the operational amplifier will be proportional to the absolute number of enclave members in the NW quadrant. The sum of NWH and NWV are similarly generated.

FIG. 8E also shows analog circuitry for generating %V and %H for the NW quadrant. The circuitry uses operational amplifiers 71V and 71H with appropriate inputs, as shown. Circuitry for generating similar signals are to be provided for each of the quadrants.

FIG. 8E additionally shows the preferred method of shifting the pattern PIR and fill FLR information through the Fovea Matrix.

Figures 9, 10A:
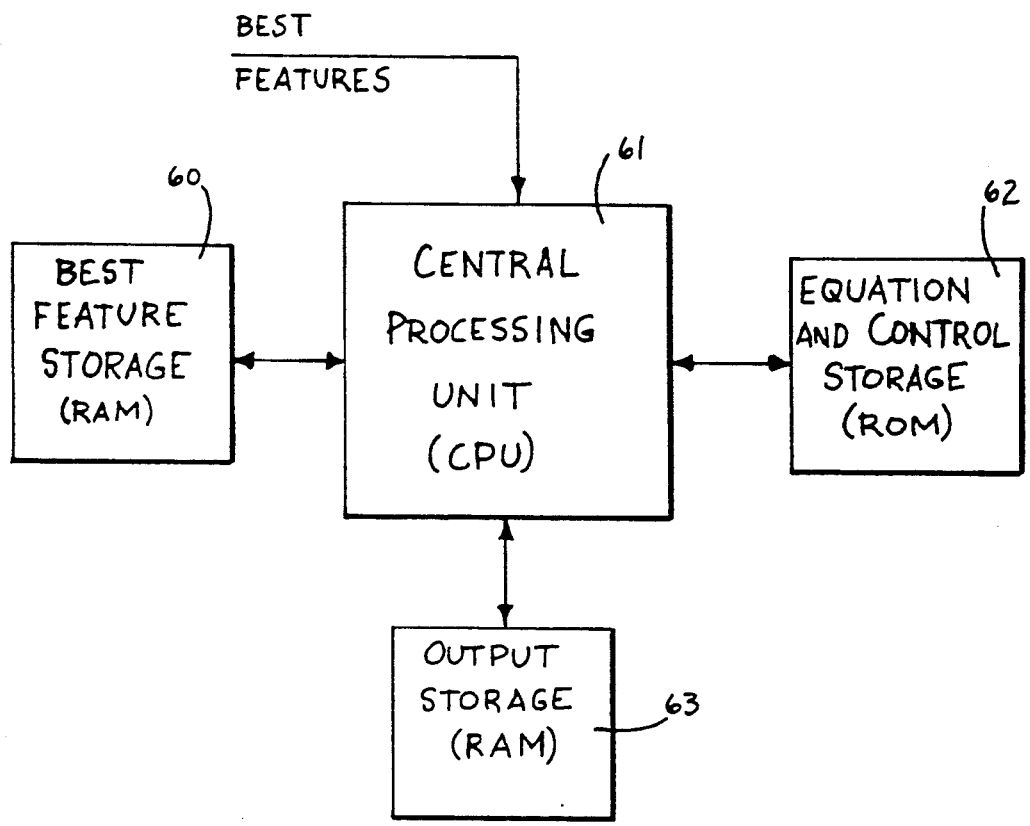
FIG. 9 illustrates Details of a Recognition Scoring Device.
FIG. 10A is a Table of Generic Enclave Names.

FIG. 9 shows details of a recognition scoring device 12. This is an expansion of FIG. 6, which discusses the functions from a block diagram point of view. The preferred embodiment of the Recognition Scoring Device 12 is a serial computer of the classical Von Neuman type. It includes a Beat Feature Storage device 60, a Central Processing Unit 61, an Equation and Control Storage Device 62, and an Output Storage device 63.

When the Artificial Fovea of FIGS. 1, 2, and 5 has finished its work it outputs the Best Features found in the pattern to the CPU 61, which in turn stores them in the Ransom Access Memory (RAM) called Best Feature Storage 60. CPU 61 then proceeds to evaluate the Equations which are stored in Read-Only-Memory (ROM) 62. This all is done under the control of the Program, which also resides in ROM 62. The sorting of the equation scores and the acceptability testing is also done under control of the program in CPU 61. The name of the Accepted Class, plus instructions about what to do if the character is rejected, are all stored in a section of RAM called Output Storage 63. The separation of RAM shown in FIG. 9 is made only for illustrative purposes, and many other assignments may be used. There is no specific reason, for example, why Equation and Control Storage 62 cannot also be RAM'; since the information stored in that memory does, in fact, change less often than the information stored in memories 60 and 63, the use of ROM" is indicated on grounds of higher performance at less cost. Although the use of special purpose hardware designed specifically to perform the recognition scoring function is perfectly possible, the preferred embodiment is a general purpose computer because of the economies possible. Its high degree of flexibility is also valuable. The only drawback to using a general purpose computer here is its speed, which is slow compared to dedicated hardware. If speed becomes a problem, it is quite easy to add more microprocessor computers in parallel to perform the Recognition Scoring function.

FIG. 10A is a Table of Generic Enclave Names. In the sketches shown in this table, the black pixels are represented by X marks, while the white pixels are represented by "dot" or "period" marks.

The Table shows four different classifications of names of enclaves. The first classification is that of "Loop". There are no sub-classifications. A score of 100 on the generic loop template would be achieved by a symmetrical area of white pixels which is totally surrounded by black pixels. This also implies that each of the quadrants scored 100% of pixels being bounded in both the vertical and horizontal axes. (It will be appreciated that the boundedness determinations can be made on diagonals just as easily and the terms "north", "south", "east", and "west" are merely terms of reference.) The numeral zero, if no voids exist, will score 100 on the Loop generic template. Enclave No. 1 of FIG. 10B will also score 100 on the Loop generic template, even though the shape is triangular.

The next classification is called "Cardinal Concavities", and the sub-classes are called "Generic North", "Generic East", "Generic South", and "Generic West". In order to achieve a score of 100 on the Generic North template, and enclave must have 1) every white pixel in the NE be bounded to the East but not to the North, 2) every white pixel in the SE be bounded to the East and the South 3) every white pixel in the SW be bounded to the South and the West, 4) every white pixel in the NW be bounded to the West but not bounded to the North. Any pixels deviating form these specifications will cause the score of the enclave on this template to be proportionately reduced.

In order to score 100 on the Generic East template, the white pixels in the enclave must be bounded in all directions except the East. In other words, this generic template has the same requirements as the Generic North template except the requirements are rotated 90 degrees clockwise.

Similarly, the Generic South and Generic West templates have requirements which are looking for white pixels that are bounded in three directions but unbounded in the fourth direction.

Two examples of Cardinal Concavities are shown in FIG. 4B. Enclave No. 1' will score 100 on the Generic West template, and Enclave No. 2 will score 100 on the Generic East template.

Figures 10B, 10C:
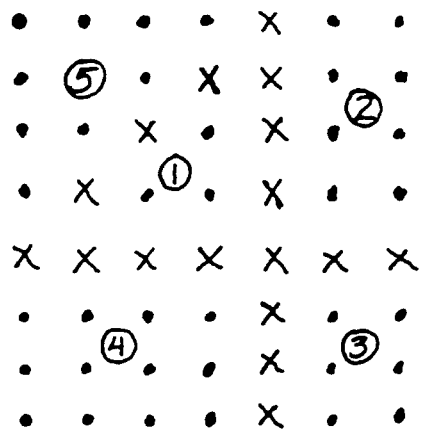
FIG. 10B illustrates five enclaves in the closed top numeral 4.
FIG. 10C is a table of the cardinal template scores for enclave No. 1 of FIG. 3, FIGS. 11A-11K comprise a Table of Arabic Numerals, conventionally drawn, showing positions of conventional generic enclaves.

The second major classification of generic templates shown in FIG. 10A are called "Corner Concavities". Four sub-classes are illustrated. They are called "NE Square", "SE Square", "SW Square", and "NW Square". Three examples of good corner concavities are shown in FIG. 10B, which is a matrix sketch of a closed top numeral four. They are enclaves No. 2, No. 3, and No. 4. No. 2 will score 100 on the NE Square template, No. 3 will score 100 on the SE Square template, and No. 4 will score 100 on the SE Square generic template.

The third major classification of generic templates are called corner convexities. Four subclasses are called NE Vex", SE' Vex, "SW Vex", and "NW Vex". An illustration of an enclave which scores 100 on the NW Vex template is enclave No. 5 of FIG. 10A.

FIG. 10C is titled "Cardinal Template Scores for Enclave No. 1 of FIG. 4B". In this table, the various templates are given numbers for exemplary purposes. The Generic North template is given the number T10; T11 is a specific template with major opening to the north. All templates numbered T10 through T19 are north templates. Similarly, T20 is the Generic East template, with R21 being a template for some specific unusual east opening enclave. Again the numbers T20 through T29 are reserved for east opening template. South and West templates are similarly numbered.

The scores shown in FIG. 10C are the scores that the measurements obtained from enclave No. 1 would have attained on T10,T11,T20,T21,T30,T31,T40, and T41. The name "Best-in-North" is given to the best score of T10 through T19. The name "Best-in-East" is given to the best score of the templates numbered 20 through 29. The names Best-in-South and Best-in-West are similarly derived. These inclusive titles for scores derived from general characteristics of templates is a powerful tool. Particularly by a large factor. The size of this factor is application dependent, but is at least equal to 10 or better.

If the scores for Enclave No. 2 of FIG. 4A were computed, they would show that T20 had obtained a score of 100, and that the Best-in-East score was 100. Other scores will all be 75 or less.

FIG. 11A through FIG. 11K comprise a table of eleven Arabic numerals which can be described using generic enclaves. The Recognition Equations (REq) shown contain only the Assertion terms and the Relative Position Ratio terms. They do not include Negation terms, which will be discussed in a another section.

FIG. 11A shows a loop as being the best enclave, and a generic zero is defined as being the score of the Best Loop template.

FIG. 11B shows a single stroke ONE, sloped left. The score of this generic shape is the score of the best NW VEX plus the score of the Best SE VEX, the sum divided by two. A right sloped ONE is similar but uses NE VEX and SW VEX.

FIG. 11C shows the most common shape of a handprinted TWO. It has no extra loops. The simplest form of the Recognition Equation is equal to (BIW+BIE)/2 times the Relative Position Ratio Two (RPR[2]). RPR[2] is a function which is equal to unity if all the BIW enclave pixels are above or to the lest of the BIE pixels. RPR[2] goes to zero very quickly if a large percentage of enclave pixels violate this requirement.

FIG. 11D shows a generic THREE. It has two major enclaves. These are labeled Best In West (BIE) and Second Best In West (SBIW). Its Recognition Equation is equal to (BIE+SBIW)/2.

FIG. 11E shows an open top FOUR. Its important enclaves are Best In North (BIN), Best SW SQ, Best NE SQ, and Best SE SQ. Its Recognition Equation is equal to the sum of these scores divided by 4.

FIG. 11F shows a closed top FOUR. Its important enclaves are Best Sharp Loop, Best SW SQ, Best NE SQ, Best SE SQ, and Best NW VEX. The Sharp Loop function will be defined later in the specification. The "sharpness" function helps separate the closed top FOUR from a NINE.

FIG. 11G shows a generic FIVE. Its Recognition Equation is equal to (BIB+BIW)/2 times RPR[5]; where RPR[5] is the Relative Position Ratio function for the numeral FIVE.

FIG. 11H shows a generic SIX. Three acceptable enclaves are shown. Enclave No. 1 is accepted as "Best-In-East", Enclave No. 2 as "Loop", and Enclave No. 3 as "Best NWVEX". Enclave No. 3 is only marginally acceptable, since the number of pixels in it is a small percentage of the total number of pixels in the total white pixel image. This illustrates the point that marginal enclaves do not need to be specified when writing a Recognition Equation (REq) for generic characters. Thus the REq for a generic SIX is equal to (BIE+-Loop)/2 times RPR[6]; where RPR[6] is the relative Position Ration function for the numeral SIX.

FIG. 11I shows a generic SEVEN. Its acceptable enclaves are Best-In-West and Best SEVEX. Its recognition equation is equal to (BIW+SEVEX)/2. Note that none of the Recognition Equations discussed in connection with FIG. 11A through 11K show any of the "negation" terms. For the SEVEN, one of the appropriate negation terms would be some fraction of Best-In-East score; this would prevent the pattern shown in FIG. 11G from producing a good score on the REq for SEVEN.

FIG. 11J shows a generic EIGHT. Its acceptable Enclaves show a Best Loop (BL), a Second Dest Loop (SDL) and a Best-In-West. Because double loops appear coincidentally in many other handprinted numerals, the BIE term must be used together with a Relative Position Ratio which is unity if one loop is above the BIE which in turn is above the second loop. RPR[8] falls quickly to zero for numeral shapes which do not meet this function. The recognition equation for EIGHT is equal to (BL+SBL+BIW)/3 times RPR[8].

FIG. 11K shows a generic NINE. Its major enclaves are a Best Loop (BL), a Best-In-West (BIW) and a SEVEX. Although no other real numeral should have a BIW over a BL, it is good practice to protect against garbage patterns by adding the RPR[9] term which specifies that the BL must be over the BIW to be a high scoring NINE. The Req for NINE, (without negation terms) is equal to (BL+BIW)/2 times RPR[9].

DISCUSSION OF RECOGNITION EQUATIONS

FIG. 12 shows an exemplary set of eleven Recognition Equations for the Arabic numerals ZERO through NINE, including separate cases for the open top FOUR and the closed top FOUR.

The nomenclature used is designed to facilitate the logical sorting and inclusion of generic templates which has already been discussed. Thus, REQ 0-0 means the Recognition Equation which represents the most common shape of a ZERO. Its shape is shown in FIG. 11A. Similarly, REQ 1-0 means the Recognition Equation for the most common shape of a ONE. The first subscript is the numeral CLASS, while the second subscript being the specific shape type within the CLASS. REQ 4-0 is the generic equation for an "open top" FOUR, while REQ 4-1 is the generic equation for a "closed top" FOUR. Note that the best scores from each class must compete against each other to exceed the MINIMUM ACCEPTABLE DOUBLES RATIO (MADR) (Refer to FIG. 6), but MADR does not apply within the same CLASS name. Thus, a score of 90 for REQ 4-1 is acceptable over a score of 87 for REQ 4-0; the best CLASS FOUR score must have a Doubles Ratio of better than the Best Class score of every other class, however. In a typical case, the most likely class to be competing closely with the closed top FOUR is CLASS NINE. Thus, using a typical MADR of 1.2, all of the other class scores must be less than 72 for a Best Class score of 90 to be accepted.

Three types of terms are used in FIG. 12. They are the Assertion terms (such as BL, BIW, etc.), the Negation Terms (such as NEG[SBL], and the Relative Position Ratio terms (such as RPR[2]). In each Recognition Equation the Assertion score must be normalized by dividing each Assertion Term by the number of such terms in the equation. This results in producing a score of 100 and no score subtracted due to Negations and RPRs. This is basic to the capability of comparative scoring.

The negation terms may be any desired function which produces a desirable diminution of the score if some undesireable enclave is present in the shape. For REQ 0-0, for example, the score should be reduced if there are two enclaves in the shape which score high on a loop template. The best loop score is called BL, while the Second Best Loop is called SBL. In order to keep scores normalized, it is also necessary to have a negation function which does not add to the REQ score if the unwanted enclave is absent. Another characteristic of a good Negation function is that it should not subtract too much; if 100 points were subtracted in a case where SBL was 100, the resulting REQ 0-0 score would be unable to compete in the very important doubles reject comparison. One of the useful functions is that shown in FIG. 12; the amount to be subtracted is zero so long as the argument is lower than 75, but becomes equal to 100 minus the argument for argument values greater than 75.

MEMBERSHIP QUALIFICATION

A method of qualifying white pixels for membership in an enclave is illustrated in FIG. 13A. This shows a series of sketches illustrating progressive phases of membership qualification in a clean character. The phrases "clean character" means the image of an alphanumeric character which does not have voids or extra black pixels.

For purposes of the following explanations, each pixel is identified by its x-y coordinates relative to a predetermined point in the image; for FIG. 13A the test COR A is at location 0,0.

FIG. 13A shows four phases of the progressive qualifying activity. FIG. 13A.1, (Phase 1) shows the choice of Pixel A as a Test Cor location, and it also shows three white pixels that have been qualified for membership; these pixels have been labeled "1". They qualified because they "touch" Pixel A. "Touching" is defined as being next pixel neighbors on the same row or same column. A further requirement for qualification is that the white pixel must be bounded by a black pixel in the same row or column. This black pixel must be in the same quadrant as the candidate pixel and must be located a distance further from the Test COR than the candidate. Note that the pixel directly to the West of Pixel A is not qualified because it is not bounded in its quadrant. (As noted above, the boundedness evaluations can also be made in disposal directions).

FIG. 13A.2 (Phase 2) shows additional pixels having been qualified as a result of "touching" already qualified pixels and being "bounded" in their respective quadrants. Pixels on quadrant boundaries are defined to be in both quadrants.

FIG. 13A.3 (Phase 3) shows a further progression of the qualification "wave", and the Final phase is shown in FIG. 13A.4.

While the black line elements in the four phases of FIG. 13A are shown as being only one black pixel wide, one of the important advantages of this invention is that the width of a line forming a character (and therefore the number of black pixels in the width of a black line element) is irrelevant to the basic operation of identifying the character which it represents.

Figures 13B, 13B.1, 13B.2, 13B.3:
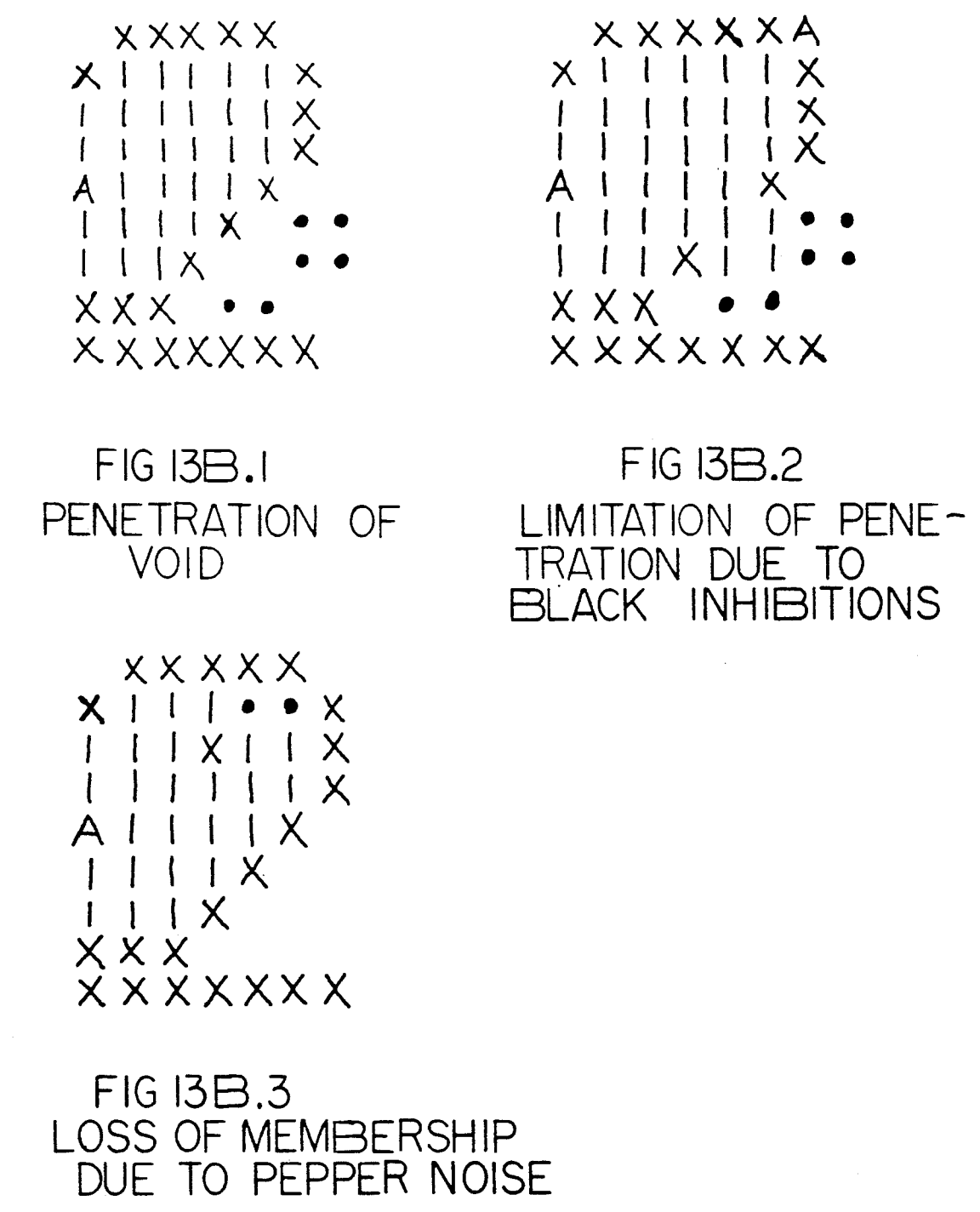

FIG. 13B contains three sketches labeled FIG. 13B.1, FIG. 13B.2, and FIG. 13B.3. FIG. 10B, is called "Membership Qualification with Voids (Salt) and Extra Black Pixels (Pepper)". FIG. 13B.1) "Penetration of Void" shows a single pixel qualifying at the location of the void. FIG. 13B.2) "Limitation of Penetration Due to Black Inhibitions". Inhibitors extending the influence of black pixels occur in human vision as well as in the Artificial Fovea. The rule illustrated is expressed by the following statement: any black pixel at coordinates i,j inhibits membership of pixels located at i+1,j+1; i+2,l+1; i+1,j+2; i+2,j(2. The coordinate numbers are positive in the directions away from the Test COR. The inhibited pixels of particular interest in FIG. 13B.1 and FIG. 13B.2 are labeled with black dots. Note that the inhibited pixels prevent further spread of qualified pixels in the particular image shown in FIG. 13B.2).

The human fovea pays a linear price for inhibiting penetration of enclaves through voids. This also occurs in my Artificial Fovea, as shown in FIG. 13B.3 labeled "Loss of Membership Due to Pepper Noise". Note there are two pixels lost to membership due to Black Inhibition (plus the loss of the black pepper pixel itself).

It is important to realize that the "labeling" of pixels and the size of enclaves is roughly proportional to the general influence of neighboring pixels in this invention, and not to some disasterous single accident of noise. Thus, it must be noted that the result of comparing the Final Phase enclave of FIG. 13A1.4 to FIG. 13B.2 will produce a high degree of correlation in spite of the void. This happy situatation occurs more often for my area based invention that it occurs for methods based on the curvature of black pixel aggregates.

FIGS. 14 (A-E) and 15 (A,B) illustrate characters which will be increasingly more difficult for a method based on "line tracking" to successfully recognize the ones which are recognizable and reject the ones which are not "safely" recognizable. Note in FIG. 14 the variations in the width of the "line" which is easily handled by this invention but creates difficult problems in prior art systems which use line thinning or skeletonization steps. The term "line tracking" is here intended to mean all those methods which attempt to measure the directional characteristics of groups of black pixels. A classic example is Grenias. Another term for line tracking is "pattern contour tracking". There are an enormous number of examples of methods which expand upon this technique a number of which require "line thinning" or skeletonization for them to be operative.

The line tracking method is to be contrasted with the "saccadic flick" and "enclave measurement" technique of this invention, as previously described. It cannot be emphasized too strongly that the measurements begin with the closure characteristics of each white pixel independently of other white pixels. The algomeration of white pixels into enclaves is performed in a systematic way, completely independently of the slope characteristics of black pixel segments. The measurements of enclaves treat line segment voids ("salt noise") only in terms of how they affected the closure characteristics of of the primal white pixels. Irregularity of the edges of black line segments have only a minute effect on the scoring of enclaves. Black pixels which are separated from the main line segments ("pepper noise") affect the scoring primarily in terms of how they change the closure characteristics of the primal white pixels.

In a line tracking machine there may be extensive "pre-processing" performed on the pattern before tracking is attempted. The various transformations, which often include "filling" (change white pixels to black), "smoothing", and "line thinning" are all conceptually part of the technique of line tracking. On patterns which are free of noise, these efforts are redundant and the line tracking machine generally performs well (for familiar shapes). On patterns which contain a small amount of noise, the pre-processing generally helps. On patterns which contain a large amount of noise, the pre-processing and line tracking often lead to that most heinous of errors: a substitution.

Figure 14A:
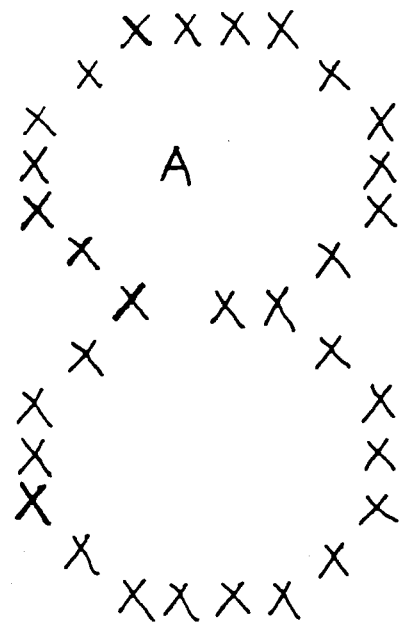
FIGS. 14A-14C illustrate Examples of Characters with Voids that would fail to be recognized by line tracking methods.

FIG. 14A shows the simplest possible case of a void. The image contains a single width black pixel line pattern. A completely unsophisticated pre-processor/line-tracker would decide that the pattern has composed of only one loop instead of two. This invention will give a score of 100 out of a possible 100 to each loop, and a Recognition Equation score of 100 for an EIGHT. See FIG. 14D for details of the scoring. If the void in the crossbar was wider, the score would decrease using this invention.

As obvious "improvement" to the pre-processor/line-tracker would be to automatically fill in all single voids. This then will produce a correct decision for FIG. 14A. This would lead the ever hopeful promoter of line tracking to demand of his engineer that the pattern of FIG. 14B be also recognized as an EIGHT. In order to do this, the engineer might add to the pre-processor the following algorithm: if two and two only black pixels are present in any three-by-three pixel matrix, then fill in the shortest path between them. This then would recognize the pattern of FIG. 11B as an EIGHT. This invention will produce very low scores for Loops, Best in West, Best in East, etc., because the percentage of white pixels bounded by black pixels is so low. See FIG. 14E for some details of the scoring using my invention. The outputs of all of the Recognition equations will therefore also be very low, producing both absolute level rejects as well as doubles rejects. This invention would call for another sampling of the original pattern, using a different quantizing level or a larger sampling area, or both. This example may lead the unwary reader to assume that the pre-processing/line-tracking method is superior. This is not so, because the pattern of FIG. 14C will be recognized as a satisfactory THREE by line tracking, thus producing the worst possible error: a substitution.

Figure 14B:
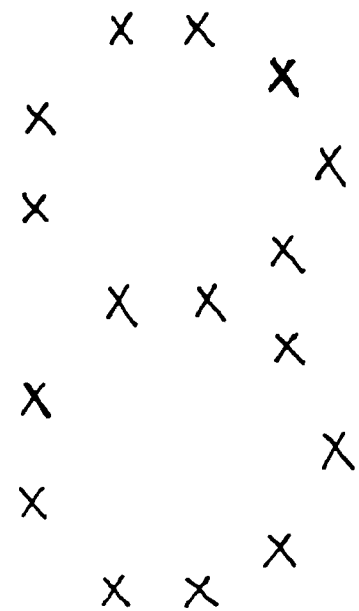
Figure 14C:
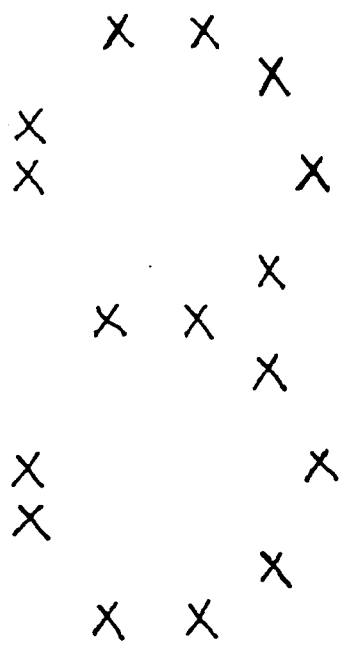

Referring now to the pattern of FIG. 14C, we observe it to be almost identical to that of FIG. 14B. Only two black pixels have been moved, but the prior art void filling algorithm now used in the pre-processor produces continuous lines everywhere except at the critical West Sides of the loops. This invention will output a REJECT for this pattern, but a sophisticated line tracking machine may very well produce a substitution. Engineers can continue to add special case exceptions (called AC HOC solutions by the profession) which fix special case but invariably end up making matters much worse for cases that have not yet been tried.

Figure 15A:
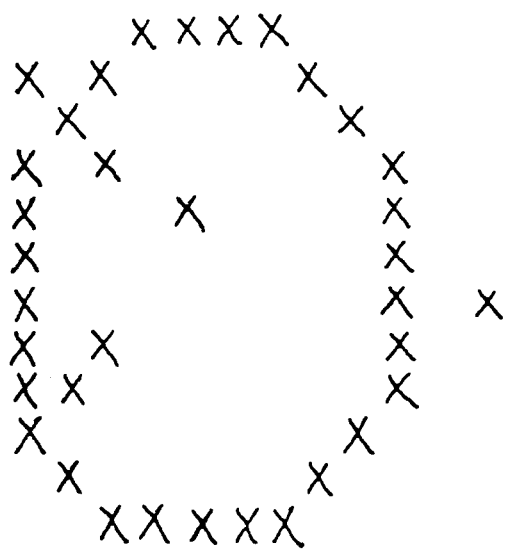
Figure 15B:
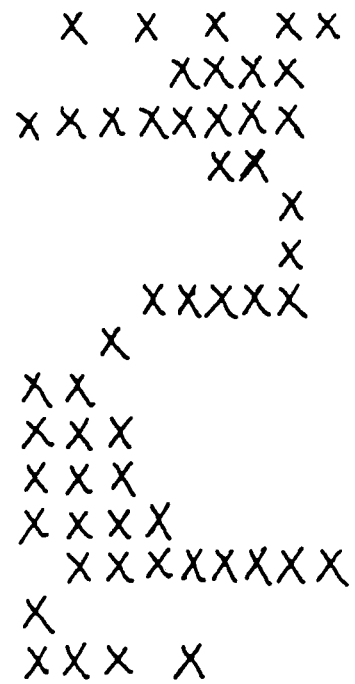

The addition of "pepper noise"(extra black; pixels which are not connected to line segments) compounds the problems facing the line tracking machine. FIGS. 15A and 15B show two illustrations of modest line thickening and pepper noise which will drive any line tracking machine crazy. The problem is that too many line segments have been started and went nowhere useful. Because even a few extra branches cause an exponential rise in the number of permutations and combinations, the line tracking machine quickly runs out of ability to express the allowable pattern shapes. The problem is that a "computable" parameter does not exist for line tracking machines. Conversely, this invention uses continuously computable parameters, rather than "decision tree" recognition logic. These continuously computable parameters are the scores that are continuously generated at every correlation step of the process. The patterns of FIG. 15A and 15B produce excellent scores for the ZERO and the TWO using this invention.

The examples of FIG. 15A and 15B have been chosen to illustrate salt noise in FIG. 15A and pepper noise in FIG. 15B, without combining the noises. The difficulties which occur within a line tracking machine when faced with a combination of these noises can only be described as "awesome".

EXAMPLES OF DETAILED QUADRANT MEASUREMENTS

Figure 16A:
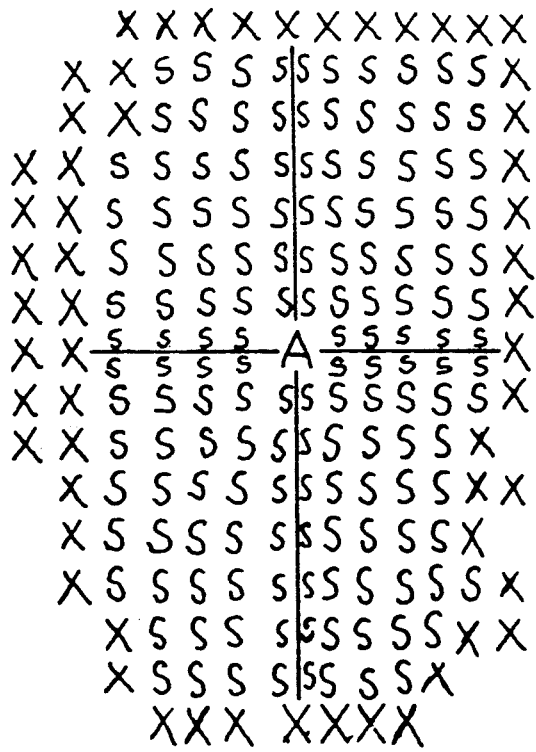
Figure 16B:
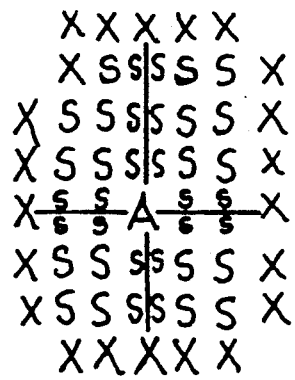

FIGS. 16A and 16B illustrate the basic working of the measurements which provide for recognition which is size independent. FIG. 16A "BIG ZERO" shows a character which is approximately 16 pixels high by 13 pixels wide. Utilizing the point "A" for the COR, all of the white pixels in the NE quadrant are bounded in both the vertical and horizontal direction, thus warranting the designation "s". There are 41 of these pixels. (Note that white pixels on the vertical and horizontal axes of the COR are counted in both of the quadrants which they divide.) Thus "NE % s″=100%". FIG. 16B "SMALL ZERO" has only a total of 11 white pixels in the NE quadrant of its analysis diagram. (Note again that white pixels on the vertical and horizontal axes of the COR are counted in both of the quadrants which they divide.) Nevertheless its percentage of white pixels which are bounded both in the vertical and horizontal direction is 100%; thus "NE %s =100%", the same as in the big zero. In the OCR Industry this is called "Size Normalization". Similarly the SE, SW, and NW quadrants show a similar analysis for the big and small zeroes. Note that FIG. 16B is not an exactly scaled down version of FIG. 16A. This was done on purpose to also illustrate the independence from line noise.

FIGS. 16C "SMALL SEVEN" and FIG. 16D "BIG SEVEN" go further in illustrating size normalization. Both these figures have two satisfactory enclaves. The COR for Enclave A is shown as Pixel A, while the COR for Enclave B is called Pixel B. (Note that the white pixels which separate the quadrants are scored in each quadrant, as previously explained.) For Enclave A, the number of NE Members is 11, and "NE %s=100. SE Members=6, and "SE %s=100". In the SW quadrant there are only three members, and these are directly below the COR. These members are all bounded vertically only, and thus carry the designation of "v"; this fact is expressed as "SW %v=100". In the NW quadrant there are 11 members, and all of them are vertically bounded only; thus "NW %v=100". These four percentages are exactly the same as the percentages in the perfect Best-In-West template; thus the BIW feature score is equal to 100. Enclave B, whose COR is at Pixel B, has its members bounded in a very different set of ways. Quadrant NE has s=100%. Quadrant SE has *=100%, since it has no white pixels bounded. Quadrant SW has 12 members and %h= 100. Quadrant NW has only 3 members, and all of them are bounded vertically and horizontally; %s is therefore 100% for NW. The template called "SEVEX" calls for exactly this set of relationships, and feature SEVEX has therefore a value of 100. The generic Recognition Equation REQ 7-0 equals (BIW+SEVEX)/2 vNEG [SBIW]. Since BIW is 100, SEVEX is 100, and there is no second best-in-west enclave, these score for REQ 7-0 is 100.

BIG SEVEN, shown in FIG. 16D illustrates size normalization and is to be compared with FIG. 16C. The figure has been deliberately drawn, however, to give a slightly different score in the NW quadrant. Because of the slight loop tendency in the NW, the NW %v is only 70%, while %s has 30%. The score for the BIW template is therefore reduced, becoming only 90 instead of 100. This produces a REQ 7-0 score only only 95 instead of 100.

The method of scoring a set of measurements against a known template is uniform throughout this specification. There are three terms in each quadrant description of each template. These are %s, %v, %h. The equation I use in scoring is as follows:

SCORE OF ENCLAVE $E$ AGAINST TEMPLATE $T$ =

$(100 - NE$ Absolute Difference$)/4 +$ $(100 - SE$ Absolute Difference$)/4 +$ $(100 - SW$ Absolute Difference$)/4 +$ $(100 - NW$ Absolute Difference$)/4$ where each quadrant Absolute Difference = absolute difference $(\% sE - v \% sT)/3 +$ absolute difference $(\% hE - v \% hT)/3 +$ absolute difference $(\% vE - v \% vT)/3$ FIG. 16E illustrates a "perfect" European SEVEN. This numeral, whose Recognition Equation is designated REQ 7-1, requires four enclaves instead of the two required for a normal SEVEN. The analysis is shown in detail and does not have any anomalies. Note that white pixels not claimed as members by one enclave may well be claimed by another enclave whose analysis was carried out later. (The order of analysis never affects the measurements or scoring. Similarly the temporary appellation attached to an enclave, such as Enclave A, or Enclave No. 2, never affects the measurements or scoring.)

The NW quadrant of Enclave C shows a case of "line-of-sight" inhibition in qualifying white pixels as members of Enclave C; notice that the crossbar of the SEVEN is between COR C and ten white pixels. Line-of-sight membership inhibition is a useful and important tool for the prevention of unwanted "blooming" of enclave membership.

METHODS FOR HANDLING OVERLAPPED/TOUCHING CHARACTERS

Handprinting from uncontrolled sources contains a great many patterns which are overlapping-not-touching, touching-not-overlapping, and touching-overlapping. In handwritten checks for example, characters often touch one another or a fraction line or touch each other and the fraction line, etc. This section describes some of the ways this invention can uniquely recognize such characters, although most handprint recognition algorithms are unable to cope with these defects.

One reason this invention is superior to most other methods is that it is not necessary to obtain precise segmentation. Since the scoring is linear and carries highly accurate measures of segmentation quality it is theoretically possible to perform measurements on all possible segmentations and then choose the best set of segmentations after the entire image has been analyzed in complete detail. In practice, however, it saves time and money to use a combination of measurements which can be used to generate a plot of the Probability of Segmentation (POS Plot) as a function of the horizontal axis. There are occurrences, however, of handprinting in which two or more characters are so much intertwined that the POS Plot is not useful. For these cases, this invention has the capability of using "Dyadic Recognition" and "Triadic Recognition". These concepts will be illustrated after discussing the basic POS Plot.

Figure 17A:
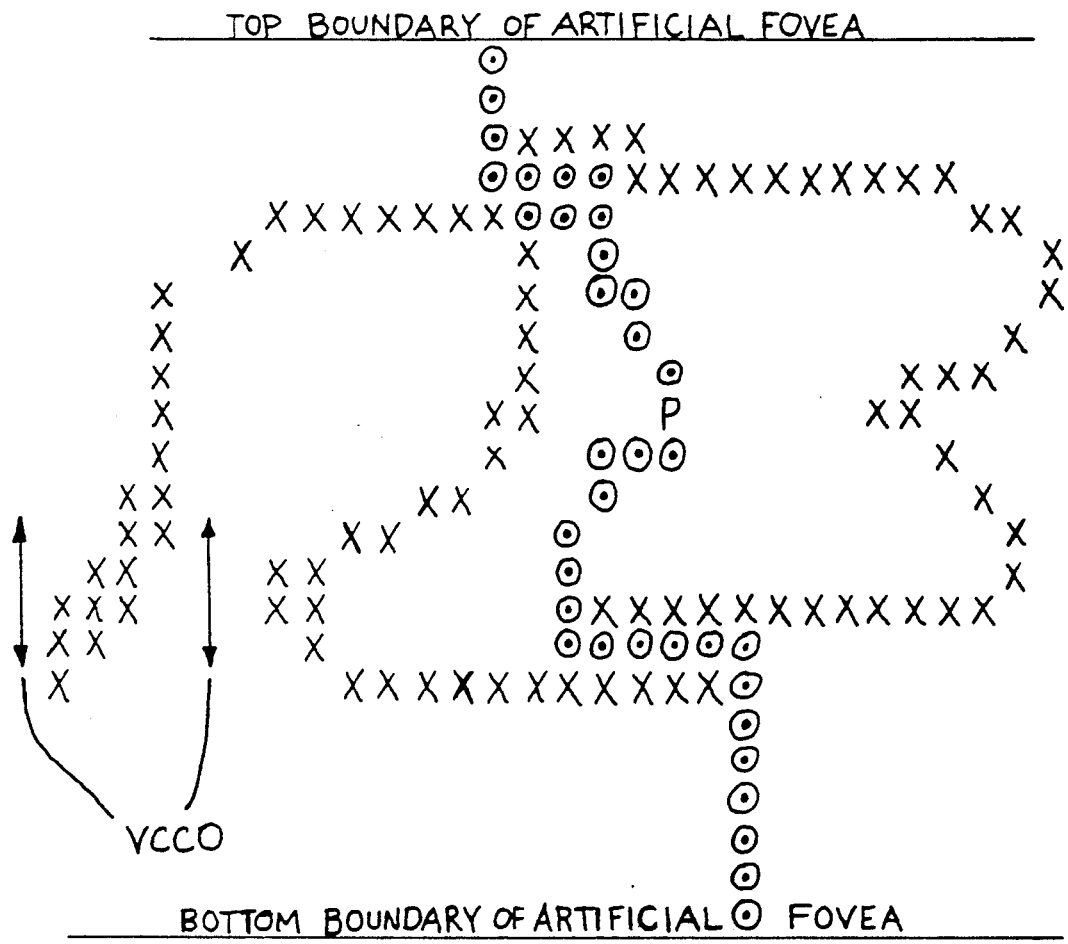

Initially, when the control unit is presented with a new image, the first function performed is Segmentation Analysis. This is an analysis of the entire image to find out whether more than one character occurs within the image and, if so, where the probability of separation is high. In the case of Courtesy Amount Recognition (CAR) (the arabic numerals entered onto a bank check) the image presented in the Courtesy Amount Field (CAF), and the CAF always contains more than one numeral. When numerals are separated by a vertical column of white pixels, this fact is recorded together with the horizontal coordinate of this occurence. It is called a Vertical Column Clear Occurence (VCCO). The recognition of this occurence is basic to any OCR scheme and methods for accomplishing this are well known in the art represented in the patent literature. FIG. 17A shows one example of this feature.

Figure 17B:
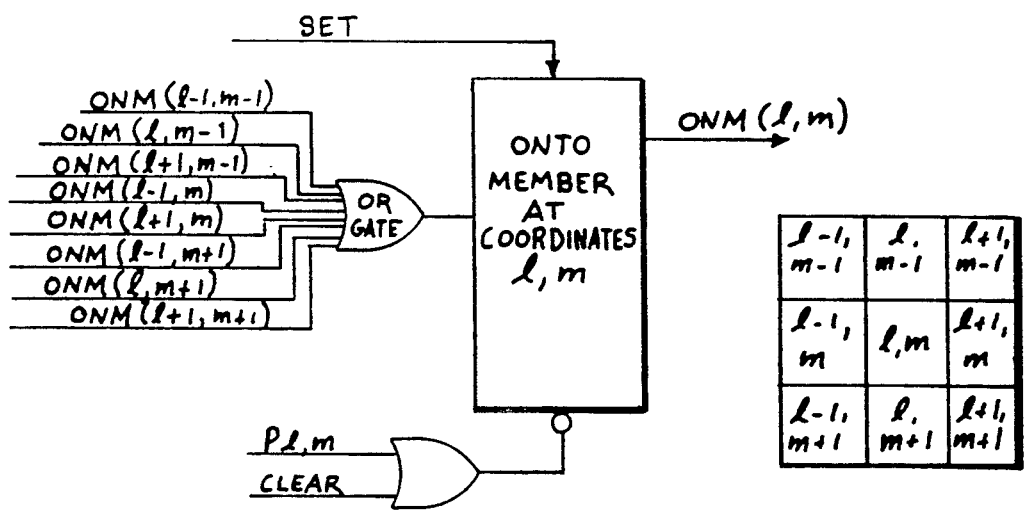

FIG. 17A also shows a more interesting occurence called an overlapping-not-touching occurence (ONTO). The handprinted TWO and THREE are overlapping but not touching at both the top and bottom of the numerals. An "ONTO Membership Pulse" is initiated at the point P in the Artificial Fovea (AF) during Segmentation Analysis. Point P may be the center of the AF so long as the black image is kept roughly centered vertically as the image is shifted from right to left. FIG. 17B shows an Exemplary ONTO Stage within the Artificial Fovea. A matrix of such stages is simply added to the Artificial Fovea previously described. This new ONTO matrix within the Artificial Fovea is connected to the main AF only by the P1,m input which inhibits an ONTO stage from firing if the Polyp at the same location represents a black pixel. If the Polyp represents a white pixel, the ONTO stage at location 1,m is fired if any of the eight surrounding ONTO stages have fired. The circuit to do this is the eight input 'OR GATE". The result of this logic is that a kind of brushfire occurs in which each new ONTO member becomes the source for a new brushfire. Continuous lines of black pixels will act as "firebreaks", but the brushfire will reach the top and bottom boundaries of the AF if there is any possible route. OR gate detectors (not shown) along the top and bottom boundaries fire when the brushfire reaches each boundary. The horizontal extent of the ONTO matrix should not be as great as for the other functions of the AF, since it is a waste of resources to try to detect segmentations in which the characters are woven together but not touching for more than half of an average character width.

FIG. 17A shows a possible ONTO feature between the TWO and the THREE. The important route followed by the brushfire is indicated on the drawing by a symbol composed of a dot inside a circle. Most of the brushfire is not portrayed, in the interest of making the principle more obvious.

The value of the ONTO feature will be recorded if both the top boundary detector and the bottom boundary detector fire within a reasonably short time. Assuming the circuitry is asynchronous the length of time required for the brushfire to finish its propagation should be less than a microsecond. The probability of segmentation (POS) is higher the shorter the length of time; the spread of firings is also significant, and the value of the ONTO feature will be a function of these measurements. Note that the ONTO feature becomes a way of measuring the VCCO.

Another input to the POS Plot may be the values of what are called Upper Segmentation Templates (UST) and Lower Segmentation Templates (LST). FIG. 17C illustrates a number of pairs of numerals with upper and lower segmentation enclaves indicated by down arrows and up arrows, respectively. FIG. 17D shows a detailed example of a lower segmentation enclave and its somewhat generalized template. This invention makes use of the same fact that humans use if they have to perform segmentation, namely that there are enclaves and combinations of enclaves which typically occur between characters, even if they are touching. The most useful, for numerals is fact that most numerals do not have enclaves which are South opening or North opening. Therefore, if South and North opening enclaves have high scores, there is a high probability of a segmentation point being close by, (Note that the open top FOUR is a major exception to this rule—no matter, a high POS merely generates a detailed examination, and the linear scoring reveals the correct structure.)

The example of FIG. 17D is instructive. It shows an enclave whose COR is at point A. A lower Segmentation Template is also presented which calls for the NE and NW measurements to have 100% 0 of the pixels bounded both vertically and horizontally, while the SE and SW quadrants are to have zero% bounded both vertically and horizontally. Any deviation from these template specifications will result in a score of less than 100. When a Template is designed by a human operator, the Template may often be improved by the human to the extent of specifying only those parameters which are required to produced the desired filtering action. Thus, in FIG. 17D, only the %s values are specified in the Template. In evaluating the correlation scoring equation only the terms specified by the Template are to be used. When no operator is present, this invention calls for machine learning of a Template which must have all the parameters listed. The learning capabilities of my machine are discussed in more detail later in this specification.

Figure 17E:
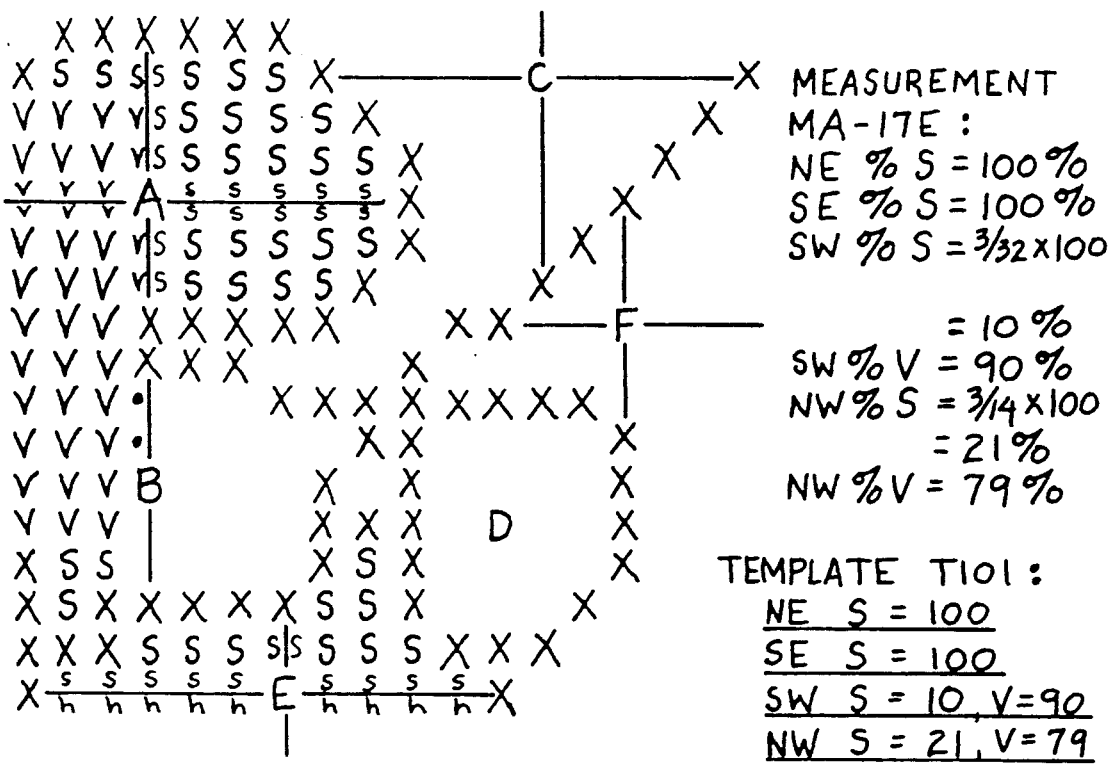
Figure 17F:
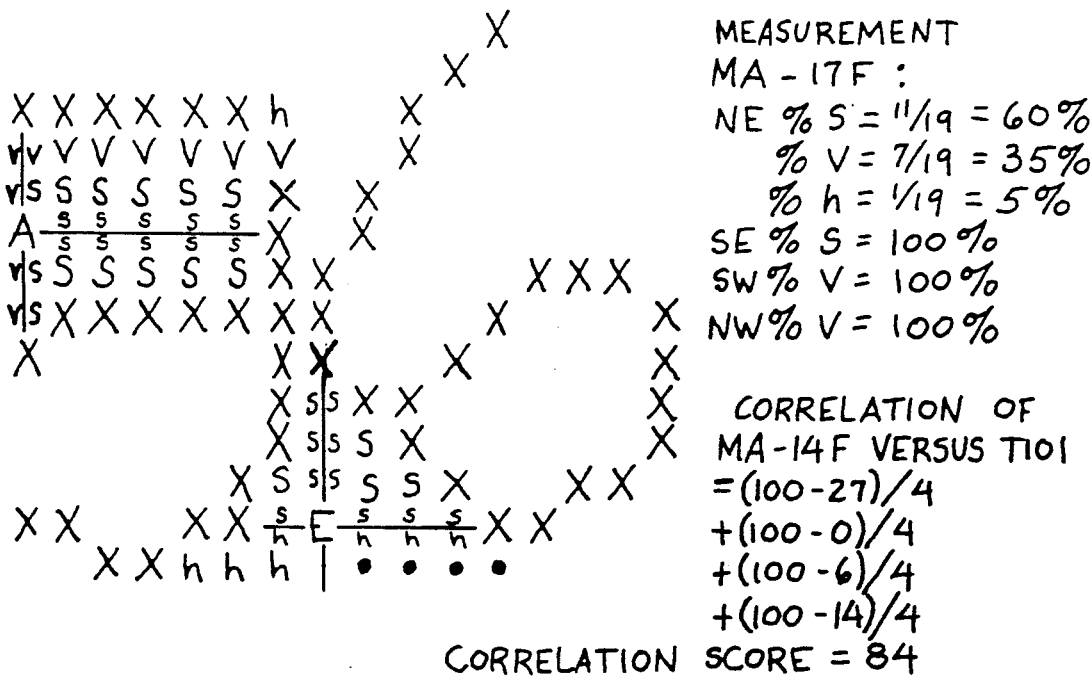

FIGS. 17E and 17F illustrate a totally different and novel way of recognizing characters which are touching/overlapping. This method is an alternate to the POS Plot method, or it may be used to confirm a marginal acceptance. Both these figures contain a "dyad" of the same two touching/overlapping characters, but the individual numeral shapes are different and the positional relationship of the numerals is different. The basic method for recognizing such characters is called "Multiple Character Recognition". The first time the invention is presented with this dyad a reject will occur. A human is called (either on-line or later in an off-line mode). The human in the case shown identifies the dyad as a 3/6 double character and specifies that some or all of the measured enclaves be made into templates. A new class of numerals is created called CLASS 36 and a New Recognition Equation is created.

A part of the Template correlation scoring is shown in FIG. 17F. One of the many possible methods of scoring the correlation between an Enclave E shown in FIG. 17E and a Template T101 has been given in an earlier herein. It is fully normalized equation, in that its maximum value is always 100 and its minimum value is always zero. The following computation is presented in order to demonstrate the details of this exemplary scoring technique. There are four terms to compute initially, one for each quadrant.

$NE$ absolute difference =

-continued $$(100 - 60)/3 + (5 - 0)/3 + (35 - 0)/3 = 27$$

SE absolute difference = $(100 - 100)/3 + 0 + 0 = 0$

SW absolute difference =

$$(10 - 0)/3 + (0 - 0)/3 + (100 - 90)/3 = 6$$

M absolute difference =

$$(21 - 0)/3 + (0 - 0)/3 + (100 - 79)/3 = 14$$

score = $(100 - 27)/4 + (100 - 0)/4 + (100 - 6)/4$ $+ (100 - 14)/4 = 84$

Note that pixels may have a different symbolic notation in different quadrants; this occurs only along the quadrant boundaries. However, in the preferred embodiment, no pixels are members of more than One Enclave. In order to improve the ease of understanding, some of the enclaves in FIG. 16E do not have their pixel notation shown; these are shown instead in FIG. 16G. FIGS. 16F and 16H are also separated into two figures for the same reason of clarity.

The analysis of Enclave E of FIG. 16E is routine. A template T102 based on this enclave has descriptors as follows:

NE %s = 100

SE %h = 100

SW %h = 100

NW %s = 100

Analysis of Enclave E of FIG. 16F (the set of these measurements are designated ME-14F) yields the same descriptors as T102, and the correlation of T102 versus ME-14F is therefore 100%.

Figure 17G:
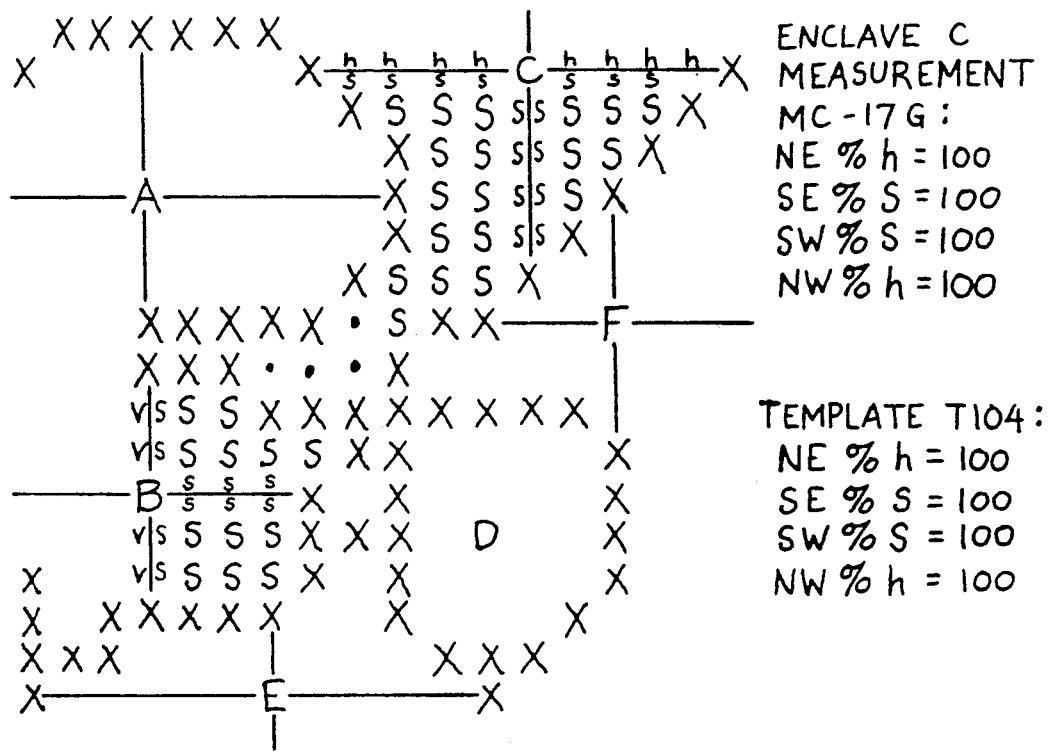

FIG. 17G shows the pixel designations within Enclave B. (Note that there would have been many more members of this enclave if this enclave had been analyzed prior to this analysis of the enclave directly above it.) A template T103 may be written as a result of choosing this dyad as the prototype of Class 36-0. Its descriptors are as follows:

NE %s = 100

SE %s = 100

SW %v = 100

NW %v = 100

Figure 17H:
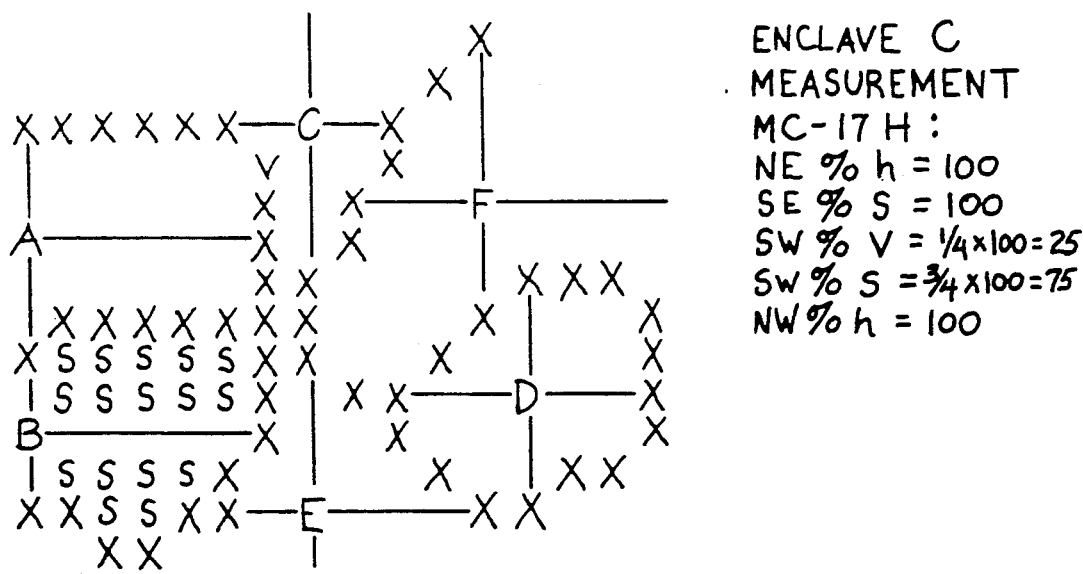

Analysis of Enclave B of FIG. 17H shows exactly the same parameters. The correlation of T103 versus MB-H is therefore 100%.

FIGS. 17G and 17H also show the pixel designations within Enclave C for the two images. For Dyad 36-0 the north opening enclave (Enclave C) is fairly standard, since there are no voids. (Note however that four pixels in the southwest area have been denied membership in the enclave. This is because of inhibition by black pixels closer to the Test COR. This has been discussed in the section describing membership rules.) A template T104 may be written directly from the measurements. Its descriptors are:

NE %h = 100

SE %s = 100

SW %s = 100

NW %h = 100

Enclave C measurements from FIG. 17H are somewhat different. They are:

NE %h = 100

SE %s = 100

SW %v = $\frac{1}{4} \times 100 = 25$

SW %s = $\frac{3}{4} \times 100 = 75$

NW %h = 100

To get the correlation score of MC-14H versus T104, first get the quadrant absolute differences. For quadrants NE, SE, and NW, the difference are zero.

SW absolute difference =

$$(100 - 75)/3 + (25 - 0)/3 + (0 - 0)/3 = 33$$

MC − 14H vs. T104 = $100 - 0)/4 +$ $$(100 - 0)/4 + (100 - 33)/4 + (100 - 0)/4 = 91$$

A "bang-bang" recognition equation using specific template numbers as assertions, no negation terms, and no other qualifiers is easily written as follows:

REQ 36-0
= (T101 + T102 + T103 + T104 + T105 + T106)/4 where each T term means the best correlation score yielded by that template against any enclave of the image.

This equation yields a score of 100 for Dyad 36-0 and 96 for Dyad 36-1. This illustrates that one dyad can be used to recognize many. An even broader recognition equation can be written using assertion terms like "Best-In-West". The writing of "smarter" recognition equations will be discussed under the heading of Learning Techniques.

Figures 17I, 17J, 17K:
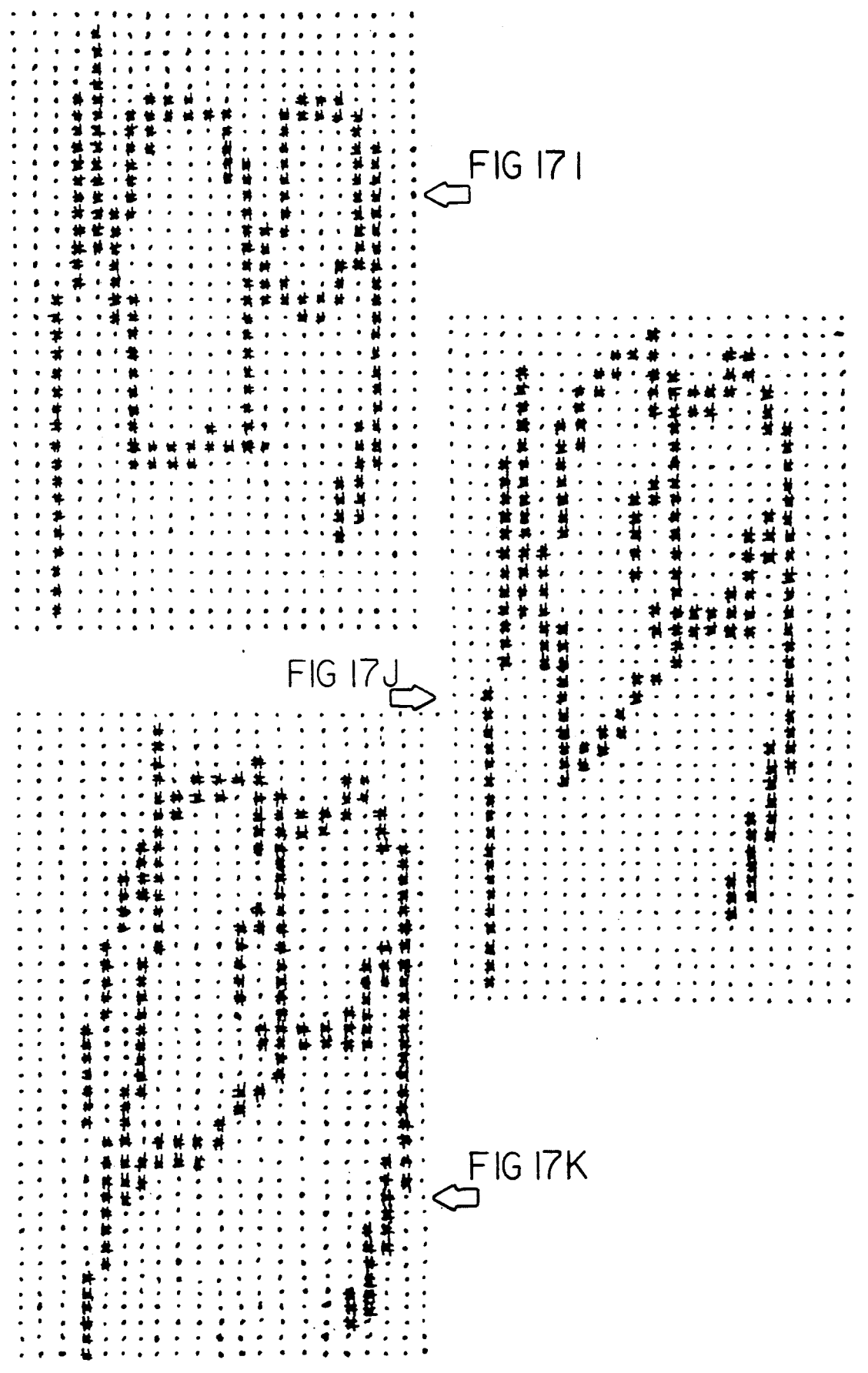

An extension of the dyadic recognition method is the triadic method. This is again particularly useful for recognizing touching and overlapping numerals. FIGS. 17I, 17J, and 17K illustrate an actual case which occurred during the computer based development of this invention. Three Examples of almost identical sets of numerals here submitted for analysis. The first set consisted of the numerals ONE, ZERO, and NINE touching, with no overlap. The image is shown in FIG. 17F. The analysis was made and three significant enclaves were found. Their measurements formed the basis for a Recognition Equation named REQ 109-0i REQ 109-0 = (Best Loop + Next Best Loop + Best-In-South)/3 − NEG(Best-In-West).

The image which is named Triad 109-0 scored 100 on REQ 109-0i. The next best score was produced by REQ 0-1 which scored 71 points.

FIG. 17J shows a very closely related image in which the NINE overlaps the ZERO considerably. This image was also analyzed by the invention and REQ 109-0 scored 97 points. The next best score was 85 points, produced by REQ 8-0i.

FIG. 17K shows a related image in which the ONE overlaps the ZERO and the NINE also overlaps the ZERO. This image was analyzed and REQ 109-0 scored 97 points. The next best score was 84 points, again produced by REQ 8-0.

These high performance results are by no means unexpected in terms of information theory. A great deal of information remains even though images may be mangled in complex ways. In commercial practice a recognition equation for a triad such as the example just given will include references to many more than just three enclaves, and there will be additional negations to prevent images containing super-sets to score well.

Note that in FIGS. 17J and 17K an additional loop has been formed by the overlapping ZERO and NINE. This loop has been essentially ignored by the linear scoring and directed vector technique used throughout. Although the absolute number of pixels in an enclave has been reduced to an unimportant parameter for the most part, the size of an enclave relative to other close enclaves is to be carried through and used for scoring and for negation purposes where necessary. This technique is the subject of an important feature in this invention. The quadrant scoring breaks down when the number of pixels is small, and it is therefore desirable to have higher resolution in the images used with than is required for constrained image recognition. Enclave C of FIG. 17H is an example of marginal resolution. The invention tends to be self recovering, however, since marginal resolution typically produces rejects in this invention, and rejects automatically cause the machine to re-process the characters using a higher resolution.

ARTIFICIAL FOVEA AS A COMPUTER ELEMENT

Figure 18:
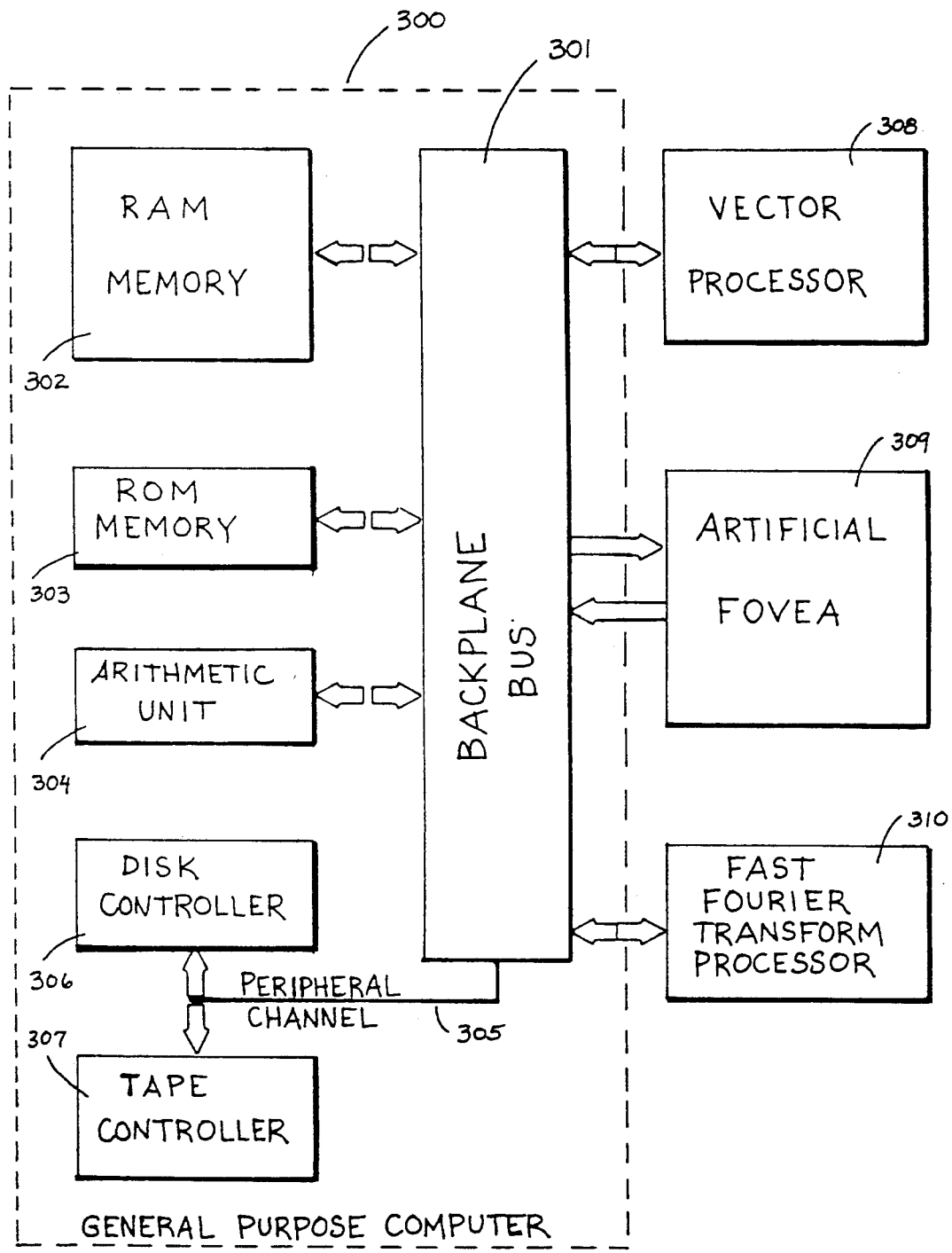
FIG. 18 illustrates Artificial Fovea Shown as a Computer Element.

FIG. 18 illustrates the use of an Artificial Fovea 309 as an element in a computer. Within the dotted line 300 are shown in block form the major components of a modern serial Van Neuman type computer. These components are a Backplane Bus 301, a Random Access Memory (RAM) 302, a Read Only Memory (ROM) 303, an Arithmetic Unit 304, a Peripheral Channel 305, a Disk Controller 306 (including magnetic disks and optical disks) and a Tape Controller 307, (including various forms of magnetic tape transports). Such a general purpose computer is often augmented by special purpose processors, such as a "Vector Processor 308 (examples are the Vector Processors which are attached to the Cray and Control" Data "supercomputers"), and the Fast Fourier Transform Processor 310 (offered commercially as a single card which plugs into the backplane bus). These special purpose processors typically are interfaced to the general purpose computer 30D using any one of several standard "backplane bus" protocols such as the "MultiBus" and the "VM Bus." They are typically sent a relatively small amount of data and assigned a highly complex set of operations to perform on this data. Communication back and forth is almost invariably on an "interrupt" basis using the bus protocol.

An Artificial Fovea may also be used as a special purpose processor in conjunction with a general purpose computer. FIG. 18 shows a block containing an Artificial Fovea "processor" in the same configuration. Thus an Artificial Fovea can be used in close conjunction with a general purpose computer and can be assigned jobs by programs written in a great many of the standard higher level languages such as FORTRAN, "C", PASCAL, ADA, etc. Special purpose compilers can also be written to utilize completely the peculiar capabilities of the artificial Fovea.

PLURALITY OF ARTIFICIAL FOVEAE

Figure 19:
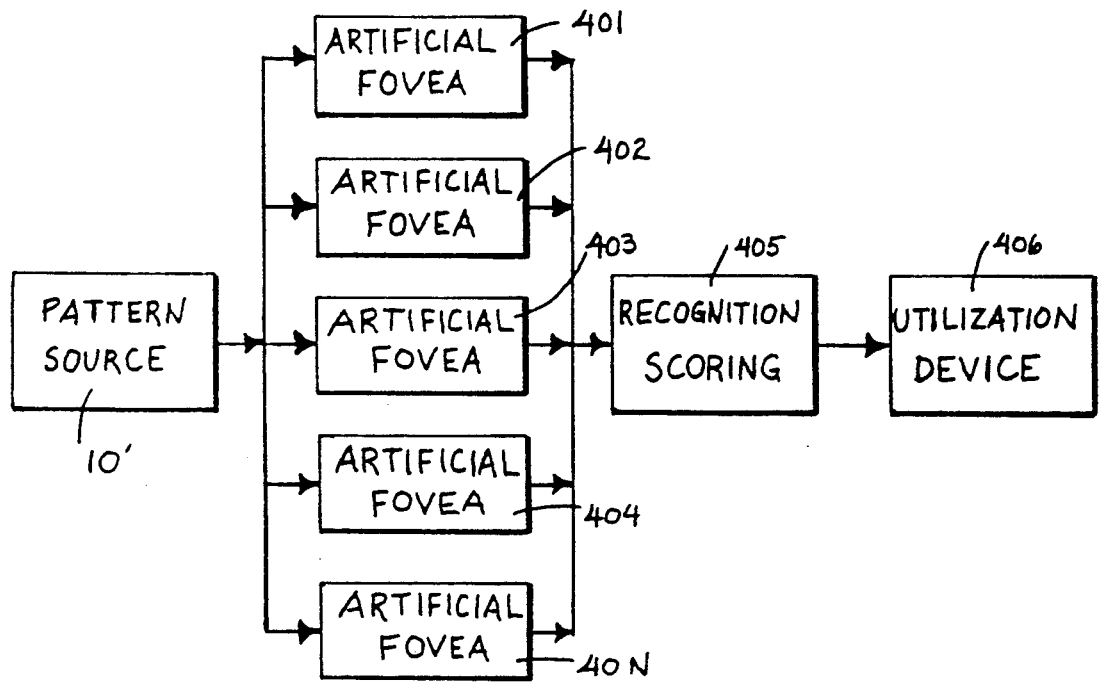
FIG. 19 illustrates Block Diagram of Parallel Pipeline Configuration showing a plurality of Artificial Foveas in operation.

FIG. 19 shows a block diagram of a parallel configuration showing a plurality of Artificial Foveae 401, 402, 403, 404, 40N. Figure is designed deliberately to be similar to FIG. 3A Pattern Source 10' may be any kind of a scanner or image lift which can accept pictorial information from a check deposit slip or other document and output electrical signal which are responsive to the pictorial information. These electrical signals are distributed to any one of the five Artificial Foveae shown by a control block (not shown). The criterion for deciding to which AF 401 . . . 40N to send the pattern is simply whether the AF is busy or not. The plurality of AF send their outputs to the Recognition Scoring block 410 and thence to the Utilization Device 411.

The normal reason for having a plurality of foveae in the system is that the complexity of the electronic functions to be performed in this invention is so great as to make each Artificial Fovea almost invariably slower in the completion of a unit task than the functions surrounding it. Thus, an image lift consisting of a paper transport and a column of photocells may very easily scan five hundred alpha numeric characters per second, while a first generation Artificial Fovea may be only able to analyze 100 per second. Thus five AF are needed to keep up with the input. The same situation applies to the Recognition Scoring block 410. Recognition Scoring is much simpler and more straightforward than the Artificial Fovea and a five-to-one ratio may also be appropriate for these functions.

RESOLUTION MODIFICATION

Figure 20A:
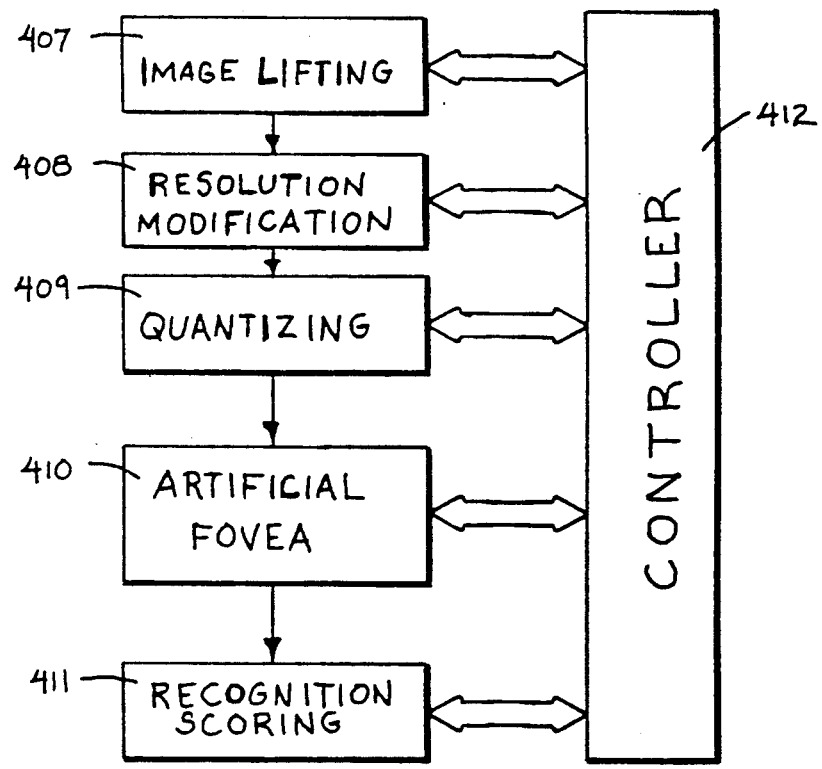
FIG. 20A is a block diagram of a partial recognition machine which includes a resolution modifying component.

FIG. 20A is a block diagram of a partial Recognition Machine 500 showing a Resolution Modification component 501. Other elements also shown are the Image Lifting 502, the Quantizing 503, the Artificial Fovea 504, the Recognition Scoring 505, and the Controller 506 units.

The object of the Resolution Modification component is to modify the number of pixels contained in a particular image so that the image may be recognized speedily and with the least cost possible. Since the length of time necessary for analysis goes up exponentially as a function of the number of pixels in a character, the Resolution Modification element initially reduces the resolution as much as possible, consistent with its recent experience with earlier images.

FIG. 20B shows an exemplary original full size scan, with gray scale shown as hexadecimal symbol. In the example shown, the original image was scanned with a set of photocells which generated an analog output. The analog output was converted to a sixteen level digital representation. Conventionally, the 16 levels are printed by using the codes 0 to 9, with A=10, B=11, C=12, D=13, E=14, and F=15. Again by convention, a pixel label F is the blackest pixel. These symbols represent the original conversion which is typically made within microseconds of each analog read-out. Many research projects use 256 levels of gray scale for the initial conversion, but 16 levels is satisfactory to illustrate the theory. The term "quantization" is reserved in this discussion for the binary choice which decides whether a pixel is to be considered black or white.

Continuing now with FIG. 20B, let us assume that three resolutions are available: they are a reduction of three in the x direction and 3 in the y direction, or two in x and two in y, and no reduction at all. Let us designate these reductions as 3×3, 2×2, and 1×1. FIG. 20C shows a black/white quantization at the 1×1 resolution level. There are many methods of determining the grayness of a pixel which should be optimally be called black; only one of them will be discussed here. One of the simplest is to add up all the gray scale values of the pixels in a particular image and divide by the number of pixels. The resulting quotient is the black/white quantizing level.

The reason for this discussion of resolution modification is to demonstrate that some images cannot be analyzed properly using a reduced resolution. The image of FIG. 20C is such an example. It should be clear to the reader that no "Test COR" can be found that will generate measurements that will correlate well with a "Best Loop" Template. The machinery shown in FIG. 20A will generate a Reject in this case and the Controller block will trigger the Resolution Modification block to generate a new image at a higher resolution and send that image downline for analysis. Since the only higher resolution available in this example is 1×1, the machinery will quantize each pixel of FIG. 20B independently of its neighbors. The result is shown in FIG. 20D.

The reader should be able to observe that a number of good "Test CORS" points are possible in the image shown in FIG. 20D, and therefore high correlation is possible with the "Best Loop" Template, and an acceptable score for the numeral "ZERO" will be obtained.

LEARNING CAPABILITIES

FIG. 21A shows a block diagram of a machine employing a Learning Module. This discussion will primarily deal with the methods by which a human teacher can be efficiently employed to help this invention to learn from experience. However, this does not preclude the later description of a machine which can learn from experience without the use of a teacher.

The machine of FIG. 21A includes most of the functions that have been previously discussed, such as Image Lifting, Quantizing, Resolution Modification, Segmentation Plotting, Artificial Fovea, Recognition Scoring, and Reject Scoring.

The simplest and most direct way for learning to occur is by having a human operator on line with the SF reader. The operation of this simplest mode is as follows: when a reject occurs the help of the operator is solicited by the machine by flashing the image of the unrecognized data on a screen in front of the operator. The operator hits a key on the keyboard indicating to the machine what symbol or symbols should be assigned to the image. This information enables the reader to continue with its processing, including the printing of Magnetic Ink Characters on the bottom of the check. Thus far, the steps are well known and are utilized in the present state-of-the-art.

The new steps are added by the Learning Module of FIG. 21A. Briefly, these steps include adding one or more new Templates if necessary and new Recognition Equations if necessary. These new features will allow the machine to recognize the image automatically the next time it or a similar image appears. Moreover, during this learning step or phase, the check writer's unique character formation can be stored in the machine for later authentication and/or validation of a check to thereby avoid forgeries.

FIG. 21B shows the first simple illustrative example. Let us assume that one of our clients characteristically writes his zeroes with a large void on the right side. The Recognition Equation for generic zeroes requires a high score on the Best Loop template. Such a high score would normally be generated using a COR located approximately at Pixel A in FIG. 21B. Due to the large void in the NE quadrant, the Best Loop template produces a score of less than 80, and REQ 0-0 likewise produces a score less than the reject level. In fact, no Recognition Equations can produce an acceptable level output. The image is rejected, and the image comes on line. The operator indicates that the machine should "learn" the new shape. The Learning Module sends the image back through the Artificial Fovea again, but requires more detailed reporting. It determines that, if a COR located at Pixel A' is used, a high output from the BEST-IN-EAST template is generated. If this output is high enough, no new templates need to be learned. All that is necessary is for the Learning Module to generate a Recognition Equation for a new sub-class of zeroes, called REQ 0-1. This equation will consist of the term BEST-IN-EAST, and several negations to prevent its output from being high for the numerals TWO, FIVE, and others containing enclaves opening to the East.

A Recognition Equation, (somewhat simplified) for this east opening zero is as follows:

$$REQ\ 0\text{-}1 = BIE - NEG[BIW] - NEG[SBL]$$

See FIG. 12 and related discussion for a review of these terms if necessary. Note that a first Best Loop (BL) is not negated, because a good score on BL is still quite likely; note also, however, that a high score on a Second Best Loop (SBL) must be negated because the image may be an EIGHT with an eastern void on the top loop.

In addition to negations, it may be necessary to add other terms which describe the relative positions required of the various enclaves. The single enclave case shown in FIG. 21A has been deliberately picked to be an initial simple introduction to operational learning problems whose solutions require complex computations and much time.

The operator/teacher will be occasionally asked to make difficult decisions. These difficult decisions fall into several categories. First, if the rejected image is so bad that the normal amount field (not the Courtesy Amount Field) must be consulted, the operator should probably not attempt to teach the SF machine the meaning of the distorted image. Second, the image may seem readable enough to the operator/teacher but it may still be in conflict with some character unknown to the operator/teacher. For example, if the alphanumeric character "c" had been added to the SF machine's list of recognizable characters, the image of FIG. 21B would be clearly a dangerous shape to be called a "ZERO". Such hidden conflicts must be discovered and resolved before any new shapes are accepted into the operational recognition set. If the operator/teacher is also a researcher skilled in the SF art, then it may be possible to make such a quick decision. What is really necessary, however, is allow the Learning Module to conduct a nearly exhaustive conflict check using a great many images having some enclaves common to the new candidate. This conflict check will, in general, take so long to perform that it cannot be performed "on-line" while the reading of other bank checks is delayed. Thus an economically viable machine will likely have the reject corrected for the tally tape, but the image and correct symbol will be saved for off-line learning. Such off-line learning is called "Dream Learning".

The shape shown in FIG. 21B has illustrated a condition in which the teaching process must provide a new Recognition Equation but does not have to provide any new Templates, since at least one high scoring template already existed for the enclave in question. In the early months of operation in a new writing environment many enclaves will be found that do not score well on the Templates which were installed at the factory. An example of this may be drawn from FIGS. 17E and 17F. The south-opening Enclave, whose COR is labeled "E" is an Enclave whose measurements would not typically be installed at the factory. In order to write a useful Recognition Equation for the Dyads shown, it would be necessary to teach the machine a Template whose correlation with similar measurements would produce a high score. The operator-teacher would observe that Enclaves A, B, C, and D produced good scores on already recorded templates, but Enclave E did not. There is a manual way and an automatic way to select the best COR for this new template. The manual way is to have the operator/teacher call up a program within the Learning Module which allows the operator/teacher to set a COR location into the machine using a "mouse", or "joystick", or by using keyboard coordinate entry. The operator/teacher should know that the most distinctive scores for a three-sided enclave are generated when the COR is placed on the edge of the open side, near the middle. The automatic way is to have the program generate the measurements for all the possible COR locations with the Enclave and then pick the location which produces the most "useful" measurements for a new template.

The definition of "useful" must now be discussed. If the enclave being measured is fairly similar to many already stored, but just happens to have a little quirk which causes it to score poorly on the standard templates, then the definition of "useful" should be to write a new Template which can be added to an existing class of templates; in this case that class of templates is the South-opening "Best-In-South" class. In this case, the criterion should be to choose the COR which correlates best with other templates already members of that class, while at the same time correlating the worst with templates which are members of other classes. In other words, the new template should have some generally unless the enclave is an absolute "oddball".

The case of the absolute oddball is more easily dealt with. The best COR will be the location which produces measurements which are the most different from any templates already stored. The new template should be assigned a template number which is not part of a recognized class of templates, and a new Recognition Equation can be written automatically which calls for that specific template number (in addition to other terms in the equation).

In the case of the enclave which is made part of an existing class of templates, the existing Recognition Equation will be satisfactory, and a new equation should not be written.

It may be recognized that careless addition of new templates may cause conflicts in the same way that new Recognition Equations may do. New templates must also be checked against a knows image data base at length, preferably during "dream learning".

CAPABILITIES FOR REJECTING NONSENSE SHAPES AND DISORDERLY NOISE

This invention has two intrinsic levels of capability for rejecting shapes which have no meaning and images which contain only random or near-random noise. The first level is at the Template scoring level, and the second is at the Recognition Equation level.

Consider the image shown in FIG. 22A. This is intended to represent a nonsense shape which scores poorly at the Template level. If the machine has been taught only Templates derived from the generic enclaves shown in FIG. 10A then every Template Cross Enclave Score (TXES) will be low for all possible COR locations. Since criteria for accepting a Best TXES can be made dependent upon absolute level and distance from the next best TXES, the machine can be adjusted to actually ignore shapes before even computing the Recognition Equation Score (RESC).

Note, however, that situations in which a shape can be ignored solely on the basis of poor TXE scores will tend to be limited to images which have mostly short disconnected sections of black pixels. Thus, random or nearly random noise will be often skipped over quite quickly by a machine well-constructed from the ideas of this invention. When the fragmented lines are not random, however, as is shown in FIGS. 11B and 11C, fairly good TXE scores occur and the images may be satisfactorily recognized.

A more interesting case is illustrated in FIG. 22B, which shows a nonsense shape which scores richly at the TXE level. Good scores would be developed for Best Loop (FL), Second Best Loop (SBL), Best-In-East (BIE), Best-In-West (BIW), and the four square corners. If this DOLLAR SIGN ($) was part of the desired set of characters to be recognized, a Recognition Equation (REQ) would exist and would score highly. If on the other hand, the DOLLAR SIGN was not intended to be recognized, the REQ would not exist; REQs for shapes which are sub-sets of "$" must have negation terms included or else conflicts will occur. Examples of such sub-sets are the TWO, the FIVE, and the EIGHT. If all the sub-set REQs are properly negated, the DOLLAR SIGN can be ignored and treated as if it didn't exist.

In any structured application to which my invention may be put, however, the system will be much improved by carrying the reject logic one stage further. In a banking application where the Courtesy Amount Field (CAF) is to be recognized, this third level of reject control comprises logical statements which will consider the location of control symbols, rectangular boxes, lines, decimal points, cents indicators (discussed above in connection with FIGS. 1-2), and nonsense images. For example, a really high confidence CAF should consist of a recognized rectangular box surrounding a'''' heading a string of high scoring numerics, follows by a DECIMAL POINT, followed by some form of fractional dollar symbol. As shows in FIGS. 2-1 through 2-12, many combinations of these elements exist in today's acceptable handprinted CAFs, and the Field Acceptance Logic must be able to handle these variations. It must also be able to recognize that a poorly scoring nonsense shape may be proper cause to reject the whole CAF in one case, whereas in a different case a garbage shape may be allowed.

SPECIAL MEASUREMENT FOR CLOSED TOP FOUR

In the field of Optical Character Recognition, just as in the better known fields of Physics and Philosophy, no single all-encompassing formula has been found which can be used to solve all problems. It is the mark of a really good Philosophy that it provides a matrix in which unusual methods can be nurtured and exercised.

Such an unusual method is required to help distinguish between the closed top FOUR and the normal NINE. Because the most important new measurements of this invention are primarily used to "generalize" or normalize the differences between handwritten topological features, these new enclave measurements must be supplemented by Special Measurements when the topology of two classes is too similar. The human Fovea has an enormous number of measurements which are not primarily based on topology. The "straightness" of a line is one major example.

In separating with high confidence an arbitrary example of a closed top FOUR from a normal NINE, this invention uses as many topological features as it can. FIG. 10B illustrates the use of the NE, SE, and SW Square Corners, plus the NW Triangular Corner and the Best Loop. Of these features, only the NE Square Corner and the SE Square Corner are reliably different. The Best Loop is invariably the strongest feature present, however, and the human fovea almost certainly measures more details about the shape of the Best Loop. One of the virtues of this invention is that it makes possible accurate assessments of the shapes of selected enclaves as well as their topology.

A method called the "Pointyness Triangle" (PT Method) will be explained to illustrate the versatility of my invention. The PT Method starts with the coordinates of the COR from which the BL feature was measured. Three points are then established. The first one is called Pne. It is the further point from the COR within the NE quadrant. The distance measurement is computed using the sum of the squares. The second point, called Psw is located by finding the position of the enclave member which is furthest away from the COR in the SW quadrant. The third point, called Pse, is similarly located in the SE quadrant. The lines are connected between the three points and they are called the Pointyness Triangle. The Pointyness Ratio is the number of members within the enclave as a whole divided by the number of members within the triangle. For FIG. 23A, the Pointyness Ratio is unity.

FIG. 23B shows the Pointyness Triangle superimposed on a normal well formed NINE. The Pointyness Ratio is approximately 2.5. Decisions as to which pixels are inside or outside can be made pretty much at the whim of the machine designed; this can be done by using equations and integral arithmetic, or it can be done by table lookup. The important thing is to get the Pointyness Ratio into the Recognition Equations for the closed top FOUR and the NINE in such a linear way that a numeral scoring on the borderline between the two classes can be gracefully rejected.

The technique used in successfully demonstrating this feature was to create two features used for negation only; these featrures are called tri[4] and tri[9]. They are clipped and off-set functions of the Pointness Ratios, where the clipping and the off-set values are parameters that can be varied according to learning performance. Referring to FIG. 11F, the Recognition Equation uses a feature called Best Sharp Loop (BSL). We now define BSL as equal to BL−tri[4]. Similarly, FIG. 8K uses a feature called Best Round Loop (BRL). We now define BRL as equal to BL−tri[9].

SPECIAL MEASUREMENTS FOR PERIODS AND UNRESOLVED BLOBS

There are some types of images and defective images which might seem to be difficult or impossible to recognize using the encalve measurement technique. The PERIOD (".⇌) is an example of this derived from the OCR industry, since it normally has no interior white pixels. NINES, EIGHTS and SIXES are examples of numerals which often have significant loops filled in due to carelessness or the use of too wide a writing instrument.

Contrary to expectation, these images provide some of the most novel and provocative examples of the Saccadic Flick and Artificial Fovea.

FIG. 24A shows a perfectly round PERIOD using the conventional Black/White display. While it is true that four triangular corner type enclaves are present, these are pretty small with respect to the area of the character.

A much more interesting solution is to invert the color of the pixels; the character will then appear as in FIG. 24B, and a high quality Best Loop enclave can be measured using the methods previously taught by this invention. In order to separate the PERIOD class from the BLOB-ZERO class, a term which compares blob sizes can be used, in addition to contextual information. The most significant use of the PERIOD is as a DECIMAL POINT in the Courtesy Amount field of checks. BLOB ZEROs sometimes occur in the cents section of the amount, since that section is often written smaller and with less care than the dollar amount.

FIG. 24C illustrates an EIGHT with a blob lower loop. This condition is fairly characteristic of right handed people in a hurry. The lower loop becomes slanted and thin and narrow enough so that few or no white pixels can be resolved. The upper loop often has a void in the NW, and a distinctive Template, not included in the north opening feature class or the east opening feature class, should be taught to the machine. The resulting REQ should contain at least the following terms:

*REQ BLOB EIGHT=(INVERTED BL+T[NW]+BI[W])/3*

Significant extensions can be made of this "color flip" technique away from the world of black/white and into the world of gray scale images. Such images are most prevalent in so-called "scene analysis" and "bin-picking". In these worlds the information in the images cannot easily be displayed using only two levels of intensity, as is done in OCR. In the "bin-picking" application (bin-picking is the automatic selection of a single part out of a bin containing many diverse shapes strewn in random placing) significant features may often be discovered by checking the images for enclaves which occur only within certain gray scale "windows". For example, a bowl may be illuminated in such a way that the center of the bowl and the rim show spectacular reflection, while being connected by means of areas which can be recognized by selecting only those pixels having an intermediate intensity.

SPECIAL MEASUREMENTS USING ABSOLUTE AND RELATIVE SIZES OF ENCLAVES

Figure 25A:
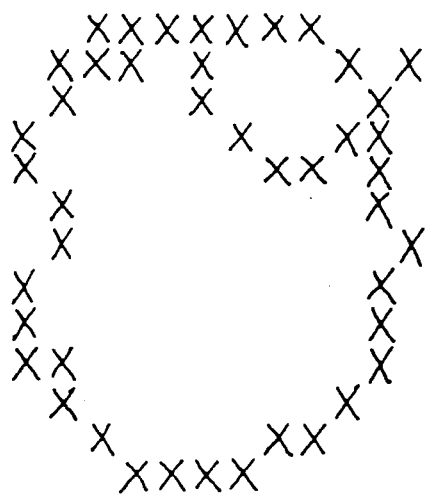
FIG. 25A is an example of a numeral requiring a relative size function.

FIG. 25A, however, a shape is illustrated which may cause some conflict between the ZERO class and the EIGHT class since it has a Best Loop and a Second Best Loop and a potential Best-In-West arising from the dimple on the left of the main loop. My invention provides methods for treating such shapes in very much the same way that humans probably do. First, no COR can be found in the dimple that produces four good quadrants; secondly, if a marginal sized enclave is found, it can be compared to the sizes of other enclaves associated with the image and either entirely ignored, or may be used as a "spoiler" to prevent substitutions.

Figure 25B:
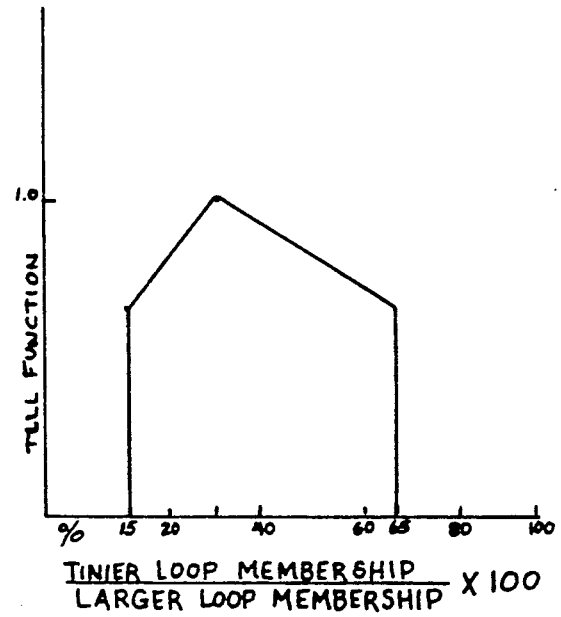
FIG. 25B is an example of a complex function derived from relative enclave sizes.

FIG. 25B is an example of a complex function derived from relative enclave sizes. This particular function is zero when the ratio is less than 15%, and zero again when the ratio is between 65 and 100%. In between, the TLL Function peaks at 30%. Such a function is useful as an Assertion term in a Recognition Equation particularly designed for recognizing this shape, and it may also be used as a Negation term in other REQs.

METHODS FOR RECOGNIZING FRACTIONS AND NON-NUMERIC SYMBOLS

Figure 26A:
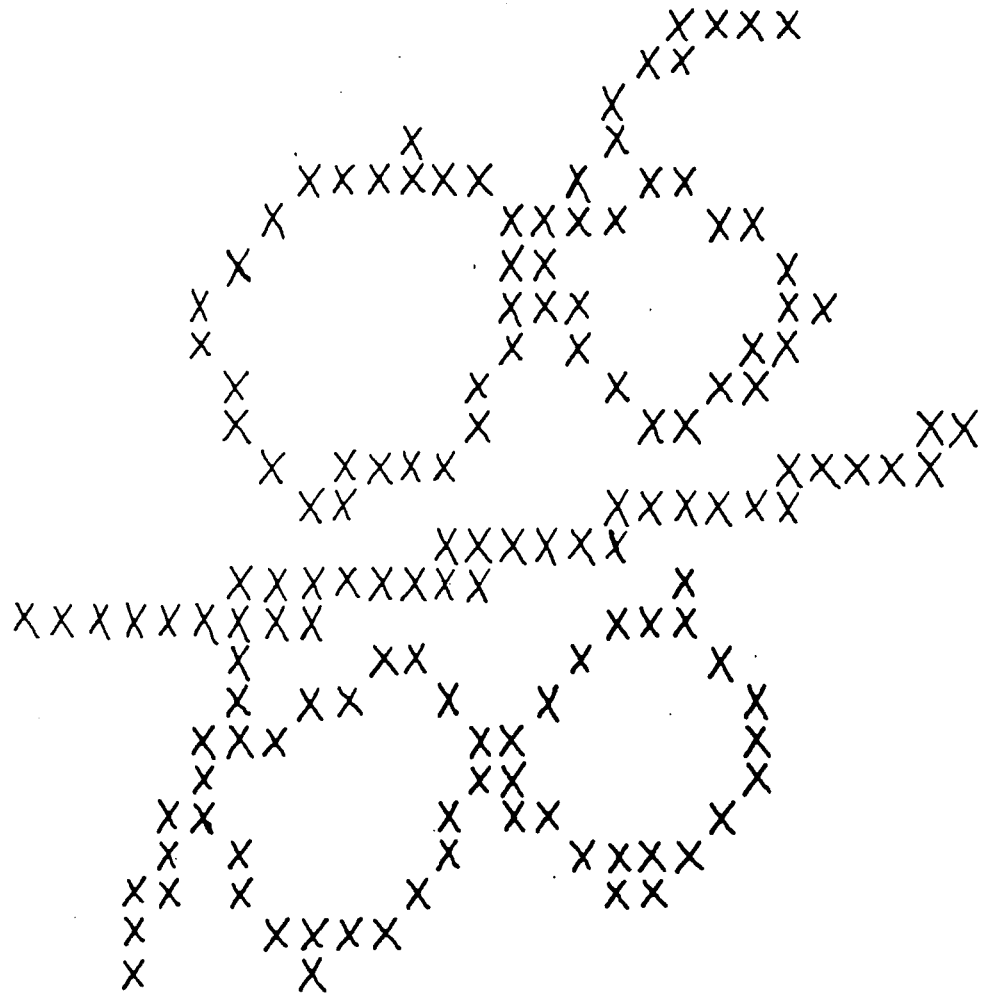
FIG. 26A illustrates a typical fraction.
Figure 26B:
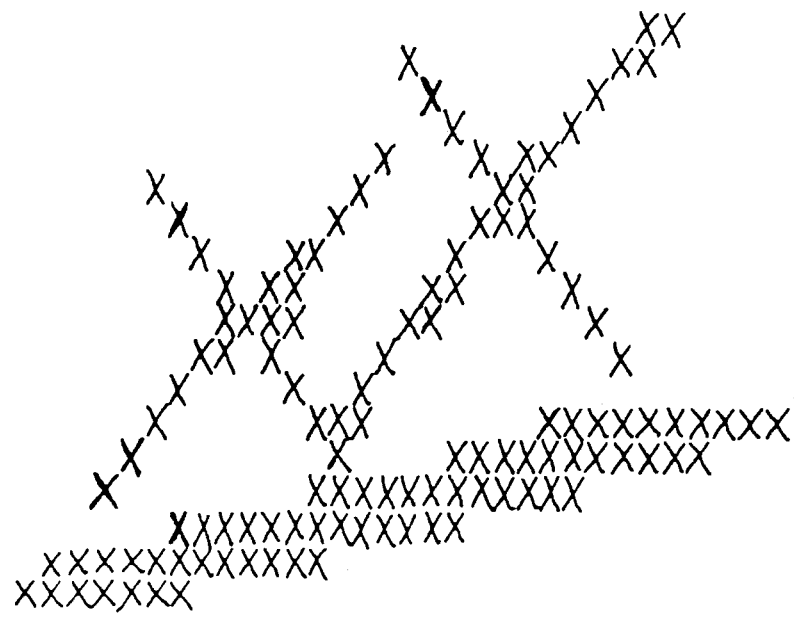
FIG. 26B illustrates an "xx" type symbol or zero value fraction.

FIG. 26A shows a typical handprinted way of expressing the fractional part of a dollar within the CAF, as used in banking. The example is a touching ZERO-SIX in the numerator, with an almost horizontal line underneath. This horizontal or fraction line represents the mathematical symbol for division. Below the division symbol is the numeral tried ONE-ZERO-ZERO, all numerals touching. This represents the denominator in the fraction. In handprinted checks, the numerals in the denominator, if present, are always of value 100. An XX symbol sometimes does appear as the denominator.

It is very important to locate these fractions early in the recognition process for CAFs. One reason for locating them early is that they only occur in the CAF and at the end of the cursively written or spelled amount field. Thus, the location of two examples of the same fraction on the same check can be used as a powerful method to locate the CAF. The two fractions can also be used against each other to improve the probability of correct recognition.

An excellent time to recognize these fractions is during the early sweep which has been generating "Probability of Segmentation", this was discussed under the heading of Handling Overlapped Touching Characters.

Because the fastest and easiest features to recognize are lines that run exactly on horizontal and vertical axes, the first features to be discovered will be portions of the pre-printed box, if that box exists on the check. Unless the check has been bouncing during the scan, continuous horizontal blacks (exhibiting close to the minimum reflections values) will be found which are very close to exactly horizontal and continue for a distance which is more than half an inch long. If the scanning resolution is poor, the reflectance values sampled may be poor due to straddling a line. To improve the reliability of such measurements horizontal "masks" which add up the grey scale reflectance values in selected X-Y locations have been successfully used in the practice of the invention. These masks will be found to be particularly useful in locating the division symbol, which tends to have greater reflectance than a preprinted line and is not likely to fall exactly on the horizontal axis of scanning.

APPLICATION OF INVENTION TO THE RECOGNITION OF TYPEWRITTEN OR CHARACTERS

In general, the methods described for reading handprinted numeric characters and symbols apply directly to the recognition of typewritten or printed characters. The main difference is that the recognition rate should be much higher for the machine printed characters. The following generalizations may also be made for machine printed numerals in banking situations as opposed to handprinted numerals:

1) The variations in height and width will be such less;
2) The contrast will be greater;
3) The percentage of voids and extraneous black pixels will be smaller.
4) The percentage of unusually shaped enclaves will be smaller.

Figure 27A:
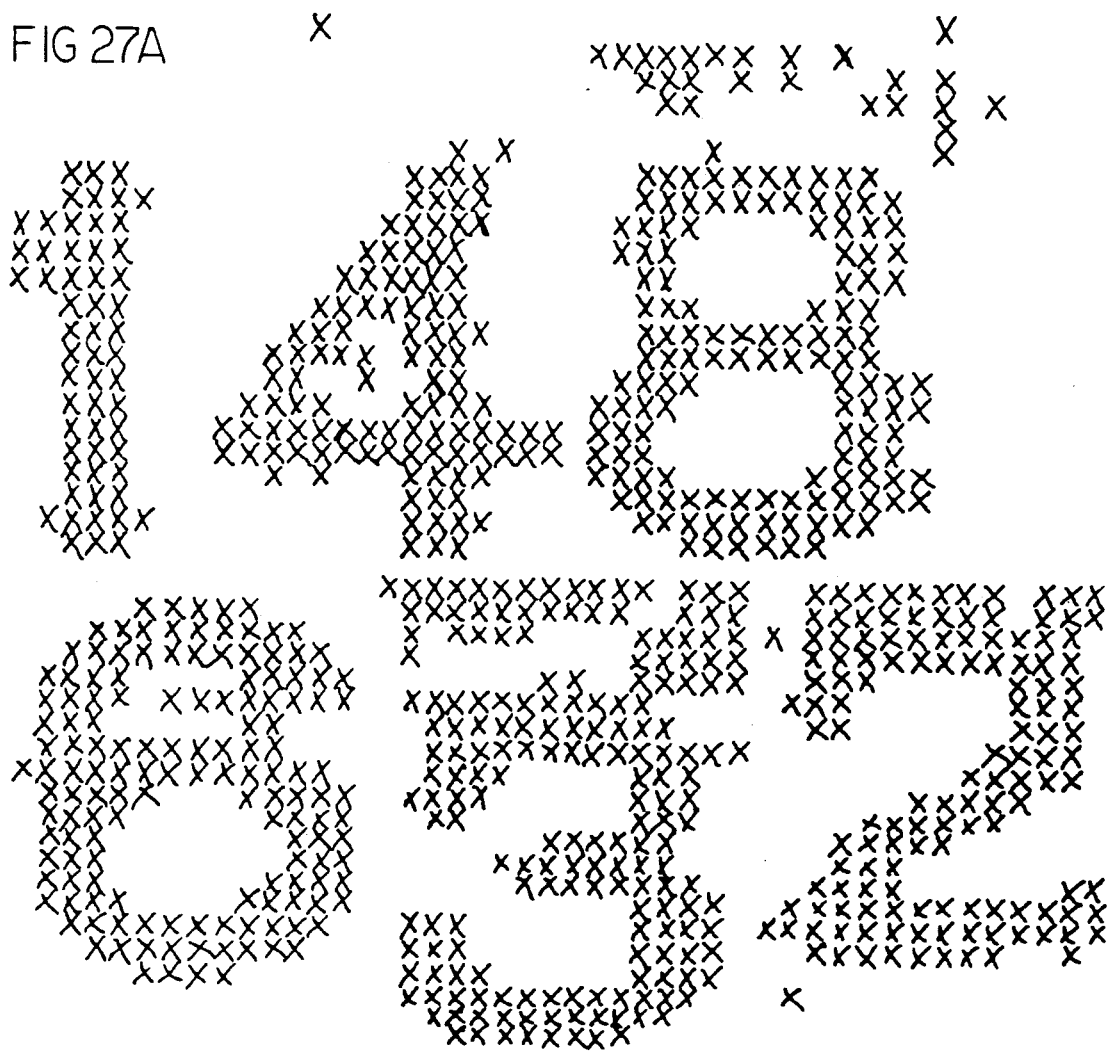
FIGS. 27A and 27B are examples of machine formed characters read by the invention.
Figure 27B:
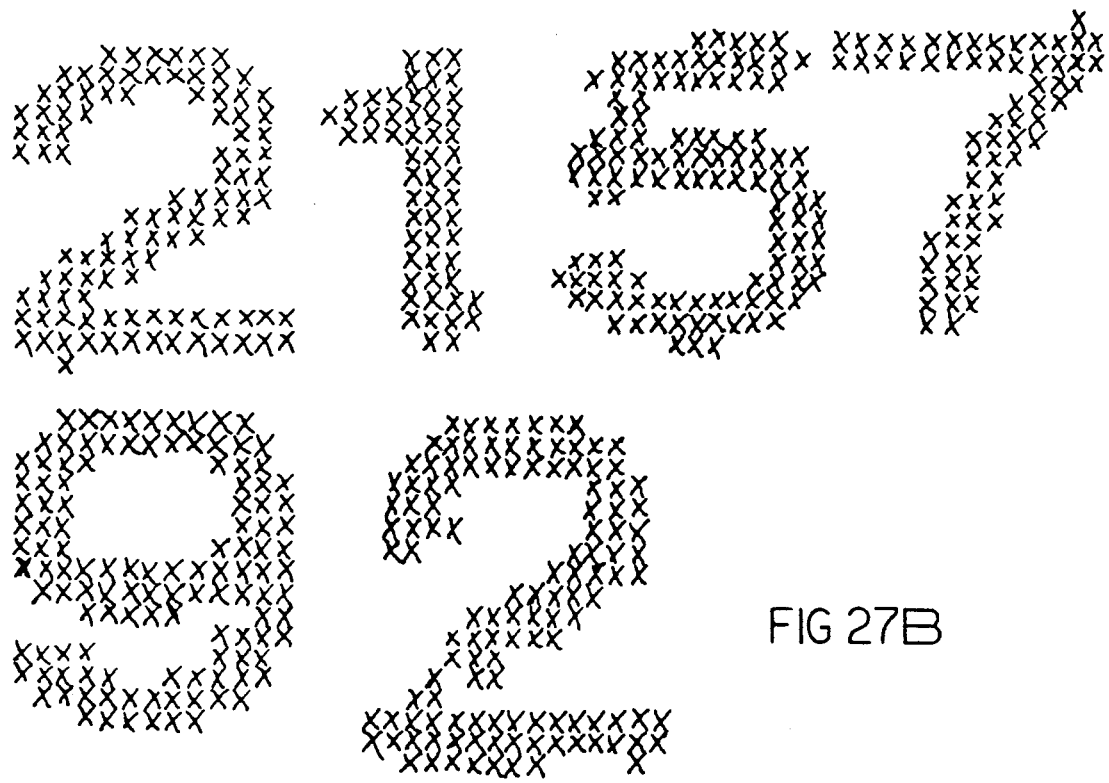

FIG. 27 shows some examples of a quantized set of arabic numerals originally printed by a typewriter. The examples show that the numerals may be easily separated and that the recognition principles of are easily applied.

Figure 29:
FIG. 29 is a font of drawings from a less stylized OCR-B.
Figure 30A:
FIGS. 30A through 30E are examples of dot matrix machine printed characters read by this invention.
Figure 30B:
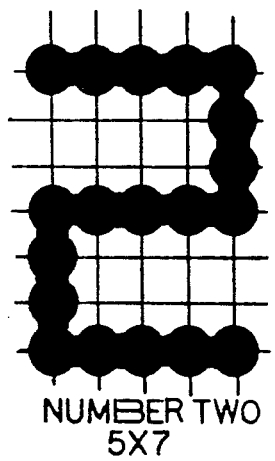
Figure 30C:
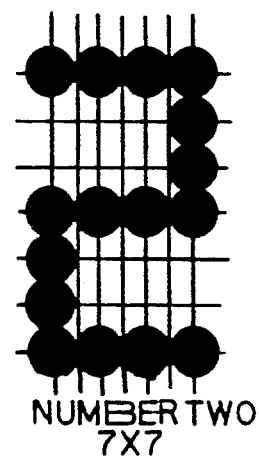
Figure 30D:
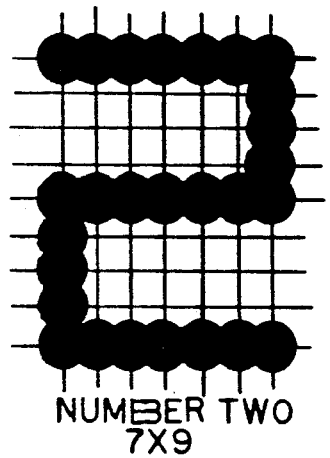
Figure 30E:
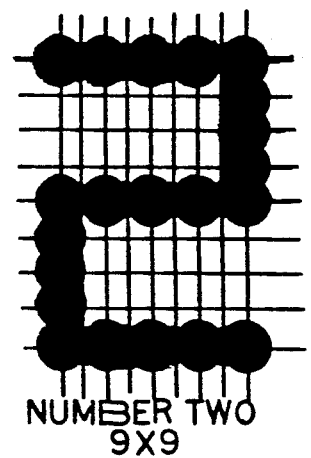

FIG. 28 shows some font drawings from the standardized set OCR-A, and FIG. 29 shows some font drawings from a less stylized set called OCR-B. Both OCR-A and B were designed for the specific purpose of producing fonts which was easily recognizable by optical reading machines.

It will improve the performance of the reading machine to recognize that typewritten characters are being recognized as opposed to handprinted characters. The following parameters measured for this purpose:

1) Height and width of characters,
2) Uniformity of spacing and pitch,
3) Uniformity of line thickness,
4) Variance of centerlines of the group of characters for straight lines,
5) Uniformity of characters belonging to the same class,
6) Conformance to known and stored parameters for hundred standard font styles.

READING OF CHARACTERS PRODUCED BY DOT MATRIX PRINTERS

FIG. 30 shows a drawing of the numeral TWO as it might appear if produced by a typical lead slug impression or any one of a number of printing methods which utilize a raised metal area in the shape of the desired character. The American National Standard Matrix Character Sets for Optical Character Recognition shows an impression which can be created by selectively blackening points in a 5"×7" matrix. Such a matrix is called a "Dot Matrix".

There are several desireable features of such a printer. Firstly, the same mechanism may be used to print characters from almost any font, including graphics. Secondly, the ragged appearance of a coarse matrix is compensated for by the high printing speed obtained. Thirdly, by taking more time and printing dots in a higher resolution matrix, the appearance can be improved to the point where it can hardly be distinguished from "typewriter" quality. Fourthly, the production coat of such a printer is low relative to almost all other methods suitable for computer output.

From the point of view of machine reading of the output of dot matrix printers, however, a coarse matrix can raise havoc wit the performance of OCR machines based on classical methods such as Mask Matching and Stroke Analysis. The primary problem is that while the human eye is willing to integrate the almost disconnected dots into continuous lines, the optical scanner cannot do this. Notice that a Nyquist sampling (sampling at spacings equal to 0.7 of the minimum line thickness) of the character shown in FIG. 30 will produce an excellent character image for any of the classical methods. A similar scanning of FIG. 31, however, will rarely yield a high quality digital image because of the circular and discrete nature of the dots. If the vertical and horizontal sampling could be made to be coincident with the printing matrix, the digital image would be satisfactory, but this is impossible to obtain in practical scanners.

The result of scanning coarse dot matrix impressions invariably produces digital images which have considerable degradation, primarily voids. If the quantizing level is changed to compensate, important gaps will start to close.

Since my invention does not require black pixels to be on specific matrix points, or even that black lines exhibit some specified degree of continuity, the invention disclosed in this specification will produce a higher recognition rate and a lower substitution rate for dot matrix characters than any other previous method. These rates may not be 100% and 0%, however, since a coarse matrix does degrade characters, even as interpreted by the human eye.

While there has been shown and described the preferred embodiments of the invention, it will be appreciated that numerous modifications and adaptations of the invention will be readily apparent to those skilled in the art. For example, in early forms of the invention, I used computer software techniques to successfully perform substantially all of the functions disclosed herein. It is intended to encompass all such modifications and adaptations as may come within the spirit and scope of the claims appended hereto.

What is claimed is:

1. Apparatus for processing bank checks, drafts and like financial documents having one or more numeric entries and symbols in the courtesy amount fields thereof comprising,
    a) means for scanning said fields and creating an electrical binary black/white "image" of one or more numeric characters in said fields, and
    numeric character recognition circuitry comprising:
    b) means for selecting a plurality of centers of recognition (CORs) within said binary black/white image as reference points and measuring the characteristic enclave of the black/white image immediately surrounding the CORs,
    c) means for storing a library of templates of said measurements around the CORs for a plurality of known exemplary character images,
    d) means of comparing said library of templates to corresponding measurements made around the CORs of images whose class is unknown to produce template scores proportional to the similarity of the enclaves of the known image to the enclaves measured by templates,
    e) means for expressing the generic shape of a character as being a character equation involving template scores developed on an unknown image,
    f) means for evaluating each character equation, including comparing the values of such equations, and selecting the best value to determine the generic name of the character read from said check, and
    g) means for locating the division between the dollar and cents characters in the courtesy amount field by recognizing at least one of the following:
        a) a decimal point,
        b) a fraction line,
        c) a larger spacing between the last two characters and the third characters from the right,
        d) an "xx" and/or "100" symbol,
        e) cursive character connector,
        f) smaller cents characters and spaced above bottom of dollar character in a predetermined amount,
        g) combinations of two or more of the above.

2. The apparatus as defined in claim 1 including means operative on recognition of said fraction line in said courtesy amount field for causing said apparatus to disregard characters and symbols below said fraction line.

3. The apparatus as defined in claim 1 including means for counting the number of numeric characters to the left side of the located division between the dollar and cents in said courtesy amount field and providing a signal upon a predetermined number of characters being detected.

4. Apparatus for processing bank checks, drafts and like financial documents having one or more numeric entries and symbols in the courtesy amount fields thereof comprising,
    a) means for scanning said fields and creating an electrical binary black/white "image" of one or more numeric characters in said fields, and
    numeric character recognition circuitry comprising:
    b) means for selecting a plurality of centers of recognition (CORs) within said binary black/white image as reference points and measuring the characteristic enclave of the black/white image immediately surrounding the CORs,
    c) means for storing a library of templates of said measurements around the CORs for a plurality of known exemplary character images,
    d) means for comparing said library of templates to corresponding measurements made around the CORs of images whose class is unknown to produce template scores proportional to the similarity of the enclaves of the known image to the enclaves measured by templates,
    e) means for expressing the generic shape for a character as being a character equation involving template scores developed on an unknown image,
    f) means for evaluating each character equation, including comparing the values of such equations, and selecting the best value to determine the generic name of the character read from said check, and
    wherein said checks, drafts and like financial documents are processed in batches with an accompanying deposit slip and, for each batch, said numeric character recognition circuitry reads the numeric amounts on said checks, drafts and like financial documents and on said deposit slip accompanying each said batch, and g) means for validating the numeric amounts read from said checks, drafts and the like documents with the numeric character read from said deposit slip.

5. Apparatus for processing bank checks, drafts and like financial documents having one or more numeric entries and symbols in the courtesy amount fields thereof comprising, a) means for scanning said fields and creating an electrical binary black/white "image" of one or more numeric characters in said fields, and numeric character recognition circuitry comprising:

b) means for selecting a plurality of centers of recognition (CORs) within said binary black/white image as reference points and measuring the characteristic enclave of the black/white image immediately surrounding the CORs, c) means for storing a library of templates of said measurements around the CORs for a plurality of known exemplary character images, d) means for comparing said library of templates to corresponding measurements made around the CORs of images whose class is unknown to produce template scores proportional to the similarity of the enclaves of the known image to the enclaves measured by templates, e) means for expressing the generic shape of a character as being a character equation involving template scores developed on an unknown image, f) means for evaluating each character equation, including comparing the values of such equations, and selecting the best value to determine the generic name of the character read from said check, and wherein said checks, drafts and the like financial documents are processed in batches, each batch having an accompanying deposit slip listing the numeric dollar and cents amount of each check, draft or like financial document, said numeric character recognition circuitry comprises, g) first and second numeric character recognition circuitry each as defined in b)–f) above, the first one for reading said batches of checks and the second one for reading said deposit slips, and h) means for corroborating the reading by said first numeric character recognition circuitry by comparing the numeric amounts read from said checks with the numeric amounts read from said deposit slips by said second numeric character recognition circuitry.

6. Apparatus for processing bank checks, drafts and like financial documents having one or more numeric entries and symbols in the courtesy amount fields thereof comprising, a) means for scanning said fields and creating an electrical binary black/white "image" of one of more numeric characters in said fields, and numeric character recognition circuitry comprising:

b) means for selecting a plurality of centers of recognition (CORs) within said binary black/white image as reference points and measuring the characteristic enclave of the black/white image immediately surrounding the CORs, c) means for storing a library of templates of said measurements around the CORs for a plurality of known exemplary character images, d) means for comparing said library of templates to corresponding measurements made around the CORs of images whose class is unknown to produce template scores proportional to the similarity of the enclaves of the known image to the enclaves measured by templates, e) means for expressing the generic shape of a character as being a character equation involving template scores developed on an unknown image, f) means for evaluating each character equation, including comparing the values of such equations, and selecting the best value to determine the generic name of the character read from said check, and wherein each said bank check, drafts and the like financial documents has a unique account number for a given entity and said means for storing a library of templates of said measurement around CORs for a plurality of known exemplary character images includes templates for character images uniquely indicative of said given entity, and g) means for validating any given check for a unique account number only upon the presence of measurements around the CORs for a numeric character correlated to said template for character images uniquely indicative of a given entity.

7. Apparatus for processing bank checks, drafts and like financial documents having one or more numeric entries and symbols in the courtesy amount fields thereof comprising, a) means for scanning said fields and creating an electrical binary black/white "image" of one or more numeric characters in said fields, and numeric character recognition circuitry comprising:

b) means for selecting a plurality of centers of recognition (CORs) within said binary black/white image as reference points and measuring the characteristic enclave of the black/white image immediately surrounding the CORs, c) means for storing a library of templates of said measurements around the CORs for a plurality of known exemplary character images, d) means for comparing said library of templates to corresponding measurements made around the CORs of images whose class is unknown to produce template scores proportional to the similarity of the enclaves of the known image to the enclaves measured by templates, e) means for expressing the generic shape of a character as being a character equation involving template scores developed on an unknown image, f) means for evaluating each character equation, including comparing the values of such equations, and selecting the best value to determine the generic name of the character read from said check, and wherein said numeric character recognition circuitry includes, g) first and second numeric character recognition circuitry each as defined in b)–f) above, the first one for reading the numeric amounts in the courtesy amount field of said checks and the second one for reading the numeric amounts on the spelled amount line of said checks, h) means for corroborating the reading by said first numeric character recognition circuitry by comparing the cents portion of numeric amounts read from said checks with the numeric cents amounts read from said spelled amount line by said second numeric character recognition circuitry.

8. Banking apparatus for processing bank checks, drafts and like documents having courtesy amount fields thereon with overlapping numeric characters, comprising means for conveying said documents along a path, means for locating and scanning said courtesy amount field to produce an optical image thereof, digitizing means for converting said optical image of said courtesy amount field to an electronic binary black/white pixel image thereof, recognition circuit means for recognizing said overlapping numeric characters in said electronic binary black/white pixel image, said recognition circuit means includes means for examining each pixel in said black/white pixel image to locate one or more centers of recognition pixels, means for determining the boundedness of all pixels having a specific relationship to said center of recognition pixel, and producing boundedness measurements to recognize said overlapping numeric characters, said recognition circuit including logic means for determining whether each white pixel in said image is bounded in predetermined directions by a black pixel, summing means for summing the number of pixels which are bounded in each said predetermined direction and producing enclave measurements proportional to each respective percentage of the total number of white pixels in said electronic image, means forming a library of sets of said enclave measurements on known overlapping numeric characters, each selected enclave measurement constituting a template, and means for comparing unknown overlapping numeric character enclave measurements with said library of templates and processing a set of ordered values based on the results of comparing said unknown overlapping number character enclave measurement with said library of sets of templates IV. means for reading the dollar and cents amount entered upon an accompanying adding machine tape and said comparing means being adapted to compare the dollar and cents amount read from said adding machine tape with the dollar and cents amounts read from each of said plurality of checks to verify the reading of said courtesy amount fields.

9. Banking apparatus for processing bank checks, drafts and financial documents, including documents having one or more handprinted numeric entries and symbols in the courtesy amount fields (CAF) thereof, at least some of said numeric entries including strings of three or more separate and spaced characters comprising, means for scanning said courtesy amount field and creating an electrical binary black/white "image" of one or more numeric characters in said fields, numeric character recognition means connected to receive said electrical binary black/white "image", said numeric character recognition means, including means for locating the division between the dollar and cents characters in said courtesy amount field by recognizing combinations of two or more of the following:

a) a decimal point,
b) a fraction line,
c) a spacing between the last two characters and the next adjacent character from the right most character in a string,
d) an "xx" and/or "100" symbol,
e) cursive character connector,
f) cents characters smaller than and spaced above bottom of dollar character in a predetermined distance.

10. The banking apparatus as defined in claim 9 including means operative on recognition of said fraction line in said courtesy amount field for causing said apparatus to disregard characters and symbols below said fraction line.

11. The banking apparatus as defined in claim 9 including means for counting the number of numeric characters in the dollar characters in said courtesy amount field and providing a signal upon a predetermined number of characters being detected.

12. The banking apparatus as defined in claim 9 including means for counting the numbers of dollar numeric characters in said courtesy amount field.

13. The banking apparatus as defined in claim 12 including means for detecting touching and overlapping numeric characters in said courtesy amount field and means for recognizing said touching and overlapping characters.

14. The banking apparatus as defined in claim 10 including means for reading characters touching a fraction line in said handwritten characters.

15. The apparatus as defined in claim 10 wherein each said bank check, drafts and financial documents has a unique account number for a given entity and means for storing a plurality of combinations of two or more ways of locating the division between dollars and cents, and means for validating any given check for a unique account number only upon the presence of a given combination said two or more ways correlated to an account number of a given entity.

16. Banking apparatus comprising, a scanning station having conveyor means for moving a plurality of bank checks, including checks having unconstrained handprinted dollar and cents strings of numeric characters and symbols in the courtesy amount fields thereof, through a digitizing station to create an electrical binary black/white image of the numeric characters and symbols in the courtesy amount field on said bank checks, means for locating the courtesy amount field portion in said electrical binary black/white image, numeric character recognition circuit means for recognizing the numeric characters in said courtesy amount field portion of said electrical black/white image of said bank checks, and means for recognizing the symbol portions of said strings of numeric characters and symbols, said strings of numeric characters being in a sequential row including a last two characters, including means for locating the division between numeric dollar characters and number cents characters, respectively, in said courtesy amount field including means for recognizing spacing between the numbers in a string of numeric characters and recognizing a relatively large spacing between said last two numeric characters and the numeric characters preceding same in said string.

17. Banking apparatus comprising, a scanning station having conveyor means for moving a plurality of bank checks, including checks having unconstrained handprinted dollar and cents strings of numeric characters and symbols in the courtesy amount fields thereof, through a digitizing station to create an electrical binary black/white image of the numeric characters and symbols in the courtesy amount field on said bank checks, means for locating the courtesy amount field portion in said electrical binary black/white image, numeric character recognition circuit means for recognizing the numeric characters in said courtesy amount field portion of said electrical black/white image of said bank checks, and means for recognizing the symbol portions of said strings of numeric characters and symbols, said means for locating the division between numeric dollar character and numeric cents characters, respectively, including means for recognizing a cursive character connector said last two numeric characters in said string.

18. Apparatus as defined in claim 9 including means for identifying all checks which are above a predetermined dollar amount.

19. Bank check processing apparatus for processing bank checks having one or more handwritten numeric entries and symbols in the courtesy amount fields thereof written by a person, a reading station comprising, means for scanning said courtesy amount field and creating an electrical binary black/white "image" of said handwritten numeric entries and symbols, handwritten numeric character and symbol recognition means connected to receive said electrical binary black/white "image" and recognize said numeric characters and symbols, means for validating the reading of handwritten numeric characters by said handwritten numeric character recognition means comprising:

a) means for storing one or more known characteristics related to said person including a template histogram of features associated with said person's account, and b) means for comparing said one or more known characteristics related to said person to numeric characters and symbols in said electrical binary black/white "image" as recognized by said handwritten numeric character recognition means to validate a recognition of said numeric characters and/or symbols by said handwritten numeric character and symbol recognition means.

* * * * *